United States Patent
Hegmann et al.

(10) Patent No.: US 8,294,838 B2
(45) Date of Patent: Oct. 23, 2012

(54) PLANAR NEMATIC LIQUID CRYSTAL CELLS DOPED WITH NANOPARTICLES AND METHODS OF INDUCING A FREEDERICKSZ TRANSITION

(75) Inventors: Torsten Hegmann, Winnipeg (CA); Hao Qi, Winnipeg (CA)

(73) Assignee: University of Manitoba, Winnipeg, Manitoba (CA)

( * ) Notice: Subject to any disclaimer, the term of this patent is extended or adjusted under 35 U.S.C. 154(b) by 385 days.

(21) Appl. No.: 12/597,235

(22) PCT Filed: May 2, 2008

(86) PCT No.: PCT/CA2008/000826
§ 371 (c)(1),
(2), (4) Date: Apr. 7, 2010

(87) PCT Pub. No.: WO2008/134866
PCT Pub. Date: Nov. 13, 2008

(65) Prior Publication Data
US 2010/0195008 A1  Aug. 5, 2010

Related U.S. Application Data

(60) Provisional application No. 60/927,417, filed on May 3, 2007, provisional application No. 61/008,040, filed on Dec. 18, 2007, provisional application No. 60/997,962, filed on Oct. 4, 2007.

(51) Int. Cl.
*G02F 1/133* (2006.01)

(52) U.S. Cl. .......... 349/33; 349/163; 349/166; 349/186; 252/299.5

(58) Field of Classification Search .................. None
See application file for complete search history.

(56) References Cited

U.S. PATENT DOCUMENTS

| 6,287,649 B1 | 9/2001 | Fukushima et al. |
|---|---|---|
| 6,482,988 B2 | 11/2002 | Fukushima et al. |
| 2004/0250750 A1 | 12/2004 | Reda et al. |
| 2009/0027611 A1* | 1/2009 | Hegmann et al. ............ 349/182 |

FOREIGN PATENT DOCUMENTS

| CA | 2 334 238 A1 | 12/1999 |
|---|---|---|
| CA | 2 537 199 | 3/2005 |

OTHER PUBLICATIONS

Asta et al., "Inorganic Nanoparticles—Unique Properties and Novel Applications," *Material Matters*, 2007, 2(1), 3-6.
Chen et al., "Electro-Optical Characteristics of a Twisted Nematic Liquid-Crystal Cell Doped with Carbon Nanotubes in a DC Electric Field," *Opt. Rev.*, 2005, 12(3), 223-225.
Dierking et al., "Aligning and Reorienting Carbon Nanotubes with Nematic Liquid Crystals," *Adv. Mater.*, Jun. 4, 2004, 16(11), 865-869. Available online Apr. 30, 2004.
Dierking et al., "Magnetically steered liquid crystal-nanotube switch," *Appl. Phys. Lett.*, 2005, 87, 233507(1-3).

(Continued)

*Primary Examiner* — Mike Stahl

(74) *Attorney, Agent, or Firm* — Mueting Raasch & Gebhardt, P.A.

(57) ABSTRACT

Nematic liquid crystal cells with positive dielectric anisotropy that include colloidal suspensions having nanoclusters are provided as well as methods of inducing Freedericksz transitions therein and methods of controlling the alignment of a liquid crystal.

14 Claims, 21 Drawing Sheets

OTHER PUBLICATIONS

Eidenschink et al., "Static scattering in filled nematic: new liquid crystal display technique," Electron. Lett., Jun. 20, 1991, 27(13), 1195-1196.

Elston et al., The Optics of Thermotropic Liquid Crystals, Taylor & Francis, Bristol, PA, 1998, cover page, copyright page, and table of contents only; 4 pgs.

Gaponik et al., "Thiol-Capping of CdTe Nanocrystals: An Alternative to Organometallic Synthetic Routes," J. Phys. Chem. B, 2002, 106(29), 7177-7185. Available online Jun. 21, 2002.

Glushchenko et al., "Memory effect in filled nematic liquid crystals," Liq. Cryst., 1997, 23(2), 241-246.

Hegmann et al., "Nanoparticles in Liquid Crystals: Synthesis, Self-Assembly, Defect Formation and Potential Applications," J. Inorg. Organomet. Polym. Mater., Sep. 2007, 17(3), 483-508.

Hegmann et al., "Alignment and Electro-Optic Effects of Funcationalized Gold Nanoparticles and CdTe Semiconductor Quantum Dots in Nematic Hosts" abstract, Canadian Society for Chemistry (CSC), Ottawa, Ontario, Canada, 2009, retrieved on May 14, 2009 from the internet <http://abstracts.csc2009.ca/00000289.htm>; 1 pg.

Huang et al., "Electrooptical Responses of Carbon Nanotube-Doped Liquid Crystal Devices," Jpn. J. Appl. Phys., Nov. 9, 2005, 44(11), 8077-8081.

Huang et al., "Electrooptical Properties of Carbon-Nanotube-Doped Twisted Nematic Liquid Crystal Cell," Jpn. J. Appl. Phys., Aug. 4, 2006, 45(8A), 6392-6394.

Jeon et al., Appl. Phys. Lett., "Effects of carbon nanotubes on electro-optical characteristics of liquid crystal cell driven by in-plane field," Mar. 2007, 90(12), 121901(1-3).

Jeong et al., "Electroactive Superelongation of Carbon Nanotube Aggregates in Liquid Crystal Medium," Nano Lett., 2007, 7(8), 2178-2182. Available online Jul. 4, 2007.

Khoo, Liquid Crystals, 2$^{nd}$ ed.; John Wiley & Sons, Hoboken, NJ, 2007, cover page, copyright page, and table of contents; 9 pgs. Available online May 18, 2006.

Kinkead et al., "Effects of size, capping agent, and concentration of CdSe and CdTe quantum dots doped into a nematic liquid crystal on the optical and electro-optic properties of the final colloidal liquid crystal mixture," J. Mater. Chem., 2010, 20(3): 448-458. Available online Nov. 6, 2009 as an Advance Article.

Kreuzer et al., "Erasable optical storage in bistable liquid-crystal cells," Mol. Cryst. Liq. Cryst., 1992, 223, 219-227. First published Jan. 1, 1992.

Lee et al., "Effects of carbon-nanotube doping on the performance of a TN-LCD," J. Soc. Inf. Disp., Sep. 2005, 13(9), 743-747.

Li et al., "Shape and Aggregation Control of Nanoparticles: Not Shaken, Not Stirred," J. Am. Chem. Soc., 2006, 128(3), 968-975. Available online Dec. 31, 2005.

Pradhan et al., "Three-dimensional structure of CdX (X=Se,Te) nanocrystals by total x-ray diffraction," J. Appl. Phys., 2007, 102(4), 044304(1-6).

Qi et al., "Unprecedented Dual Alignment Mode and Freedericksz Transition in Planar Nematic Liquid Crystal Cells Doped with Gold Nanoclusters," Adv. Funct. Mater., Jan. 24, 2008, 18(2), 212-221. Available online Jan. 3, 2008.

Qi et al., "Impact of nanoscale particles and carbon nanotubes on current and future generations of liquid crystal displays," J. Mater. Chem., 2008,18(28), 3288-3294.

Qi et al., "Effects of functionalized metal and semiconductor nanoparticles in nematic liquid crystal phases," Proc. SPIE-Int. Soc. Opt. Eng., 2008, 6911, 691106(1-11).

Qi et al., "Miscibility and Alignment Effects of Mixed Monolayer Cyanobiphenyl Liquid-Crystal-Capped Gold Nanoparticles in Nematic Cyanobiphenyl Liquid Crystal Hosts," ChemPhysChem., Jun. 2, 2009, 10(8), 1211-1218. Available online Mar. 30, 2009.

Song et al., "Nematic Liquid Crystallinity of Multiwall Carbon Nanotubes," Science, Nov. 21, 2003, 302(5649), 1363.

Walker et al., "Quantum-dot optical temperature probes," Appl. Phys. Lett., Oct. 27, 2003, 83(17), 3555-3557.

Yakuphanoglu et al., "Conductance and dielectric anisotropy properties of 4-cyano-4'-hexylbiphenyl-salicylaldimine compound composite liquid crystal exhibiting large positive dielectric anisotropy" Physica B: Physics of Condensed Matter, Apr. 30, 2007, 393(1-2), 270-274.

Yaroslavov et al., "What Is the Effective Charge of TGA-Stabilized CdTe Nanocolloids?" J Am. Chem. Soc., 2005, 127(20), 7322-7323. Available online Apr. 29, 2005.

Zhang et al., "The Influence of Carboxyl Groups on the Photoluminescence of Mercaptocarboxylic Acid-Stabilized CdTe Nanoparticles," J. Phys. Chem. B, 2003, 107(1), 8-13. Available online Dec. 10, 2002.

Abe et al., "Dielectric and fluorescence study on phase transitions in liquid crystal 5CB and 8CB," J. Korean Phys. Soc., Jan. 2005, 46(1), 220-223.

Ahonen et al., "Formation of stable Ag-nanoparticle aggregates induced by dithiol cross-linking," J. Phys. Chem. B, 2006; 110(26):12954-12958. Published online Jun. 10, 2006.

Albrecht et al., "Intrinsic multistate switching of gold clusters through electrochemical gating," J. Am. Chem. Soc., 2007, 129, 9162-9167. Published online Jun. 6, 2007.

Andrienko et al., "Computer simulation of topological defects around a colloidal particle or droplet dispersed in a nematic host," Phys. Rev. E Stat. Nonlin. Soft Matter Phys., 2001; 63(4): 041701-1-041701-8. Published online Mar. 20, 2001.

Belser et al., "Immobilization of Rhodium Complexes at Thiolate Monolayers on Gold Surfaces: Catalytic and Structural Studies," J. Am. Chem. Soc., Jun. 22, 2005; 127(24):8720-8731.

Boettcher et al., "Tunable electronic interfaces between bulk semiconductors and ligand-stabilized nanoparticle assemblies," Nat. Mater., Aug. 6, 2007, 592-596. Published online Jun. 24, 2007.

Brust et al., "Synthesis of thiol-derivatised gold nanoparticles in a two-phase liquid-liquid system," J. Chem. Soc., Chem. Commun., 1994; 7:801-802.

Brust et al., "Synthesis and Reactions of Functionalised Gold Nanoparticles," J. Chem. Soc., Chem. Commun., 1995;16:1655-1656.

Buchnev et al., "New non-synthetic method to modify properties of liquid crystals using micro- and nano-particles," J. Soc. Inf. Disp., 2005,13(9), 749-754.

Buchnev et al., "Enhanced two-beam coupling in colloids of ferroelectric nanoparticles in liquid crystals," J. Opt. Soc. Amer. B, Jul. 2007, 24(7), 1512-1516. Published online Jun. 15, 2007.

Buda et al., "A Hausdorff chirality measure," J.Am. Chem. Soc., Jul. 1992; 114(15):6006-6012.

Büttner et al. "Stability of thiol-passivated gold particles at elevated temperatures studied by X-ray photoelectron spectroscopy," J. Phys. Chem. B, 2005; 109(12):5464-5467. Published online Mar. 4, 2005.

Choo et al., "Synthesis of mixed monolayer-protected gold clusters from thiol mixtures: Variation in the tail group, chain length, and solvent," Langmuir, 2003; 19(20):8555-8559. Published online Aug. 20, 2003.

Coffey et al., "Chiral Hausdorff metrics and structural spectroscopy in a complex system," J. Phys. A: Math. Gen., Mar. 1999; 32(12):2263-2284.

Čopič et al., "Coupled director and polarization fluctuations in suspensions of ferroelectric nanoparticles in nematic liquid crystals," Phys. Rev. E, 2007, 76, 011702(1-5). Published online Jul. 11, 2007.

Da Cruz et al., "Phase behavior of nanoparticles in a thermotropic liquid crystal," J. Phys. Chem. B, 2005, 109(30), 14292-14299. Published online Jul. 12, 2005.

Dark et al., "Rotational viscosity and molecular structure of nematic liquid crystals," Liq. Cryst., Jan. 2006, 33(1), 67-73.

Dasog et al., "Understanding the oxidative stability of gold monolayer-protected clusters in the presence of halide ions under ambient conditions," Langmuir, 2007, 23, 3381-3387. Published online Feb. 2, 2007.

de la Venta et al., "Magnetism in polymers with embedded gold nanoparticles," Adv. Mater., 2007, 19, 875-877. Published Feb. 19, 2007.

Dierking, Textures of Liquid Crystals, Willey-VCH, Weinheim, Germany, 2003, title page, copyright pages and table of contents only, 6 pgs.

Dierking, "Liquid crystal-carbon nanotubes dispersions," J. Appl. Phys., 2005, 97, 044309(1-5). Published online Jan. 25, 2005.

Diorio Jr. et al., "The electro-optic properties of colloidal silica filled nematics," *Liq. Cryst.*, 2002, 29(4), 589-596.

dos Santos, Jr. et al., "Controlling the size and shape of gold nanoparticles in fulvic acid colloidal solutions and their optical characterization using SERS," *J. Mater. Chem.*, 2005; 15:3045-3049.

Drawhorn et al., "Anchoring of nematic liquid crystals on self-assembled monolayers formed from alkanethiols on semitransparent films of gold," *J. Phys. Chem.*, 1995, 99, 16511-16515. Abstract published in *Advance ACS Abstracts* Nov. 1, 1995.

Dunmur et al., "Elastic Properties," in *Handbook of Liquid Crystals*, Demus et al. (Eds.), Wiley-VCH (Weinheim), 1998, vol. 1, pp. 253-280.

Feng et al., "Orientational defects near colloidal particles in a nematic liquid crystal," *J. Colloid Interface Sci.*, Jan. 1, 2004; 269(1):72-78.

Freedericksz et al., "Über die Orientierung anisotropen Flüssigkeiten in dünnen Schichten and die Messung einiger Ihre elastischen eigenshaften charakterisierenden Konstanten," *Phys. Z. Sow.*, 1934, 6, 490-504.

Friedel, "The mesomorphic states of matter," *Ann. Phys. Paris*, 1922; 18:273-474. (publication in French and English translation translated by the Translation and Interpretation Division of the Institute of Modern Languages, Washington, D.C. English translation obtained from the University of Minnesota Library Service (ESTIS)).

Frisken et al., "Freedericksz transitions in nematic liquid crystals: The effects of an in-plane electric field," *Phys. Rev. A*, Nov. 15, 1989, 40(10), 6099-6102.

Fukada et al., "Interaction between particles in a nematic liquid crystal: Numerical study using the Landau-de Gennes continuum theory," *Mol. Cryst. Liq. Cryst.*, 2005; 435:63/723-74/734.

Gaponik et al., "Efficient phase transfer of luminescent thiol-capped nanocrystals: from water to non-polar organic solvents," *Nano. Lett.*, 2002;2(8):803-806. Published online Jul. 12, 2002.

Garzón et al., "Chirality in bare and passivated gold nanoclusters," *Phys. Rev. B*, 2002; 66(7):073403-1-073403-4.

Garzón et al., "Chirality, defects, and disorder in gold clusters," *Eur. Phys. J. D*, Jun. 11, 2003; 24(1-3):105-109.

Gautier et al., "Vibrational circular dichroism of N-acetyl-L-cysteine protected gold nanoparticles," *Chem. Commun.*, Nov. 2005; 43:5393-5395.

Gu et al., "Observation of saturn-ring defects around solid microspheres in nematic liquid crystals," *Phys. Rev. Lett.*, Nov. 27, 2000; 85(22):4719-4722.

Guzmán et al., "Quenched disorder in a liquid-crystal biosensor: Adsorbed nanoparticles at confining walls," *J. Chem. Phys.*, May 8, 2005, 122, 184711(1-10). Published online May 11, 2005.

Haraguchi et al., "Reduction of the threshold voltages of nematic liquid crystal electrooptical devices by doping inorganic nanoparticles," *Jpn. J. Appl. Phys.*, 2007, 46(34), 796-797.

Hong et al., "Extraordinarily high-contrast and wide-view liquid crystal displays," *Appl. Phys. Lett.*, 2005, 86, 121107(1-3). Published online Mar. 15, 2005.

Hu et al., "A convenient trimethylsilylthioxy-dehalogenation reaction for the preparation of functionalized thiols," *J. Org. Chem.*, 1999; 64(13):4959-4961.

Kaur et al., "Enhanced electro-optical properties in gold nanoparticles doped ferroelectric liquid crystals," *Appl. Phys. Lett.*, 2007, 91, 023120(1-3). Published online Jul. 13, 2007.

Kazemekaite et al., "Synthesis and self-assembling properties on gold of 2-methyl-1,4-naphthoquinone derivatives containing ω-mercaptoalkylalkanoate groups," *Tetrahedron Letters*, Apr. 2004; 45(18):3551-3555. Published online Apr. 8, 2004.

Kim et al., "Size-selective synthesis of gold and platinum nanoparticles using novel liquids," *Langmuir*, 2004; 20(3):556-560. Published online Dec. 25, 2003.

Knobloch et al., "Command surface controlled liquid crystal waveguide structures as optical information storage," *J. Appl. Phys.*, Dec. 15, 1994, 76(12), 8212-8214.

Knobloch et al., "Photochromic command surface induced switching of liquid crystal optical waveguide structures," *J. Appl. Phys.*, Jan. 15, 1995, 77(2), 481-487.

Kobayashi et al., "Dielectric spectroscopy of metal nanoparticle doped liquid crystal displays exhibiting frequency modulation response," *J. Display Technol.*, Jun. 2006, 2(2), 121-129.

Kossyrev et al., "Electric field tuning of plasmonic response of nanodot array in liquid crystal matrix," *Nano Lett.*, 2005, 5(10), 1978-1981. Published online Sep. 9, 2005.

Kossyrev et al., "Branching of colloidal chains in capillary-confined nematics," *Phys. Rev. Lett.*, Feb. 2006; 96(4):048301-1-048301-4. Epub Feb. 2, 2006.

Kuksenok et al., "Director structure around a colloid particle suspended in a nematic liquid crystal," *Phys. Rev. E*, Nov. 1996; 54(5):5198-5203.

Lapointe et al., "Elastic torque and the levitation of metal wires by a nematic liquid crystal," *Science*, Jan. 30, 2004, 303, 652-655.

Li et al., "Circular dichroism study of chiral biomolecules conjugated with silver nanoparticles," *Nanotechnology*, 2004; 15:S660-S663.

Li et al., "Ferroelectric nanoparticle/liquid-crystal colloids for display applications," *J. Soc. Inf. Disp.*, 2006,14(6), 523-527.

Li et al., "Orientational coupling amplification in ferroelectric nematic colloids," *Phys. Rev. Lett.*, Oct. 6, 2006, 97(14), 147801(1-4). Published online Oct. 5, 2006.

Loudet et al., "Colloidal ordering from phase separation in a liquid-crystalline continuous phase," *Nature*, Oct. 2000; 407(6804):611-613.

Loudet et al., "Edge dislocations of colloidal chains suspended in a nematic liquid crystal," *Europhys. Lett.*, Apr. 2001; 54:175-181.

Loudet et al., "Application of an electric field to colloidal particles suspended in a liquid-crystal solvent," *Phys. Rev. Letter.*, Oct. 15, 2001; 87(16):165503-1-165503-4. Epub Sep. 27, 2001.

Loudet al., "Line defect dynamics around a colloidal particle," *Eur. Phys. J. E—Soft Matter*, Mar. 2002; 7(3):205-208.

Lubensky et al., "Topological defects and interactions in nematic emulsions," *Phys. Rev. E*, 1998; 57(1):610-625.

Maye et al., "Heating-induced evolution of thiolate-encapsulated gold nanoparticles: a strategy for size and shape manipulations," *Langmuir*, 2000, 16(2), 490-497. Published online Nov. 4, 1999.

Mitov et al., "Long-range structuring of nanoparticles by mimicry of a cholesteric liquid crystal," *Nat. Mater.*, Dec. 1999, 1, 229-231. Published online Nov. 17, 2004.

Mitov et al., "Fingerprint patterning of solid nanoparticles embedded in a cholesteric liquid crystal," *J. Phys.: Condens. Matter*, 2004; 16:S1981-S1988.

Miyama et al., "Fast switching of frequency modulation twisted nematic liquid crystal display fabricated by doping nanoparticles and its mechanism," *Jpn. J. Appl. Phys.*, 2004, 43(5A), 2580-2584.

Miyama et al., "Dielectric properties and electro-optic characteristics of TN-LCDs doped with metal nanoparticles exhibiting frequency modulation response accompanying fast response," *Mol. Cryst. Liq. Cryst.*, 2005, 433(1), 29-40. Published online Jun. 1, 2005.

Mondain-Monval et al., "Weak surface energy in nematic dispersions: Saturn ring defects and quadrupolar interactions" *Eur. Phys. J. B*, Nov. 1999; 12(2):167-170.

Ouskova et al., "Dielectric relaxation spectroscopy of a nematic liquid crystal doped with ferroelectric Sn2P2S6 nanoparticles," *Liq. Cryst.*, Oct. 2003, 30(10), 1235-1239.

Peceros et al., "Dipole-dipole plasmon interactions in gold-on-polystyrene composites," *J. Phys. Chem. B*, 2005, 109(46), 21516-21520. Published online Sep. 9, 2005.

Pietron et al., "Using electrons stored on quantized capacitors in electron transfer reactions," *J. Am. Chem. Soc.*, 1999, 121(23), 5565-5570. Published online May 26, 1999.

Poulin et al., "Novel colloidal interactions in anisotropic fluids," *Science*, Mar. 25, 1997; 275(5307):1770-1773.

Poulin et al., "Direct measurement of colloidal forces in an anisotropic solvent," *Phys. Rev. Lett.*, Dec. 1997; 79(24):4862-4865.

Poulin et al., "Inverted and multiple nematic emulsions," *Phys. Rev. E*, Jan. 1998; 57(1):626-637.

Poulin et al., "Suspension of spherical particles in nematic solutions of disks and rods," *Phys. Rev. E*, 1999; 59(4):4384-4387.

Prasad et al., "Electrical conductivity and dielectric constant measurements of liquid crystal-gold nanoparticle composites," *Liq. Cryst.*, Oct. 2006, 33(10), 1121-1125.

Qi et al., "Controlled assembly of gold and silver nanoparticles using thertnotropic amphiphilic and convention liquid crystals," *Proceedings of 2005 5th IEEE Conference on Nanotechnology*, Nagoya, Japan, Jul. 2005, 4 pgs.

Qi et al., "Formation of periodic strip patterns in nematic liquid crystals doped with functionalized gold nanoparticles," *J. Mater. Chem.*, 2006; 16:4197-4205.

Qi et al., "Effects of hydrophilic and hydrophobic gold nanoclusters on the stability and ordering of bolaamphiphilic liquid crystals," *J. Mater. Chem.*, 2007; 17:2139-2144. First published as an Advance Article on the web Mar. 8, 2007.

Qi et al., "Chirality transfer in nematic liquid crystals doped with (S)-naproxen functionalized gold nanoclusters: an induced circular dichroism study," *J. Mater. Chem.*, 2008; 18: 374-380. First published as an Advance Article on the web Dec. 4, 2007.

Reshetnyak, "Effective dielectric function of ferroelectric LC suspensions," *Mol. Cryst. Liq. Cryst.*, 2004, 421(1), 219-224. Published online Jan. 1, 2004.

Reshetnyak et al., "Freedericksz transition threshold in nematic liquid crystals filled with ferroelectric nano-particles," *Mol. Cryst. Liq. Cryst.*, 2006, 454, 201/[603]-206/[608].

Reznikov et al., "Ferroelectric nematic suspension," *Appl. Phys. Lett.*, Mar. 24, 2003, 82(12), 1917-1919.

Román-Velázquez et al., "Circular dichroism simulated spectra of chiral gold nanoclusters: A dipole approximation," *J. Phys. Chem. B*, Nov. 2003; 107(44): 12035-12038. Published online Oct. 10, 2003.

Ruhwandl et al., "Monte Carlo simulation of topological defects in the nematic liquid crystal matrix around a spherical colloid particle," *Phys. Rev. E*, 1997; 56(5):5561-5565.

Sage, "Displays" in *Handbook of Liquid Crystals*, Wiley-VCH, Weinheim, Demus et al. (Eds.), vol. 1, 1998, pp. 731-762.

Sano et al., "Enhancement of characteristics of LCDs by doping nanoparticles: reduction of operating voltage, viscosity, and response times," *Proc. SPIE*, 2006, 613501(1-5).

Sarathy et al., "Thiol-derivatized nanocrystalline arrays of gold, silver, and platinum," *J. Phys. Chem. B*, 1997; 101(48):9876-9880. Published online: Nov. 27, 1997.

Schaaff et al., "Giant gold-glutathione cluster compounds: Intense optical activity in metal-based transitions," *J. Phys. Chem. B*, 2000;104(12):2630-2641. Epub Feb. 24, 2000.

Schadt, "Liquid crystal materials and liquid crystal displays," *Ann. Rev. Mater. Sci.*, 1997, 27, 305-379.

Shipway et al., "Nanoparticle arrays on surfaces for electronic, optical, and sensor applications," *ChemPhysChem*, 2000, 1, 18-52.

Sikharulidze, "Nanoparticles: An approach to controlling an electro-optical behaviour of nematic liquid crystals," *Appl. Phys. Lett.*, 2005, 86, 033507(1-3). Published online Jan. 14, 2005.

Sonin, *The surface physics of liquid crystals*, 1995, Gordon & Breach, Luxembourg; cover page, copyright page, and table of contents only; 5 pgs.

Stark et al., "Water droplets in a spherically confined nematic solvent: A numerical investigation," *Eur. Phys. J. B*, Aug. 1, 1999; 10(3):515-523.

Stark, "Director field configurations around a spherical particle in a nematic liquid crystal," *Eur. Phys. J. B*, Aug. 1999; 10(2):311-321.

Stark, "Physics of colloidal dispersions in nematic liquid crystals," *Phys. Rep.*, 2001, 351, 387-474.

Stark, "Saturn-ring defects around microspheres suspended in nematic liquid crystals: An analogy between confined geometries and magnetic fields," *Phys. Rev. E*, 2002; 66(3):032701-1-032701-2.

Stark, "Geometric view on colloidal interactions above the nematic-isotropic phase transition," *Phys. Rev. E*, Oct. 30, 2002, 66, 041705(1-4).

Svetec et al., "Annihilation of nematic point defects: Pre-collision and post-collision evolution," *Eur. Phys. J. E—Soft Matter*, May 2006; 20(1):71-79.

Tamura et al., "Chiral bisphosphine BINAP-stabilized gold and palladium nanoparticles with small size and their palladium nanoparticle-catalyzed asymmetric reaction," *J. Am. Chem. Soc.*, 2003; 125(51):15742-15743.

Tarumi et al., "Recent liquid crystal material development for active matrix displays," *Ann. Rev. Mater. Sci.*, 1997, 27, 423-441.

Templeton et al., "Monolayer-protected cluster molecules," *Acc. Chem. Res.*, 2000; 33(1):27-36. Published online Nov. 18, 1999.

Terrill et al., "Monolayers in three dimensions: NMR, SAXS, thermal, and electron hopping studies of alkanethiol stabilized gold clusters," *J. Am. Chem. Soc.*, 1995, 117(50), 12537-12548.

Toney et al., "Near-surface alignment of polymers in rubbed films," *Nature*, Apr. 20, 1995, 374, 709-711.

Wang et al., "Correlations between liquid crystal director reorientation and optical response time of a homeotropic cell," *J. Appl. Phys.*, May 15, 2004, 95(10), 5502-5508.

West et al., "Colloidal particles at a nematic-isotropic interface: Effects of confinement," *Eur. Phys. J. E*, 2006, 20, 237-242. Published online Jun. 22, 2006.

Williams et al., "Electro-optical and nonlinear optical properties of semiconductor nanorod doped liquid crystals," *Proc. SPIE*, 2005, 5936, 593613(1-6).

Wu et al., "Physical-properties of chlorinated liquid crystals," *Liq. Cryst.*, Nov. 1991, 10(5), 635-646.

Wuelfing et al., "Electronic conductivity of solid-state, mixed-valent, monolayer-protected Au clusters," *J. Am. Chem. Soc.*, 2000, 122(46), 11465-11472. Published online Nov. 5, 2000.

Yamamoto et al., "Direct observation of the ferromagnetic spin polarization in gold nanoparticles: A review," *Rev. Adv. Mater. Sci.*, 2006, 12, 23-32.

Yao et al., "Large optical activity of gold nanocluster enantiomers induced by a pair of optically active penicillamines," *J. Am. Chem. Soc.*, 2005; 127(44):15536-15543. Published online Oct. 13, 2005.

Yoshikawa et al., "Frequency modulation response of a tunable birefringent mode nematic liquid crystal electrooptic device fabricated by doping nanoparticles of Pd covered with liquid-crystal molecules," *Jpn. J. Appl. Phys.*, 2002, 41 (Part 2, No. 11B), 1315-1317.

Zapotacky et al., "Particle-stabilized defect gel in cholesteric liquid crystals," *Science*, Jan. 8, 1999, 283, 209-212.

International Search Report and Written Opinion from PCT application No. PCT/CA2008/000826; 10 pgs. Dated Aug. 18, 2008.

International Search Report and Written Opinion from PCT application No. PCT/CA2007/000046; 10 pgs. Dated May 2, 2007.

* cited by examiner

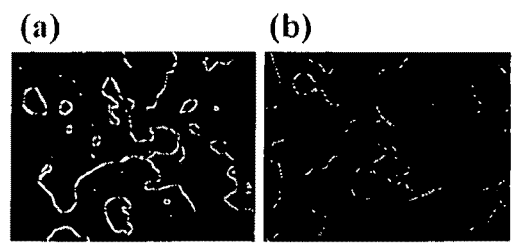
FIG. 17
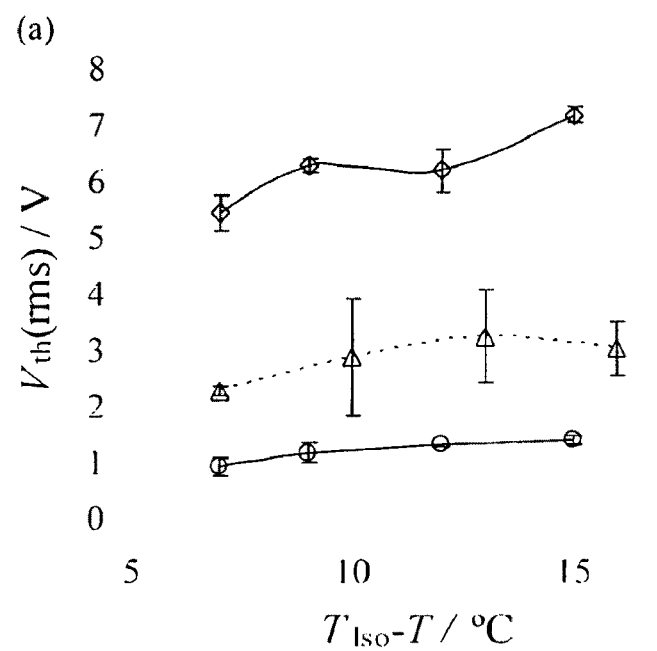
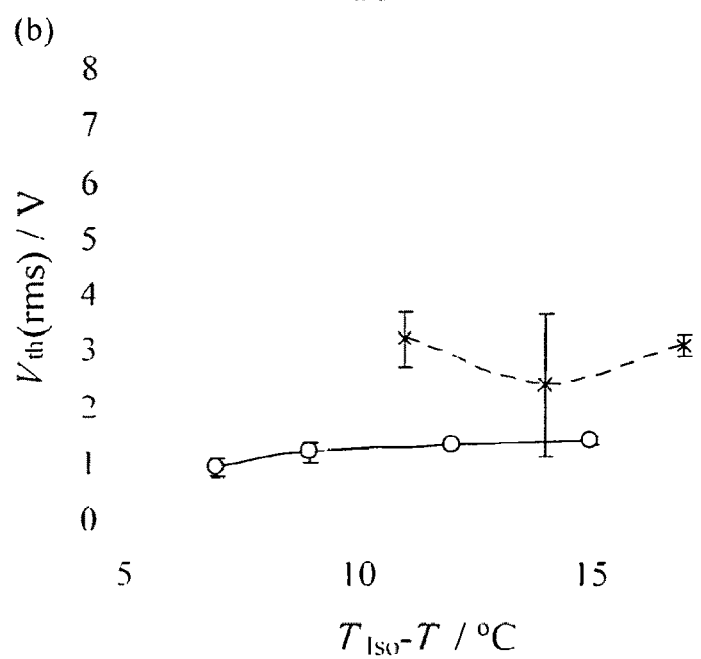
FIG. 18

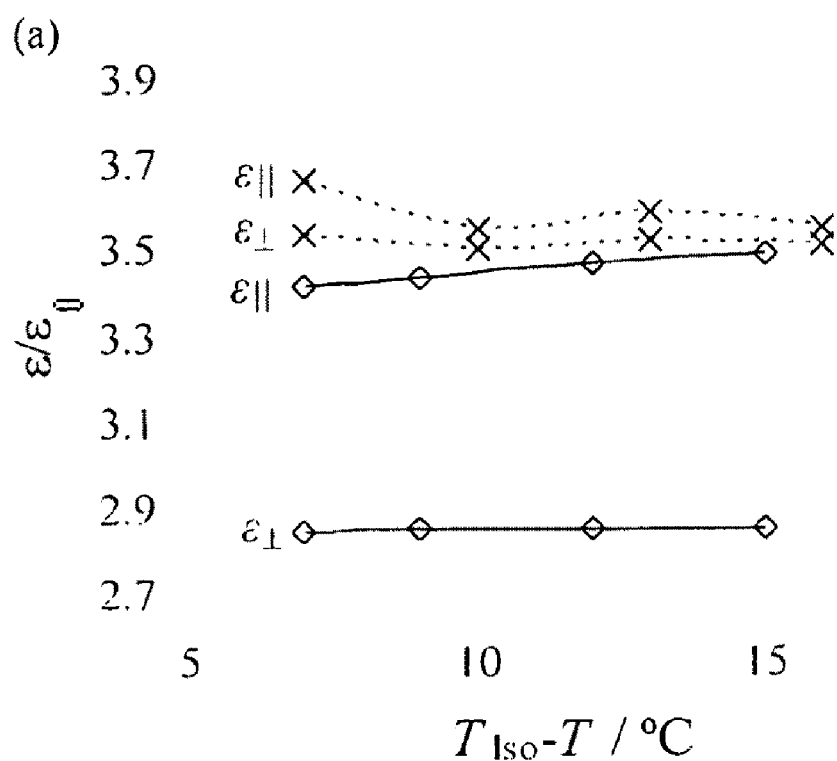
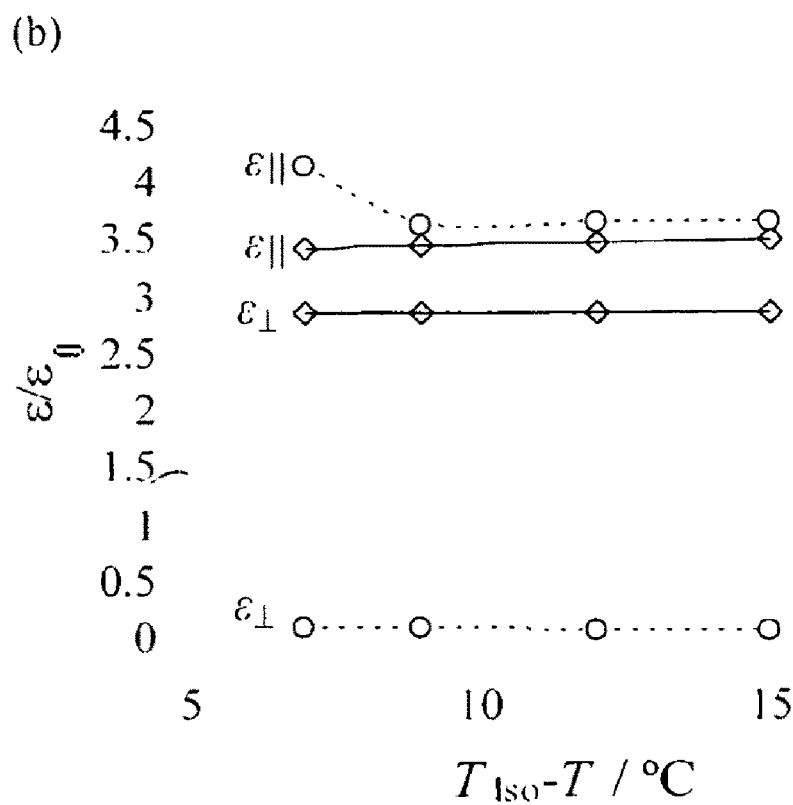
FIG. 19

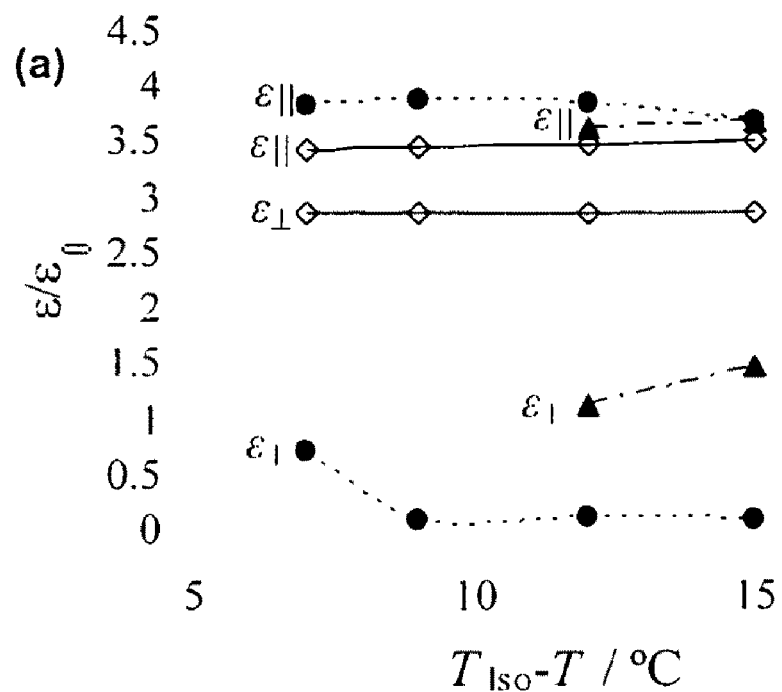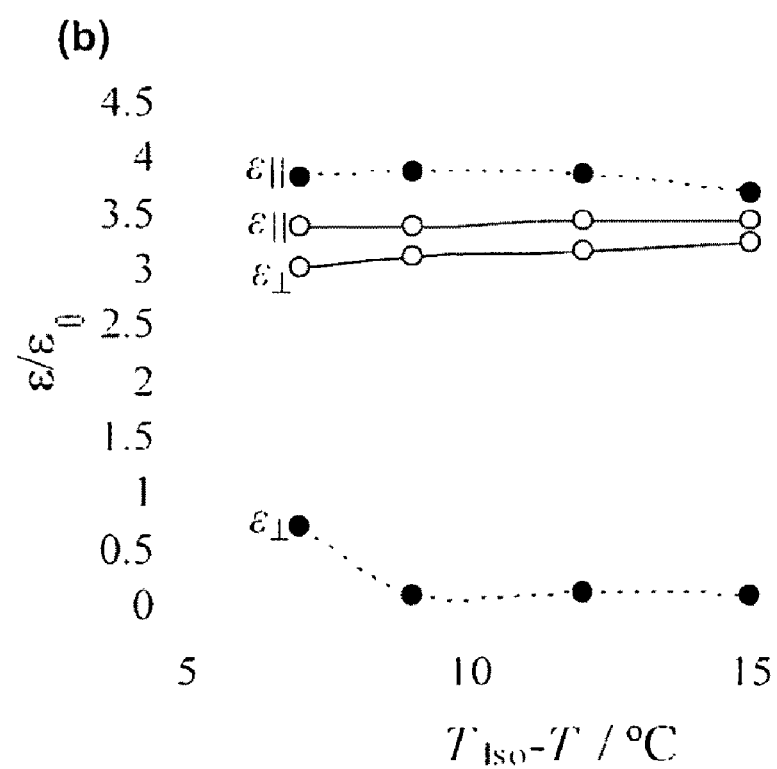
FIG. 21

PLANAR NEMATIC LIQUID CRYSTAL CELLS DOPED WITH NANOPARTICLES AND METHODS OF INDUCING A FREEDERICKSZ TRANSITION

CROSS-REFERENCE TO RELATED APPLICATIONS

This application is the §371 U.S. National Stage of International Application No.
PCT/CA2008/000826, filed May 2, 2008, published in the English language on Nov. 13, 2008 as International Publication No. WO 2008/134866, which claims the benefit of U.S. Provisional Application Ser. Nos. 60/927,417, filed on May 3, 2007, 60/997,962, filed on Oct. 4, 2007, and 61/008,040, filed on Dec. 18, 2007, all of which are incorporated herein by reference in their entireties.

BACKGROUND OF THE INVENTION

Nematic liquid crystals (N-LCs) are one-dimensionally ordered fluids commonly formed by rod-shaped molecules. The response of a nematic liquid crystal (N-LC) to an applied electric field is an important property used in many device and display applications. (Tarumi et al., "Recent liquid crystal material development for active matrix displays," *Ann. Rev. Mater. Sci.*, 27, 423-441 (1997).) The ability of the director (parallel to the long molecular axis for a rod-like N-LC) to align along an external field is caused by, for example, the electric nature of the molecules. In the absence of external perturbations, the director of an N-LC is free to assume any orientation, but may be forced to point into a specific direction using planar (Toney et al., "Near-surface alignment of polymers in rubbed films," *Nature*, 374, 709-711 (1995)) or homeotropic alignment layers (Sonin, *The surface physics of liquid crystals*, Gordon & Breach, Luxembourg (1995)). Depending on, for example, initial alignment conditions, sign of the dielectric anisotropy, as well as electric field direction and strength, different director configurations can be induced. (Frisken et al., "Freedericksz transition in nematic liquid crystals: The effects of an in-plane electric field," *Phys. Rev. A*, 40, 6099-6102 (1989) and Wang et al., "Correlations between liquid crystal director reorientation and optical response time of a homeotropic cell," *J. Appl. Phys.*, 95, 5502-5508 (2004).) This may be used to create a potential impact on current LC display technologies and N-LC optical biosensor design.

SUMMARY OF THE INVENTION

According to one aspect of the present invention, there is provided a planar nematic liquid crystal cell having a cell gap of less than 7.0 microns and including: a colloidal suspension that includes: a non-chiral nematic liquid crystal with positive dielectric anisotropy; and no greater than 10 wt-% (weight percent) of gold nanoclusters, based on the total weight of the liquid crystal and nanoclusters, wherein the gold nanoclusters include non-chiral alkylthiol ligands and have an average size of no greater than 10 nanometers (nm); and one or more optional alignment layers.

According to another aspect of the present invention, there is provided a planar nematic liquid crystal cell including: a colloidal suspension that includes: a nematic liquid crystal with positive dielectric anisotropy and silver nanoclusters that include non-chiral alkylthiol ligands; and one or more optional alignment layers.

According to another aspect of the present invention, there is provided a planar nematic liquid crystal cell including: a colloidal suspension that includes: a nematic liquid crystal with positive dielectric anisotropy and cadmium telluride (CdTe) nanoclusters (e.g., CdTe quantum dot nanoclusters) that include non-chiral alkylthiol ligands; and one or more optional alignment layers.

According to another aspect of the present invention, there is provided a method of inducing a Freedericksz transition, the method including: providing a planar nematic liquid crystal cell having a cell gap of less than 7.0 microns and including: a colloidal suspension that includes: a non-chiral nematic liquid crystal with positive dielectric anisotropy; and no greater than 10 wt-% of gold nanoclusters, based on the total weight of the liquid crystal and nanoclusters, wherein the gold nanoclusters include non-chiral alkylthiol ligands and have an average size of no greater than 10 nm; and one or more optional alignment layers; and applying an electric field across the cell to reorient the liquid crystal molecules, wherein the electric field is above the threshold field.

According to another aspect of the present invention, there is provided a method of inducing a Freedericksz transition, the method including: providing a planar nematic liquid crystal cell including: a colloidal suspension that includes: a nematic liquid crystal with positive dielectric anisotropy; and silver nanoclusters that include non-chiral alkylthiol ligands; and one or more optional alignment layers; and applying an electric field across the cell to reorient the liquid crystal molecules, wherein the electric field is above the threshold field.

According to another aspect of the present invention, there is provided a method of inducing a Freedericksz transition, the method including: providing a planar nematic liquid crystal cell including: a colloidal suspension that includes: a nematic liquid crystal with positive dielectric anisotropy; and cadmium telluride (CdTe) nanoclusters (e.g., CdTe quantum dot nanoclusters) that include non-chiral alkylthiol ligands; and one or more optional alignment layers; and applying an electric field across the cell to reorient the liquid crystal molecules, wherein the electric field is above the threshold field.

According to another aspect of the present invention, there is provided a method of controlling the alignment of a liquid crystal, the method including: filling a liquid crystal cell including one or more optional alignment layers with a mixture that includes an isotropic liquid crystal and gold nanoclusters, wherein the nanoclusters include non-chiral alkylthiol ligands; and cooling the mixture below the liquid crystal isotropic-nematic phase transition temperature.

According to another aspect of the present invention, there is provided a method of controlling the alignment of a liquid crystal, the method including: filling a liquid crystal cell including one or more optional alignment layers with a mixture that includes an isotropic liquid crystal and silver nanoclusters, wherein the nanoclusters include non-chiral alkylthiol ligands; and cooling the mixture below the liquid crystal isotropic-nematic phase transition temperature.

According to another aspect of the present invention, there is provided a method of controlling the alignment of a liquid crystal, the method including: filling a liquid crystal cell including one or more optional alignment layers with a mixture that includes an isotropic liquid crystal and CdTe nanoclusters, wherein the nanoclusters include non-chiral alkylthiol ligands; and cooling the mixture below the liquid crystal isotropic-nematic phase transition temperature.

Preferably, the nanoclusters include $C_{4-18}$ alkyl groups, more preferably hexanethiol to octadecanethiol groups.

Preferably, the nematic liquid crystal is axial, biaxial, or discotic. Exemplary such liquid crystals include Felix-2900-03 or a cyanobiphenyl derivative.

Preferably, the nanoclusters are present in the suspension in an amount of at least 0.1 wt-%, and more preferably at least 5 wt-%, based on the total weight of the liquid crystal and nanoclusters.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention. As used herein, "a," "an," "the," "at least one," and "one or more" are used interchangeably.

As used herein, the term "or" is generally employed in its sense including "and/or" unless the content clearly dictates otherwise.

The term "and/or" means one or all of the listed elements or a combination of any two or more of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DESCRIPTION OF THE DRAWINGS

In the accompanying drawings, which illustrate an exemplary embodiment of the present invention:

FIG. 17 shows polarized optical photomicrographs of the homeotropic alignment+birefringent stripes of Felix-2900-03 doped with 5 wt-% of: (a) hexane thiolate-capped Ag nanoclusters (size: 4.2±0.7 nm), (b) hexane thiolate-capped CdTe quantum dots (size: 3.9±0.3 nm).

FIG. 18 shows plots of $V_{th}$(rms) vs. $T_{Iso}$-T: (a) ◇ pure Felix-2900-03, ∆ Felix-2900-03 doped with 5 wt-% Au2, ○ Felix-2900-03 doped with 10 wt-% Au3, (b) x Felix-2900-03 doped with 10 wt-% Au2, ○ Felix-2900-03 doped with 10 wt-% Au3.

FIG. 19 shows plots of the dielectric constants ($\in/\in_0$) both along ($\in_\parallel$) and across ($\in_\perp$) the long molecular axis vs. $T_{Iso}$-T: (a) ◇ pure Felix-2900-03, x Felix-2900-03 doped with 5 wt-% Au2, (b) ◇ pure Felix-2900-03, ○ Felix-2900-03 doped with 10 wt-% Au3.

FIG. 20 shows plots of (a) $V_{th}$(rms) vs. $T_{Iso}$-T of cells treated with cooling at field-OFF: ◇ pure Felix-2900-03, □ Felix-2900-03 doped with 5 wt-% Au1, ● Felix-2900-03 doped with 5 wt-% Ag1, ▲ Felix-2900-03 doped with 10 wt-% Ag1, (b): ● Felix-2900-03 doped with 5 wt-% Ag1 treated with cooling at field-ON, ○ Felix-2900-03 doped with 5 wt-% Ag1 treated with cooling at field-ON.

FIG. 21 shows plots of the dielectric constants ($\in/\in_0$) both along ($\in_\parallel$) and across ($\in_\perp$) the long molecular axis vs. $T_{Iso}$-T: (a) ◇ pure Felix-2900-03, ● Felix-2900-03 doped with 5 wt-% Ag1, ▲ Felix-2900-03 doped with 10 wt-% Ag1, (b) ● Felix-2900-03 doped with 5 wt-% Ag1 of cells treated with cooling at field-OFF, ○ Felix-2900-03 doped with 5 wt-% Ag1 of cells treated with cooling at field-ON.

DETAILED DESCRIPTION OF ILLUSTRATIVE EMBODIMENTS OF THE INVENTION

Figure 1:
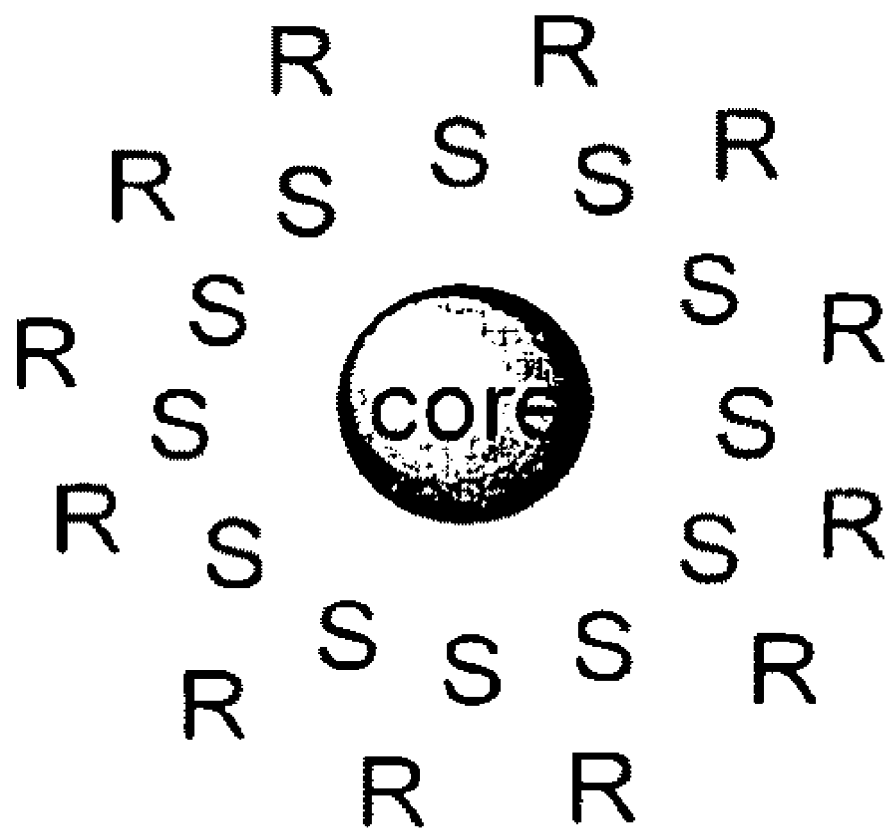
FIG. 1 is a schematic of the structure of an alkyl-thiolate functionalized nanoparticle, as further described herein.

The present invention provides nematic liquid crystal cells including colloidal suspensions (i.e., dispersions) that include N-LCs with positive dielectric anisotropy doped with nanoclusters (i.e., nanoparticles). For example, gold nanoclusters, having non-chiral alkylthiol ligands, doped into N-LCs with positive dielectric anisotropy may give rise to unprecedented dual alignment mode and electro-optic response with a potential impact on current LC display technologies and N-LC optical biosensor design. By fine-tuning of experimental conditions (temperature, electric field, alignment), N-LCs doped with nanoclusters (e.g., gold nanoclusters) can be electrically reoriented and aligned either like N-LCs with a positive dielectric anisotropy in a planar cell or alternatively as N-LCs with a negative dielectric anisotropy in a homeotropic cell.

Accordingly, one or more embodiments of the present invention provide an N-LC cell that includes a colloidal suspension of a non-chiral nematic liquid crystal and gold nanoclusters, wherein the gold nanoclusters include non-chiral alkylthiol ligands.

Some embodiments of the present invention provide an N-LC cell that includes a colloidal suspension of a nematic liquid crystal and silver nanoclusters, wherein the silver nanoclusters include non-chiral alkylthiol ligands. The colloidal suspension may include a non-chiral nematic liquid crystal and silver nanoclusters.

Some embodiments of the present invention provide an N-LC cell that includes a colloidal suspension of a nematic liquid crystal and cadmium telluride nanoclusters. A colloidal suspension may include a non-chiral nematic liquid crystal. The cadmium telluride nanoclusters include non-chiral alkylthiol ligands.

In one or more embodiments, the cadmium telluride nanoclusters may be cadmium telluride quantum dots. A "quantum dot" is a semiconductor nanoparticle that can confine the motion of electrons or holes in all three spatial dimensions. In contrast, for example, quantum wires confine the motion of electrons in two spatial dimensions while allowing free movement in the third dimension. Quantum dots may be made by, for example, colloidal synthesis, electrochemical techniques, or pyrolytic synthesis. "Nanocluster" and "nanoparticle," as used herein, are synonymous and include, but are not limited to, quantum dots (e.g., CdTe quantum dots). Such N-LC cells that include the colloidal suspensions (i.e., dispersions) described herein may be used in, for example, an optical device or a switch. Such cells can be used to induce a Freedericksz transition upon the application of an electric field (whether it be alternating or direct current). The electric field used to induce a Freedericksz transition may be of varying frequency or varying wave form.

A variety of suitable liquid crystal cells are suitable for one or more embodiments of the present disclosure. Such cells may or may not include alignment layers. For example, a suitable cell may simply include glass (e.g., only for changing alignment) with a layer of indium tin oxide (ITO) (e.g., the liquid crystal cell includes two parallel glass substrates forming a gap whose inner surfaces are covered with ITO electrodes). Alternatively, a suitable cell can include ITO and a polyimide alignment layer (e.g., with alignment layers of 1-3 degree pre-tilt). Examples of the latter are, for example, commercially available from Displaytech Inc. and Instec. Preferred cells are planar alignment cells with cell gaps of less than 7.0 microns. Commercially available cells may include a cell gap of, for example, 4.0, 5.0, and 6.8 microns. Preferably, the cell includes a cell gap of no greater than 6.8 microns with a particularly preferred cell gap of 5.0 microns. In one or more embodiments, a cell gap of 9.0 microns may not produce the different (i.e., homeotropic) alignment at lower particle concentrations (e.g., about 5 wt-% or less).

In one or more embodiments, the nematic liquid crystal in the colloidal suspension may optionally be a non-chiral nematic liquid crystal. Examples of non-chiral nematic liquid crystals include uniaxial, biaxial, or discotic N-LCs. In one or more preferred embodiments, the liquid crystal may be Felix-2900-03, a cyanobiphenyl derivative, or other nematic LCs or LC mixtures. In certain embodiments, a cyanobiphenyl derivative includes, but is not limited to, 4'-n-pentyl-4-cyanobiphenyl (5CB), 4'-n-octyl-4-cyanobiphenyl (8CB), or 4'-n-octyloxy-4-cyanobiphenyl (8OCB). The structures of Felix-2900-3, 5CB, and 8CB are shown here:

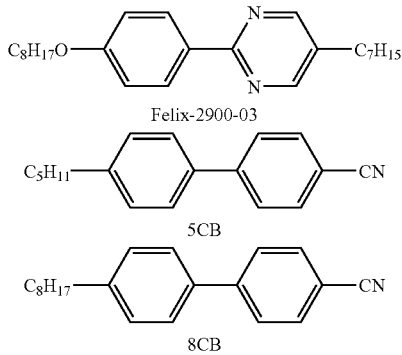

(Dark et al., Rotational viscosity and molecular structure of nematic liquid crystals. *Liq. Cryst.*, 33, 67-73 (2006).)

Table 1 provides the phase transition temperatures, dielectric anisotropy values of some nematic liquid crystals suitable for one or more embodiments of the present invention.

TABLE 1

| N-LC | Phase Transition Temperatures | Dielectric Anisotropy Values | Threshold Field $V_{th}$(rms) |
|---|---|---|---|
| Felix-2900-3 | Cr 52 (SmA 45) N 70 Iso | $\Delta\epsilon = 0.62$** | 6.3** |
| 5CB | Cr 22.5 N 35 Iso | $\Delta\epsilon = 11.0$* | 0.7* |
| 8CB | Cr 22 SmA 32.5 N 40 Iso | $\Delta\epsilon = 7.7$** | 1.35** |

*at $T/T_{Iso} = 0.965$
**at $T/T_{Iso} = 0.95$
(Abe et al., "Dielectric and fluorescence study on phase transitions in liquid crystal 5CB and 8CB", J. Korean Phys. Soc., 46, 220-223 (2005).) As used herein, $T_{Iso}$ represents the isotropic-nematic phase transition temperature, which is also referred to herein as the "clearing point." Other symbols for this parameter, such as $T_{Iso}$-N, $T_{Iso/N}$, and $T_{NI}$ will be apparent to those skilled in the art.

In one or more embodiments of the present disclosure, the nematic liquid crystal in the colloidal suspension may optionally be a chiral nematic liquid crystal. Such a chiral nematic liquid crystal (N*-LC) may be intrinsically chiral (i.e., including chiral nematic liquid crystal molecules) or may be liquid crystal having a chiral phase induced via a chiral dopant. In one or more embodiments, the nematic liquid crystal may include a pure nematic liquid crystal or mixtures of nematic liquid crystals. Such nematic liquid crystals or mixtures of nematic liquid crystals may have positive dielectric anisotropy (i.e., $\Delta\epsilon > 0$) or negative dielectric anisotropy (i.e., $\Delta\epsilon < 0$), as are further described herein.

In one or more embodiments (particularly in which gold nanoclusters are present in the liquid crystal cell), the use of cyanobiphenyls (common nematic liquid crystals) may result in a higher compatibility between metal nanoparticles and the liquid crystal host due to the liquid crystal functionalization of the nanoclusters' (particularly that of gold) surface maximizing interactions between the two components.

In one or more embodiments of the present invention, the colloidal suspensions include no greater than 10 percent by weight (wt-%) nanoclusters (e.g., gold nanoclusters, silver nanoclusters, or CdTe nanoclusters), based on the total weight of the liquid crystal and nanoclusters. Preferably, the colloidal suspension includes no greater than 9 wt-% nanoclusters, more preferably no greater than 8 wt-%, even more preferably no greater than 7 wt-%, and even more preferably no greater than 6 wt-%, based on the total weight of the liquid crystal and nanoclusters. Preferably, the colloidal suspension includes at least 0.1 wt-% nanoclusters (e.g., gold nanoclusters, silver nanoclusters, or CdTe nanoclusters), more preferably at least 0.5 wt-%, even more preferably at least 1 wt-%, even more preferably at least 2 wt-%, even more preferably at least 3 wt-%, even more preferably at least 4 wt-%, and even more preferably at least 5 wt-%, based on the total weight of the liquid crystal and nanoclusters. In certain embodiments, the amount of nanoclusters is from 1 wt-% to 10 wt-%, from 2 wt-% to 10 wt-%, from 3 wt-% to 10 wt-%, from 4 wt-% to 10 wt-%, from 5 wt-% to 10 wt-%, from 5 wt-% to 9 wt-%, from 5 wt-% to 8 wt-%, from 5 wt-% to 7 wt-%, or from 5 wt-% to 6 wt-%, based on the total weight of the liquid crystal and nanoclusters. A concentration of nanoclusters (particularly for gold) of greater than 10 wt-% may result in undesirable aggregation.

The average size (i.e., largest dimension of a cluster, which is the diameter of a sphere) of the nanoclusters (e.g., gold nanoclusters, silver nanoclusters, or CdTe nanoclusters) described herein is no greater than 10 nanometers (nm). Unless otherwise noted herein, the average size of nanoclusters provided is the average size of the cores (e.g., gold cores, silver cores, or CdTe cores) of the nanoclusters, wherein the measurement of size does not include the ligands attached to the cores. The average size of nanoclusters can be measured using techniques that utilize, for example, x-ray scattering and/or transmission electron microscopy. Preferably, the average size of nanoclusters (e.g., gold nanoclusters, silver nanoclusters, or CdTe nanoclusters) is no greater than 9 nm, more preferably no greater than 8 nm, even more preferably no greater than 7 nm, even more preferably no greater than 6 nm, and even more preferably no greater than 5 nm. Preferably, the average size of the nanoclusters (e.g., gold nanoclusters, silver nanoclusters, or CdTe nanoclusters) is at least 1 nm, more preferably at least 2 nm, even more preferably at least 3 nm, and even more preferably at least 4 nm. For certain embodiments, the average size is from 1 nm to 9 nm, from 1 nm to 8 nm, from 1 nm to 7 nm, from 1 nm to 6 nm, from 1 nm to 5 nm, from 1 nm to 4 nm, from 1 nm to 3 nm, from 1 nm to 2 nm. An average size of nanoclusters (particularly for gold) of greater than 10 nm may result in undesirable settling of the nanoclusters.

The nanoclusters (e.g., gold nanoclusters, silver nanoclusters, or CdTe nanoclusters) include ligands having alkylthiol groups. Preferably, ligands on a nanocluster may collectively provide, for example, a monolayer, which may be a pure monolayer or a mixed monolayer, as described below. For the present invention, the alkylthiol groups are non-chiral groups; rather, the groups may induce a local chiral effect (e.g., may induce a local chiral twist of the director configuration). The local chiral effect produced by the alkylthiol protected nanoparticles is a result of a local twist of the director (coinciding with the long molecular axis of the nematic LC). The alkylthiol groups preferably include an aliphatic group (e.g., $C_{4-18}$ alkyl group). For example, nanoclusters may include $C_{4-18}$ thiolate groups that are preferably hexanethiol to dodecanethiol groups. A schematic of an alkylthiolate functionalized nanoparticle is shown in FIG. 1.

As used herein, a nanocluster having a "pure monolayer" is a nanocluster having a core with a single type of ligand. A nanocluster having a "mixed monolayer" is a nanocluster having a core with ligands that are not all the same. Preferably, each individual core is completely covered (i.e., completely functionalized) with ligands. As used herein, "completely covered" means coated with a monolayer of ligands. As used herein, a gold or silver nanocluster that is "capped" is a nanocluster having a gold or silver core completely covered with a monolayer that includes one specified ligand or ligand group. For example, an alkylthiol-capped nanocluster is a nanocluster having a core completely covered with alkylthiol ligands. In another example, a hexanethiol-capped nanocluster is a nanocluster having a core completely covered with hexanethiol ligands. In certain embodiments that include gold or silver nanoclusters, the nanoclusters can be alkylthiol-capped nanoclusters. However, as used herein, a CdTe nanocluster that is "capped" is a nanocluster having a CdTe core completely covered with a specified ligand or ligand group in a mixed monolayer that further includes, for example, thioglycolic acid ligands. For example, an alkylthiol-capped CdTe nanocluster is a nanocluster having a core completely covered with a mixed monolayer that contains alkylthiol ligands and thioglycolic acid ligands.

In one or more embodiments, gold nanoclusters or silver nanoclusters may include non-chiral alkylthiol ligands in a mixed monolayer. In certain embodiments, gold or silver nanoclusters may include alkylthiol groups having one or more fluoride atoms. For example, in one or more embodiments, gold or silver nanoclusters may include ligands of the formula $S(CH_2)_n(CF_2)_3CF_3$, wherein n=2 or 3, and wherein the ligands may be in a pure monolayer or a mixed monolayer with, for example, alkylthiol ligands (e.g., hexanethiol or dodecanethiol ligands). In one or more embodiments, gold or silver nanoclusters may include, for example, liquid crystal ligands bonded to a sulfur atom bonded to the gold or silver nanocluster core. For example, a liquid crystal ligand may be, for example, a cyanobiphenyl ligand (e.g., a 4-cyano-4'-decyloxybiphenyl ligand), bonded to a sulfur atom bonded to the nanocluster core. In one or more embodiments, a 4-cyano-4'-decyloxybiphenylthiol ligand may be in a pure monolayer or in a mixed monolayer with, for example, alkylthiol ligands (e.g., hexanethiol or dodecanethiol ligands).

In certain embodiments, liquid crystal cells, using nematic liquid crystals (in certain embodiments, non-chiral nematic liquid crystals) and non-chiral nanoclusters (i.e., nanoclusters with non-chiral ligands) can be used to induce a Freedericksz transition upon the application of an electric field. The electric field can be of a variety of wave forms and a variety of frequencies. In one or more embodiments of the present invention, the applied electric field is above the threshold electric field. The applied electric may be applied across the cell in order to reorient the LC molecules.

In one embodiment, the present invention provides a method of inducing a Freedericksz transition that includes providing a nematic liquid crystal cell and applying an electric field that is above the threshold field across the cell to reorient the LC molecules. The electric field may be of varying frequency or varying wave form. The nematic liquid crystal cell may be planar and may have a cell gap of less than 7.0 microns. According to one or more embodiments, a planar nematic liquid crystal cell includes a colloidal suspension and may or may not include alignment layers. A colloidal suspension may include a nematic liquid crystal with positive dielectric anisotropy and nanoclusters (e.g., gold nanoclusters, silver nanoclusters, or CdTe nanoclusters).

Figure 2:
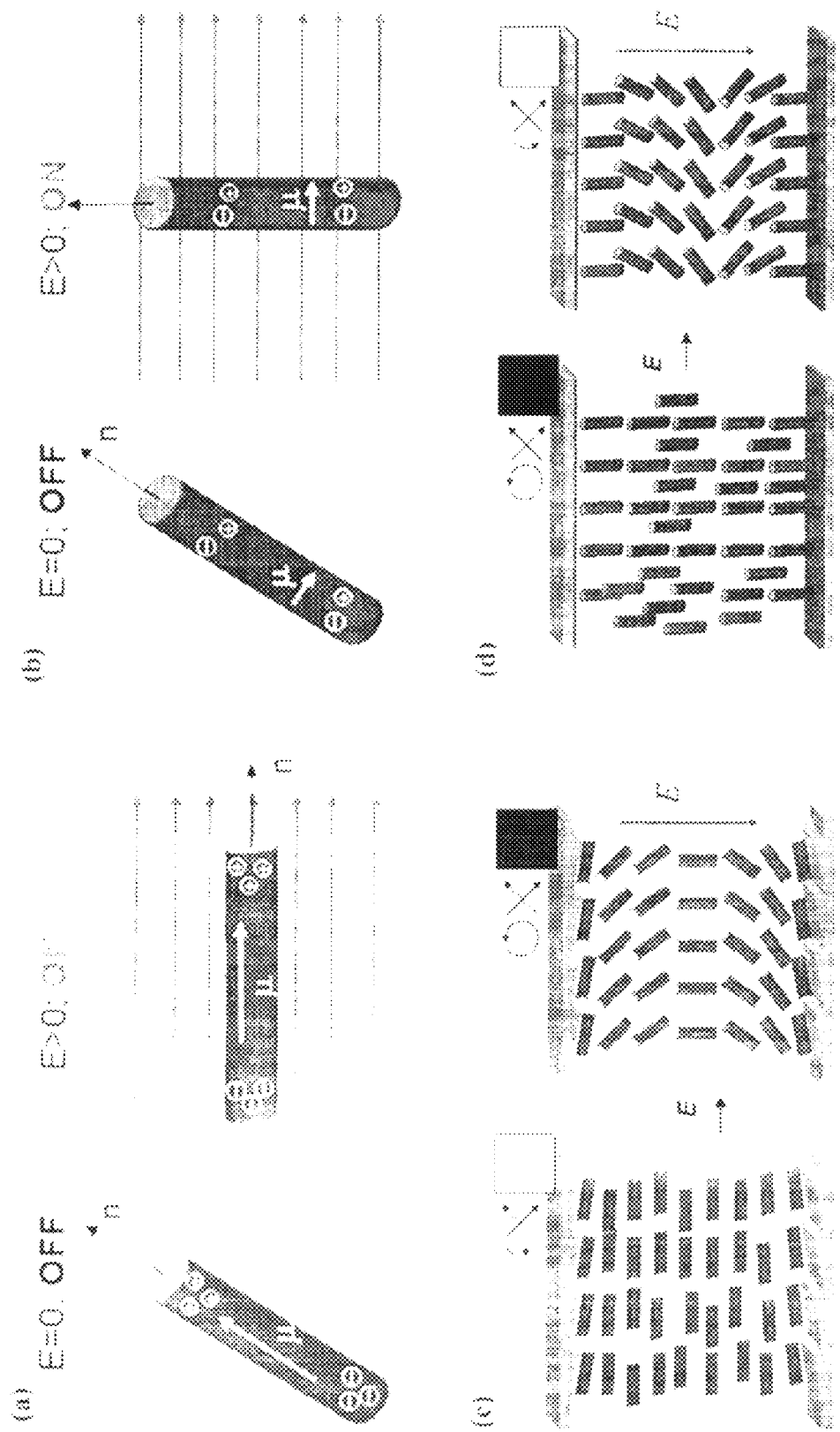
FIGS. 2a-2d illustrate schematic representations of the response of an N-LC to an applied electric field as further described herein.

Referring to FIG. 2, the N-LC phase is characterized by molecules that have no positional order but tend to orient, on the time average, in the same direction (along the director, n). Two major types of N-LCs can be distinguished that are currently used in different LC display technologies. N-LC molecules can possess a permanent or induced dipole either along (used in twisted nematic, TN cells (Schadt, "Liquid crystal materials and liquid crystal displays," *Ann. Rev. Mater. Sci.*, 27, 305-379 (1997))) or across the long molecular axis (used in vertical alignment, VA mode displays) (Hong et al., "Extraordinarily high-contrast and wide-view liquid crystal displays," *Appl. Phys. Lett.*, 86, 121107-121109 (2005)). Upon applying an electric field above a certain electric field threshold ($E>E_{th}$), if the dipole moment, μ, is parallel (or almost parallel) to the long molecular axis, then the N-LC possesses positive dielectric anisotropy, $\Delta\in>0$ (i.e., $\in_\parallel>\in_\perp$), and the director tends to orient along the electric field, E, direction represented by the series of parallel lines (FIG. 2a). If the molecules' dipole moments, μ, are more or less normal to the long molecular axis, the N-LC possesses a negative dielectric anisotropy, $\Delta\in<0$ (i.e., $\in_\parallel<\in_\perp$), and the director tends to orient perpendicular to E (FIG. 2b).

The orientational order of the N-LC molecules does not change in an applied electric field, but the collective response to E causes a director reorientation (or distortion). Hence, the larger the dielectric anisotropy, $\Delta\in$, the smaller electric field is needed to reorient the molecules. This competition between different director orientations produced by surface anchoring (planar using polyimide alignment layers, or homeotropic using surfactants) and electric field effects (FIGS. 2c, 2d) is in fact what is greatly exploited in LC display and other optical devices. (Schadt, "Liquid crystal materials and liquid crystal displays," *Ann. Rev. Mater. Sci.*, 27, 305-379 (1997) and Hong et al., "Extraordinarily high-contrast and wide-view liquid crystal displays," *Appl. Phys. Lett.*, 86, 121107-121109 (2005).) The occurrence of such a change from an aligned to a deformed state, which can also be produced by applying a magnetic field of sufficient strength, is termed Freedericksz transition (Freedericksz et al., "Über die Orientierung anisotroper Füssigkeiten in dünnen Schichten," *Phys. Z. Sow.*, 6, 490-504 (1934)) and led to the discovery of so-called quasi-Freedericksz type displays (Sage, In *Handbook of Liquid Crystals*, Wiley-VCH, Weinheim, Demus et al. (Eds.), vol. 1, pp. 731-762, (1998)).

Specifically, FIG. 2 illustrates a schematic representation of the response of an N-LC to an applied electric field. FIG. 2a, the N-LC molecule, as mentioned above, has no positional order but tends to orient, on the time average, in the same direction (along the director, n). The N-LC in FIG. 2a has positive dielectric anisotropy because the dipole moment, μ, is parallel (or almost parallel) to the long molecular axis. Upon applying an electric field above a certain electric field threshold ($E>E_{th}$), the director of the N-LC having positive dielectric anisotropy, $\Delta\in>0$ (i.e., $\in_\parallel>\in_\perp$) tends to orient along the direction of the applied electric field, E. Therefore, FIG. 2a shows the director reorientation of an N-LC with positive dielectric anisotropy ($\Delta\in>0$).

In FIG. 2b, the molecules' dipole moments, μ, are more or less normal to the long molecular axis of the N-LC, so the N-LC possesses a negative dielectric anisotropy, $\Delta\in<0$ (i.e., $\in_\parallel<\in_\perp$), and the director tends to orient perpendicular to the applied electric field, E. Therefore, FIG. 2b shows the director reorientation of an N-LC with negative dielectric anisotropy ($\Delta\in<0$).

In FIG. 2c schematically illustrates the electric Freedericksz effect of an N-LC with $\Delta\in>0$ in a planar N-LC cell. In the field-OFF state, uniform planar alignment is observed (due to rubbing induced anisotropic dispersion interactions between N-LC molecules and oriented polyimide polymer chains (Toney et al., "Near-surface alignment of polymers in rubbed films," *Nature*, 374, 709-711 (1995))). Applying an electric field above the threshold field ($E>E_{th}$) results in collective reorientation to a bulk homeotropic orientation.

FIG. 2d schematically illustrates the electric Freedericksz effect of an N-LC with $\Delta\in<0$ in a homeotropic N-LC cell. In the field-OFF state, uniform homeotropic alignment is found (due to interactions with surfactant molecules on the glass surface). In the field-ON state with $E>E_{th}$, collective reorientation gives rise to bulk planar or tilted (splay) orientation.

The cartoon above each schematic illustration in FIGS. 2c and 2d (and FIGS. 12 and 13 discussed herein) demonstrates the optical output through crossed polarisers (crossed arrows): black square=homeotropic, white square=birefringent; the rounded arrows show if the particular N-LC orientation can be brought into an extinction position (director parallel to either polariser) by rotating the sample between crossed polarisers (a full 360° rounded arrow indicates continuous extinction, or no change in birefringence).

In one or more embodiments of the present invention, above a certain gold nanocluster concentration in N-LCs (approximately 5 wt-%), upon moderately slow cooling from the isotropic liquid phase (at 1° C. min$^{1}$), the reproducible formation of thin film textures consisting of birefringent stripe domains due to the formation of linear nanoparticle aggregates (and/or surface inversion walls) may be observed. For mixtures containing the alkyl thiolate-capped Au nanoclusters (e.g., hexane- and dodecane-thiolate capped Au nanoclusters) at the indicated cooling rate, these stripe domains, likely located in near interface areas of the LC film, are separated by dark domains with homeotropic alignment of the N-LC molecules (slower cooling rates can exclusively produce stripe domains (Qi et al., "Formation of periodic stripe patterns in nematic liquid crystals doped with functionalized gold nanoparticles," *J. Mater. Chem.*, 16, 4197-4205 (2006))). The homeotropic alignment in these domains may be easily identified by rotating the sample between crossed polarisers showing no birefringence. Although not wanting to be limited by theory, it is believed that given the energetically preferred planar alignment of rod-like N-LCs on untreated glass surfaces, these domains are then the result of gold nanoclusters residing at the N-LC/glass interfaces similar to the fingerprint mimicking effect of surfactant-coated Pt nanoclusters. (Mitov et al., "Long-range structuring of nanoparticles by mimicry of a cholesteric liquid crystal," *Nat. Mater.*, 1, 229-231 (2002).) Surprisingly, at the same concentration of 5 wt-% of the gold nanoclusters in the N-LCs, the same textural features were also detected for samples sandwiched between commercial indium tin oxide (ITO) coated glass cells (LC test cells, cell gap: 5 microns each) with parallel or antiparallel polyimide alignment layers favouring planar orientation of the N-LC molecules with respect to the director.

A typical process of producing a gold nanoparticle may include providing a solution comprising $HAuCl_4$ and a compound having a non-chiral thiolate group; and reducing the $HAuCl_4$ with a reducing agent. For example, the compound having a non-chiral thiolate group may be a compound having hexanethiol or dodecanethiol. The reducing agent may be, for example, a complex hydride such as $NaBH_4$ or $LiAlH_4$. The solvent used for the solution comprising $HAuCl_4$ and a compound having a chiral group may be tetrahydrofuran, toluene, hexane or a mixture thereof. The solution may also be biphasic requiring the use of a phase transfer agent.

Silver nanoparticles can be prepared by adapting the procedure used for the gold nanoparticles according to the Choo et al. method. (Choo et al., "Synthesis of mixed monolayer-protected gold clusters from thiol mixtures: Variation in the tail group, chain length, and solvent," *Langmuir*, 19, 8555-8559 (2003); and Brust et al., "Synthesis of thiol-derivatised gold nanoparticles in a two-phase liquid-liquid system,"*J. Chem. Soc. Chem. Commun.*, 801-802 (1994)). The Choo et al. method can be adapted according to a procedure reported by Ahonen et al. (Ahonen et al., "Formation of stable Ag-nanoparticle aggregates induced by dithiol cross-linking,"*J. Phys. Chem. B*, 110, 12954-12958 (2006)). In accordance with the adapted procedure of Ahonen et al., $AgNO_3$ is used as a starting material instead of $HAuCl_4$.

Cadmium telluride quantum dots, QD1 and QD2, may be prepared according to a procedure established by Weller et al. (Weller et al., "Efficient phase transfer of luminescent thiol-capped nanocrystals: From water to non-polar organic solvents," *Nano. Lett.*, 2, 803-806 (2002)), which includes phase transfer (thiolate exchange) in the final step. Thioglycolic acid capped CdTe quantum dots, initially synthesized by injecting freshly prepared NaHTe into an aqueous solution of $Cd(ClO_4)_2 \cdot 6H_2O$ and refluxing at 105 degrees Celsius, can be transferred into organic-solvent soluble CdTe quantum dots capped mainly with alkyl thiolates via phase transfer.

The phase transfer of initially thioglycolic acid capped CdTe quantum dots using hexane- or dodecane-thiol in acetone may produce mixed monolayer capped CdTe quantum dots, in which not all thioglycolic acid ligands are replaced by hexane- or dodecane-thiolate ligands. It is believed that the ratio of alkylthiol ligands to thioglycolic acid ligands on CdTe nanoparticles may be greater than 1:1, in favour of the alkylthiol ligands.

In one or more embodiments, the ligands on gold and silver nanoparticles may be entirely alkylthiol ligands.

Synthesizing gold nanoparticles following the two-phase Brust-Schiffrin method (which would mean that free thiol and TOAB, which is rather difficult to remove from the Au clusters, would likely be present in the nematic solvent) and filling cells with a mixture containing the nanoclusters in the nematic phase may result in local concentration differences and aggregation of nanoparticles. Optical results with cells may show planar alignment as commonly observed for pure N-LCs in planar cells. This shows that the properties of dispersion of nanoclusters in N-LCs depend on the mixtures as well as on the cell preparation. Preferably, cells are prepared with stable, homogeneous mixtures with concentration differences arising only from interactions of the N-LC molecules with the surface of the, for example, gold nanoclusters (such as linear particle aggregates). Filling the cell gap with the mixture in the isotropic liquid phase may provide stable, homogeneous mixtures with concentration differences arising only from interactions of the N-LC molecules with the surface of the, for example, gold nanoclusters (such as linear particle aggregates).

One or more embodiments of the present invention may be employed for electric far-field spectral tuning of plasmonic resonances (Kossyrev et al., "Electric field tuning of plasmonic response of nanodot array in liquid crystal matrix," *Nano Lett.*, 5, 1978-1981 (2005)) while eliminating the tedious fabrication of, for example, gold nanodot arrays on glass surfaces using nanoporous aluminium membranes as a stencil in e-beam evaporation.

In one or more embodiments, a method of controlling the alignment of a liquid crystal is presented. The method includes tilling a liquid crystal cell as described herein with a mixture that includes a liquid crystal (e.g., a liquid crystal or a mixture of liquid crystals) in the isotropic phase and nanoclusters. Such nanoclusters may be gold, silver, or CdTe nanoclusters and include non-chiral alkylthiol ligands. The method further includes cooling the mixture below the liquid crystal isotropic-nematic phase transition temperature to form a colloidal suspension. In such a method, the liquid crystal cell may include one or more optional alignment layers. In certain embodiments, the alignment of a liquid crystal may be controlled by adding nanoclusters to the liquid crystal, as described herein, which may provide flexibility in the manufacture of liquid crystal cells and, for example, LC devices and displays. For example, the alignment of a liquid crystal that can have a planar alignment may be controlled by the addition of nanoclusters (e.g., gold, silver, or CdTe) to have a homeotropic (vertical) alignment, which may reorient at lower threshold voltages in comparison to the pure liquid crystal.

The liquid crystal cells of the present disclosure may be advantageously used in a wide variety of applications in which liquid crystals are used. Liquid crystal cells having nanoclusters as described herein may require, for example, a reduced energy input (i.e., reduced voltage) to effect a Freedericksz transition, relative to a liquid crystal cell without nanoclusters. For example, a liquid crystal cell of the present disclosure may be used in an electro-optical device or a switch, wherein the device or switch may require, for example, less energy to effect a Freedericksz transition than a device or switch having a liquid crystal cell without nanoclusters. In one or more embodiments, a reduced energy input may be required to switch a pixel of a liquid crystal display on or off. A method of reducing the amount of electric field required for effecting a Freedericksz transition in a nematic cell can include adding nanoclusters to a liquid crystal cell in the isotropic phase, disposing the mixture of liquid crystal and nanoclusters in a liquid crystal cell, and cooling the liquid crystal to the nematic phase.

A method of reducing the intensity of the threshold electric field for effecting a Freedericksz transition of a nematic liquid crystal cell can include adding (e.g., doping) nanoparticles (e.g., gold, silver, or CdTe nanoparticles), as described herein, to a liquid crystal. Reducing the threshold electric field for a Freedericksz transition may reduce the amount of electric power required for one or more applications (e.g., to switch a liquid crystal pixel on or off) that use a liquid crystal cell of the present disclosure.

In one or more embodiments, the methods of the present disclosure may reduce the intensity of backlight required by a liquid crystal display having a nematic liquid crystal that includes nanoparticles (e.g., CdTe nanoparticles).

EXAMPLES

The following examples are provided to illustrate the invention. It will be understood, however, that the specific details given in each example have been selected for the purpose of illustration and are not to be construed as limiting in scope of the invention.

Producing Gold Nanoparticles

The smaller alkyl thiolate capped gold nanoparticles, Au1 and Au2 (approximately 2 nm in diameter), were prepared by a method reported by Choo et al. (Choo et al., "Synthesis of mixed monolayer-protected gold clusters from thiol mixtures: Variation in the tail group, chain length, and solvent," *Langmuir,* 19, 8555-8559 (2003)), which is a modified version of the Brust-Schiffrin method (Brust et al., "Synthesis of thiol-derivatised gold nanoparticles in a two-phase liquid-liquid system," *J. Chem. Soc., Chem. Commun.,* 801-802 (1994)). The modified Brust-Shiffrin method (as presented by Choo et al.) differs from the Brust-Shiffrin method in that the method does not use a biphasic system containing tetraoctylammonium bromide (TOAB) as a phase transfer reagent. A recent study by Dasog et al. on alkyl thiolate capped gold nanoclusters prepared by the two-phase method showed the reduced oxidative stability of the Au nanoclusters in the presence of halide ions introduced by the TOAB. (Dasog et al., "Understanding the oxidative stability of Au MPCs in the presence of halide ions under ambient conditions," *Langmuir,* 23, 3381-3387 (2007).)

The larger dodecane thiolate capped gold nanoparticles, Au3, (5.4±0.9 nm diameter) were synthesized following a procedure reported by Zhong et al. (Zhong et al., "Heating-induced evolution of thiolate-encapsulated gold nanoparticles: a strategy for size and shape manipulations," *Langmuir,* 16, 490-497 (2000)).

Producing Silver Nanoparticles

Silver nanoparticles, Ag1 were prepared by adapting the procedure used for the gold nanoparticles (Choo et al., "Synthesis of mixed monolayer-protected gold clusters from thiol mixtures: Variation in the tail group, chain length, and solvent," *Langmuir,* 19, 8555-8559 (2003); and Brust et al., "Synthesis of thiol-derivatised gold nanoparticles in a two-phase liquid-liquid system," *J. Chem. Soc., Chem. Commun.,* 801-802 (1994)), wherein the method was adapted according to a procedure reported by Ahonen et al. (Ahonen et al., "Formation of stable Ag-nanoparticle aggregates induced by dithiol cross-linking," *J. Phys. Chem. B,* 110, 12954-12958 (2006)). In accordance with the adapted procedure of Ahonen et al., $AgNO_3$ was used as a starting material instead of $HAuCl_4$.

Producing Cadmium Telluride Nanoparticles

Cadmium telluride quantum dots, QD1 and QD2, were prepared according to a procedure established by Weller et al. (Weller et al., "Efficient phase transfer of luminescent thiol-capped nanocrystals: From water to non-polar organic solvents," *Nano. Lett.,* 2, 803-806 (2002)), which used a phase transfer (thiolate exchange) in the final step. Thioglycolic acid capped CdTe quantum dots, initially synthesized by injecting freshly prepared NaHTe into an aqueous solution of $Cd(ClO_4)_2*6H_2O$ and refluxing at 105 degrees Celsius, were transferred into organic-solvent soluble CdTe quantum dots capped mainly with alkyl thiolates via phase transfer.

The phase transfer of initially thioglycolic acid capped CdTe quantum dots using hexane- or dodecane-thiol in acetone produced mixed monolayer capped CdTe quantum dots, in which not all thioglycolic acid ligands were replaced by hexane- or dodecane-thiolate ligands.

High-resolution transmission electron microscopy (HR-TEM) images were obtained on a Jeol ultra-high resolution FEG-T/STEM operating at an accelerating voltage of 200 kV. A 10-µL (microliter) drop of the cluster solution was drop-cast on a carbon-coated copper grid (400-mesh) and dried for 1 h (hour). UV-vis spectra of all nanoparticles were obtained on a Varian Cary 5000 UV-vis-NIR spectrophotometer. Luminescence (emission) spectra of the CdTe quantum dots were collected using a Varian Cary Eclipse spectrophotometer. Polarized optical microscopy (POM) was performed using an Olympus BX51-P polarizing microscope in conjunction with a Linkam LS350 heating/cooling stage. Electro-optic tests were preformed using an LCAS automated liquid crystal analyzer (LC Vision). The LC test cells used were planar 5.0 micron cells with antiparallel polyimide alignment layers and low pre-tilt (Displaytech Inc., purchased from Linkam Scientific Instruments) and planar 5.0 or 6.8 micron cells with parallel or antiparallel polyimide alignment layers and 1° to 3° pre-tilt (Instec, Inc.). The reproducibility of the alignment effects was checked on over 120 cells overall. The detailed quantitative electro-optic measurements were obtained using three cells (Displaytech, purchased from Linkam Scientific Instruments) for each mixture and a series of ten measurements each (3×10 to obtain standard deviations for each data point).

Materials Used

The N-LCs used were commercially available pure LCs [Felix-2900-3 (Hoechst), 5CB (Merck KGaA), and 8CB (Merck KGaA)].

Example 1A

The N-LC used was a commercially available pure LC [Felix-2900-03 (Hoechst)]:

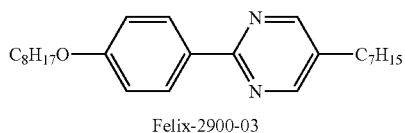

Felix-2900-03

The alkyl thiolate gold nanoclusters used were stored as dry solids under a protective atmosphere of dry nitrogen in the dark. It can be noted that alkyl thiolate gold nanoclusters can repeatedly be dispersed in and isolated from common organic solvents without change in size (no aggregation or ripening). All glass vials and TEFLON-coated spatulas were rinsed with aqua regia prior to all mixture preparations. Mixtures were then prepared by combining solutions of both components (i.e., N-LC and nanoparticles) in a common, pure, and dry solvent (e.g., ethyl acetate). The resulting solutions were stirred (agitated) for at least 10 minutes (min), and the solvent was evaporated by a steady stream of dry $N_2$ over open glass vials. Thereafter, all mixtures were dried in vacuum for 24 hours.

Prior to filling the LC test cells by capillary forces with the LC in the isotropic liquid phase, all mixtures were heated just below the isotropic-nematic phase transition and continuously mixed again.

All planar cells were prepared by filling the cell with the N-LC/nanocluster mixtures in the isotropic liquid state at a temperature about 5 Kelvin above the clearing point (i.e., about 5 K above the isotropic-nematic transition). The cells were filled via capillary forces, followed by slow cooling to the N-phase (at 1° C. $min^{-1}$) with no electric field applied (i.e., at Field-OFF).

The properties of dispersions of nanoparticles in N-LCs depend on the mixtures and, for example, the cell preparation. Previous studies on different nanoparticles in nematic LCs such as 5CB, namely maghemite $\square$-$Fe_2O_3$, demonstrated that nanoscale particles form stable, homogeneous dispersion above the N-Iso phase transition temperature ($>T_{N\text{-}Iso}$) (Da Cruz et al., "Phase behavior of nanoparticles in a thermotropic liquid crystal," *J. Phys. Chem. B*, 109, 14292-14299 (2005)). In addition, West and co-workers recently showed that particles of sufficient size are dragged by a flat, moving N-Iso interface (West et al., "Colloidal particles at a nematic-isotropic interface: Effects of confinement," *Eur. Phys. J. E*, 20, 237-242 (2006)). The cells in all of the examples described herein were prepared by filling the cell gap with the mixture in the isotropic liquid phase to ensure a well-dispersed state when confined between the polyimide alignment layers in the test cell. In one or more embodiments, it may be desirable to first fill the cells with the nanoparticles, remove all traces of solvents, and then fill the cell with the LC in the nematic phase. For certain embodiments, it may be desirable to fill the cells while the mixtures are in the isotropic state for stable, homogeneous mixtures. For certain embodiments, the viscous drag of particles at the N-Iso interface at slow cooling may be desirable to obtain homeotropic alignment in EXAMPLE 1A.

Figure 5:
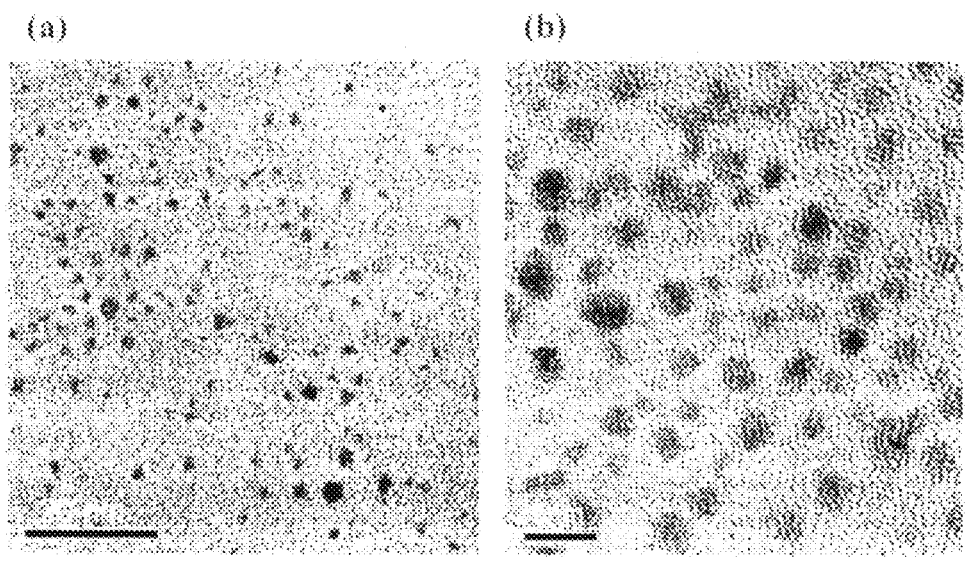
FIGS. 5a-5b show HR-TEM images of: (a) hexane thiolate-capped gold nanoclusters (Au1) (size: 1.9±0.5 nm) and (b) dodecane thiolate capped gold nanoclusters (Au2) (size: 2.1±0.7 nm).

Representative high resolution transmission electron microscope (HR-TEM) images are shown in FIG. 5. The HR-TEM images depict hexane thiolate-capped Au1 (size: 1.9±0.5 nm) in FIG. 5a and dodecane thiolate capped Au2 (size: 2.1±0.7 nm) in FIG. 5b. The scale bars shown in FIGS. 5a and 5b are 20 nm and 5 nm, respectively.

FIGS. 3a-3f show polarised optical photomicrographs of N-LC mixtures containing 5 wt-% dodecane thiolate capped gold nanoclusters after filling the cell at field-OFF. In particular, FIG. 3a shows a planar cell with a 5.0 micron cell gap with parallel rubbed polyimide alignment layers (source: Instec) showing the coexistence of birefringent stripes and homeotropic domains. FIG. 3b shows a planar cell with a 5.0 micron cell gap with antiparallel rubbed polyimide alignment layers (source: Displaytech Inc.) also showing coexistence of birefringent stripes. As can be seen in FIGS. 3a and 3b, both planar cell types essentially give rise to the same texture phenomena, with the antiparallel cell (test cells from different supplier) showing more defined stripe features, and a higher number as well as area density of birefringent stripes. For both cells, all dark domains remain dark upon sample rotation between crossed polarisers proving homeotropic alignment in these domains.

FIGS. 3b-3f show polarised photomicrographs, wherein an electric field of increasing strength (initially no applied electric field in FIG. 3b) is applied to a planar cell (cell gap of 5.0 microns) including an N-LC with antiparallel rubbed polyimide alignment layers (source: Displaytech Inc.). The applied electric fields are as follows: FIGS. 3a-3b, E=0 V/micron; FIG. 3c, E=0.6 V/micron; FIG. 3d, E=1.0 V/micron; FIG. 3e, E=1.6 V/micron; FIG. 3f, E=2.0 V/micron. FIGS. 3b-3f show the coexistence of birefringent stripes and, initially, domains that reorient by applying an electric field across the cell. Upon applying an electric field the number of birefringent stripes decreases.

It was observed that the alignment conditions set out by the cell's planar alignment layers may be effectively reversed by using, for example, small quantities of alkyl thiolate capped gold nanoclusters. Increasing the voltage of an applied dc electric field in both types of cells (with parallel and antiparallel planar alignment) resulted in a reorientation of the nematic director from the homeotropic orientation in the field-OFF state to a birefringent (planar or at least strongly tilted) orientation in the field-ON state. Considering the used N-LC with $\Delta\epsilon$>0 in a planar cell, this unexpected switching process was observed at E=0.6 V/micron (FIG. 3c), and eventually extended to all homeotropic domains in the entire field-addressed area of both cell types by increasing the applied field to E=2.0 V/micron and above (up to 6.0 V/micron). Noteworthy, rotating the sample between crossed polarisers about 90° in both directions in the field-ON state revealed a change of the birefringence, but did not produce an extinction orientation in which the nematic director aligns parallel to either of the polarisers. Interestingly, while some of the birefringent stripe domains initially disappeared upon applying an electric field up to E=2.0 V/micron, a significant number of the linear nanoparticle aggregates responsible for the stripes neither disappeared nor participated in the switching process (FIGS. 3c-3f). Upon removal of the applied field, both cells reoriented again, and the original homeotropic alignment in the dark domains recovered. At field strength between E=1.0-6.0 V/micron, the cell effectively was driven between the two orientations with an ac electric field (triangular waveform) acting, in fact, as a quasi-Freedericksz type display cell of an N-LC with $\Delta\epsilon$<0 in a homeotropic cell.

Figure 4:
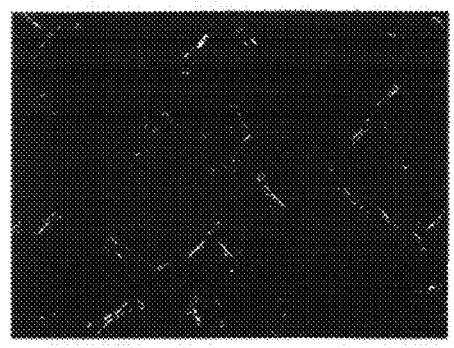
FIG. 4 is a polarized optical photomicrograph of a liquid crystal cell having gold nanoclusters therein as further described herein.

The polarised optical photomicrograph in FIG. 4 shows homeotropic alignment (non-chiral nematic) in the Felix-2900-3 doped with dodecane thiolate capped gold nanoclusters. The cell depicted in FIG. 4 is a cell with a cell gap of 6.8 microns with polyimide, low pre-tilt (Instec). FIG. 4 indicates that the homeotropic alignment with alkyl thiolate capped nanoclusters can occur with 6.8 micron cells.

Figure 6:
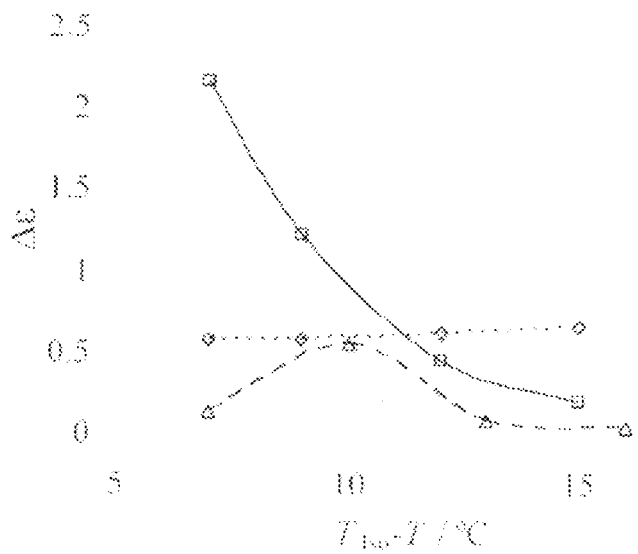
FIG. 6 shows plots of $\Delta\epsilon$ vs. $T_{Iso}$-T of: ◇ pure Felix-2900-03; □ Felix-2900-03 doped with 5 wt-% Au1; and Δ Felix-2900-03 doped with 5 wt-% Au2 (both nanoparticle-containing samples treated with the cooling at field-OFF regime (homeotropic alignment)).

FIG. 6 shows a graph of $\Delta\epsilon$ vs. $T_{Iso}$-T calculated from data obtained from EXAMPLE 1A (cooling at field-OFF).

Example 1B

EXAMPLE 1B is the same as EXAMPLE 1A, except the cooling of the planar cells to the N-phase (at 1° C. $min^{-1}$) occurred in the field-ON state, instead of the field-OFF state.

The switching or re-orientation behaviour and the formation or the area density of the birefringent stripes by heating the filled cells above the clearing point ($T_{N\text{-}Iso}$) followed by cooling to the N-phase in the field-ON state (at E=2.0 V/micron, since this field strength showed complete reorientation in EXAMPLE 1A) were investigated. Both cells with either Au nanoclusters in the N-LC treated with this field-ON cooling approach showed the exact reverse switching phenomenon in the domains surrounding the birefringent stripe. In the field-ON state, the texture was again characterized by the aforementioned stripe domains surrounded by larger domains with homeotropic alignment of the director (as determined by sample rotation between crossed polarisers), whereas in the field-OFF state, these homeotropic domains reoriented, forming stable birefringent domains with homogeneously planar (or slightly tilted with respect to the cell surface) alignment of the nematic director. Similar to EXAMPLE 1A, increasing the applied field above E>2.2 V/micron resulted in a disappearance of most of the linear particle aggregates (stripes) as shown in FIGS. 7a-7c. To summarize EXAMPLE 1B, the same cell switching as a Freedericksz-type cell of an N-LC with $\Delta\in<0$ in a cell with homeotropic alignment, was electrically driven with an ac electric field as a quasi-Freedericksz type display of an N-LC with $\Delta\in>0$ in a cell with planar alignment.

In both EXAMPLES 1A and 1B, both field-OFF and field-ON states were stable and did not change over time, and the field-ON states quickly reoriented back as soon as the field was turned off. Rather surprising was the observation that cells once treated with the cooling at field-ON protocol, as in EXAMPLE 1B, did not reverse back to their original state with homeotropic domains in the field-OFF state by heating above the clearing point followed by cooling to the N-phase at field-OFF.

The observed thermal history-dependent, dual alignment mode and the qualitative electro-optic' effects are well reproducible for Felix-2900-03 containing 5 or 10 wt-% of Au1 or Au2 in planar cells (more than 20 cells for each concentrations of both nanoclusters in each cell type, parallel and antiparallel) with a cell gap of approximately 5.0 microns (batches of the used commercial cells have cell gap deviations of approximately ±0.5 micron). While not all tested cells showed uniform homeotropic alignment (FIG. 7d) in the domains surrounding the birefringent stripes at 5 wt-% Au nanoclusters in the N-LC in EXAMPLE 1A (other suppliers, larger cell gaps above 5 microns), in most cases uniform homeotropic alignment in these domains were obtained by increasing the nanocluster concentration above 5 wt-% (commonly 10 wt-%). For example, for cells with larger cell gaps (i.e., 6.8 micron; source: Instec), not all tested cells showed uniform homeotropic alignment (FIG. 7d) in the domains surrounding the birefringent stripes at 5 wt-% of the Au nanoclusters in the N-LC. For these 6.8±0.5 micron cells, uniform homeotropic alignment in these domains were obtained in most cases by increasing the nanocluster concentration above 5 wt-% (commonly 10 wt-%). While not wishing to be bound by theory, it is believed that the occasional lack of uniform homeotropic alignment in these thicker cells for the 5 wt-% Au1 or Au2 in Felix-2900-03 is attributed to an increase of the bulk-to-interface ratio of the cells with larger cell gap. In other words, the more particles that are trapped in the bulk of the cell by interacting with the LC molecules, the fewer particles that are available to induce homeotropic alignment at the LC/alignment layer interface. Increasing the nanocluster concentration to 10 wt-% not only helped overcome this partial alignment problem, but also gave rise to another, potentially very beneficial effect. In some cases, and more so for cells with smaller cells gaps (5 microns), the higher particle content produced uniform homeotropic alignment over the entire cell area without formation of birefringent stripes (i.e., chain-like particle aggregates), which is the exact reverse to the observation of a higher area density of stripes with increasing particle content for untreated microscope glass slides reported earlier (FIG. 7e) (Qi et al., "Formation of periodic stripe patterns in nematic liquid crystals doped with functionalized gold nanoparticles," *J. Mater. Chem.*, 16, 4197-4205 (2006)). Driving these cells with a dc or ac field resulted in the exact same electro-optic phenomena described in both EXAMPLES 1A and 1B above for cells with lower particle concentration.

Figure 7:
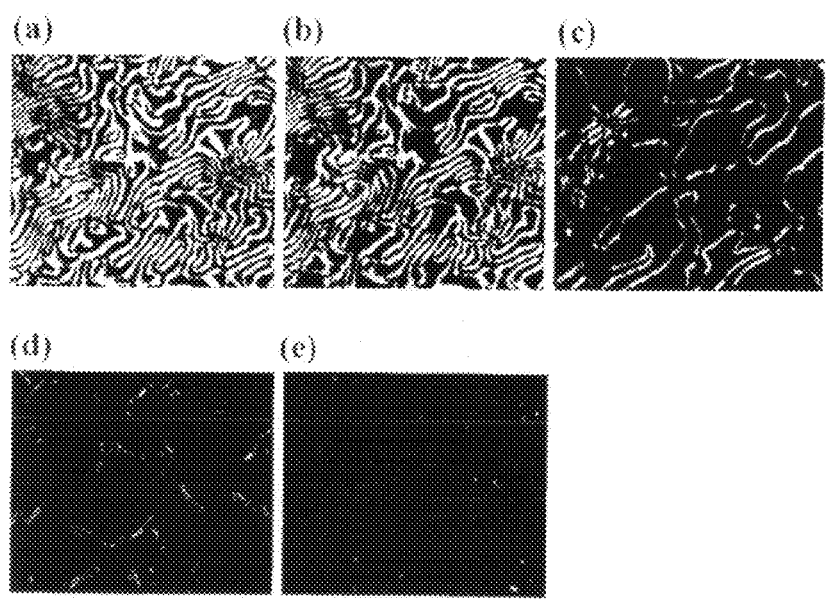
FIGS. 7a-7e are polarized optical photomicrographs of N-LC mixtures containing gold nanoclusters at various applied electric fields as further described herein.

FIG. 7 shows five polarized optical photomicrographs showing decreasing numbers of chain-like particle aggregates (birefringent stripes). FIGS. 7a-7c are the polarised optical photomicrographs of N-LC mixtures containing 5 wt-% dodecane thiolate capped gold nanoclusters after heating the cell to the isotropic liquid phase followed by cooling to the N-phase at field-ON at various applied electric fields. In FIGS. 7a-7c, the applied electric fields were as follows: a, E=1.4 V/micron; b, E=2.2 V/micron; c, E=3.2 V/micron. FIG. 7d is a polarised optical photomicrograph of Felix-2900-3 containing 5 wt-% Au2, wherein the cell gap is 6.8 microns. FIG. 7e is a polarised optical photomicrograph of an N-LC mixture with 10 wt-% dodecane thiolate capped gold nanoclusters after filling the cell at field-OFF. The entire cell in FIG. 7e shows uniform homeotropic alignment.

Example 1C

EXAMPLE 1C is the same as EXAMPLES 1A and 1B, except that the N-LC used was either 5CB or 8CB instead of Felix-2900-3. Another observation with respect to the reproducibility of this dual alignment mode and the quality of the alignment in both modes in particular was made by substituting the nematic host Felix-2900-03 (flanked by two hydrocarbon chains) with 5CB or 8CB. The lower solubility (inferior compatibility) of the used alkylthiol-capped nanoclusters in the two polar cyanobiphenyl N-LCs (having only one hydrocarbon chain) complicated the formation of uniform homeotropic alignment for a number of cells from the same batch.

Driving the homeotropic cells with an electric field often produced areas containing aggregated nanoclusters that could be seen by rotating one polarizer more and more away from the 90° orientation (uncrossed polarizers). As a result, only approximately every second cell filled with 5CB or 8CB containing 5 wt-% of Au1 or Au2 produced homeotropic aligned domains that covered most or all of the field-addressed area (5×5 mm) of the 5 micron cells. Increasing the concentration of the gold nanoclusters did only sometimes improve quality and homogeneity of the homeotropic alignment (see FIG. 8), as in the case of Felix-2900-03 for all cells used, and both findings are consistent with the overall better solubility (superior compatibility) of the Au nanoclusters in Felix-2900-03. The difference in solubility already impacts the preparation of the mixtures, which is critical in ensuring well-dispersed nanoclusters in the N-LC host. In addition, the role of the anisotropic dispersion interactions between the different N-LCs and the rubbed polyimide alignment layers (Toney et al., "Near-surface alignment of polymers in rubbed films," *Nature* 374, 709-711 (1995)) could affect the quality of the homeotropic alignment significantly.

For this reason, the most detailed quantitative electro-optic experiments were performed using Felix-2900-03 in cells with a cell gap of 5 microns doped with either 5 or 10 wt-% of Au1 or Au2 using an automated liquid crystal test-bed (LC Vision, Inc.). Such data are summarized in Tables 2, 3, and 4. Data for the electro-optic characterization using 8CB are summarized in Table 5.

TABLE 2

Elastic constants $K_{11}$, $K_{22}$, and $K_{33}$ (incl. standard deviations) of Felix-2900-03 doped with Au1 and Au2*

| Sample | $T_{Iso}$-T/° C. | $K_{11}$ | St. Dev. | $K_{22}$ | St. Dev. | $K_{33}$ | St. Dev. |
|---|---|---|---|---|---|---|---|
| pure Felix | 7 | 1.52E − 11 | 0.16 | 9.11E − 12 | 1.01 | 1.1E − 10 | 0.91 |
|  | 9 | 2.06E − 11 | 0.14 | 12.4E − 12 | 0.84 | 0.8E − 10 | 0.27 |
|  | 12 | 2.16E − 11 | 0.28 | 13E − 12 | 1.7 | 2.26E − 10 | 1.37 |
|  | 15 | 3.24E − 11 | 0.29 | 19.6E − 12 | 1.95 | 1.35E − 10 | 0.7 |
| Felix-5 wt-% Au1 | 7 | 6.09E − 14 | 0.1 | 3.66E − 14 | 0.06 | 1.34E − 12 | 0.02 |
|  | 9 | 17.49E − 14 | 0.8 | 10.5E − 14 | 0.5 | 3.85E − 12 | 0.18 |
|  | 12 | 93.97E − 14 | 18 | 56.3E − 14 | 10 | 0.44E − 12 | 1.28 |
|  | 15 | 145E − 14 | 10 | 87E − 14 | 16.4 | 5.54E − 12 | 2.01 |
| Felix5 wt-% Au1 Cooling at field-ON | 7 | 1.17E − 12 | 0.21 | 7.05E − 13 | 1.3 | 2.58E − 11 | 0.47 |
|  | 9 | 2.25E − 12 | 0.18 | 13.5E − 13 | 1.0 | 4.95E − 11 | 0.40 |
|  | 12 | 1.71E − 12 | 0.33 | 10.25E − 13 | 1.97 | 3.59E − 11 | 0.55 |
|  | 15 | 7.41E − 12 | 1.6 | 44.5E − 13 | 9.7 | 16.3E − 11 | 3.6 |
| Felix-10 wt-% Au1 | 7 | 2.79E − 13 | 0.71 | 1.67E − 13 | 0.42 | 6.1E − 12 | 1.5 |
|  | 9 | 4.31E − 13 | 0.66 | 2.58E − 13 | 0.4 | 9.5E − 12 | 1.4 |
|  | 13 | 6.15E − 13 | 0.98 | 3.69E − 13 | 0.6 | 2.7E − 12 | 6.1 |
|  | 16 | 1.28E − 12 | 0.23 | 7.7E − 13 | 1.3 | 4.5E − 14 | 2.7 |

*$K_{11} = \left(\dfrac{V_{th}}{\pi}\right)^2 \Delta\varepsilon\varepsilon_0$; $K_{22}$ is estimated as $0.6 \times K_{11}$; $K_{33}$ is obtained from a curve fitting algorithm of the C-V curve.

TABLE 3

Specific resistivity R (incl. standard deviations) of Felix-2900-03 doped with Au1 and Au2

| Sample | $T_{Iso}$ − T/° C. | Specific Resistivity/Ω · cm | St. Dev. |
|---|---|---|---|
| pure Felix | 7 | 7.25E+10 | 0.16 |
|  | 9 | 20.5E+10 | 0.67 |
|  | 12 | 26.7E+10 | 1.5 |
|  | 15 | 32.6E+10 | 4.3 |
| Felix-5 wt-% Au1 | 7 | 10E+8 | 0.1 |
|  | 9 | 7.1E+8 | 0.05 |
|  | 12 | 6.5E+8 | 0.03 |
|  | 15 | 10E+8 | 0.07 |
| Felix-5 wt-% Au1 Cooling at field-ON | 7 | 20E+8 | 0.15 |
|  | 9 | 22E+8 | 0.06 |
|  | 12 | 27E+8 | 0.86 |
|  | 15 | 26E+8 | 0.26 |
| Felix-10 wt-% Au1 | 7 | 9.1E+8 | 0.02 |
|  | 10 | 9.2E+8 | 0.01 |
|  | 13 | 10.4E+8 | 0.02 |
|  | 16 | 13.6E+8 | 0.01 |
| Felix-5 wt-% Au2 | 7 | 8E+8 | 0.06 |
|  | 10 | 9.8E+8 | 0.01 |
|  | 13 | 12.8E+8 | 4.2 |
|  | 16 | 23.7E+8 | 0.2 |
| Felix-5 wt-% Au2 Cooling at field-ON | 7 | 20E+8 | 0.1 |
|  | 10 | 25E+8 | 1 |
|  | 13 | 32E+8 | 4 |
|  | 16 | 49E+8 | 1.3 |
| Felix-10 wt-% Au2 | 11 | 49.6E+8 | 3 |
|  | 14 | 79E+8 | 1.2 |
|  | 17 | 137E+8 | 8.4 |

TABLE 4

Comparison of Felix-2900-03 doped with 10 wt-% Au1 measured with two different initial setups

| Set-up | $T_{Iso}$ − T/° C. | $V_{th}$ (rms) | $\epsilon_\parallel$ | $\epsilon_\perp$ | $\Delta\epsilon$ | $K_{11}$ (E−14) | $K_{22}$ (E−14) | $K_{33}$ (E−12) | R/Ω · cm (E+8) |
|---|---|---|---|---|---|---|---|---|---|
| A | 10 | 0.833 ± 0.004 | 6.31 ± 0.19 | 5.623 ± 0.066 | 0.691 ± 0.09 | 43.07 ± 6.615 | 25.84 ± 3.969 | 9.476 ± 1.455 | 9.242 |
| A | 13 | 1.193 ± 0.104 | 5.87 ± 0.01 | 5.323 ± 0.14 | 0.494 ± 0.13 | 61.54 ± 9.857 | 36.92 ± 5.914 | 2.756 ± 0.612 | 10.42 |
| B | 10 | 1 ± 0.04 | 5.28 ± 0.0228 | 5.78 ± 0.006 | −0.497 ± 0.01 | 44.60 ± 2.85 | 26.76 ± 0.79 | 0.446 ± 0.013 | 8.416 |
| B | 13 | 1.48 ± 0.04 | 5.21 ± 0.031 | 5.65 ± 0.005 | −0.44 ± 0.01 | 86.83 ± 3.29 | 52.1 ± 1.80 | 0.086 ± 0.017 | 10.2 |

TABLE 5

Electro-optic data of pure 8CB and 8CB doped with 5 wt-% Au1

| Sample | pure 8CB (Iso 43.0 N 32 SmA) | | 8CB-5 wt-% Au1 (Iso 36.7 N 28 SmA) | |
|---|---|---|---|---|
| $T_{Iso}$-T/° C. | 3 | 6 | 3 | 6 |
| $V_{th}$(rms) | 1.28 ± 0.004 | 1.46 ± 0.01 | 0.851 ± 0.0007 | 0.73 ± 0.01 |
| $\epsilon_\parallel$ | 13.4 ± 0.07 | 13.8 ± 0.04 | 101.5 ± 0.75 | 81.6 ± 0.32 |
| $\epsilon_\perp$ | 5.66 ± 0.008 | 5.38 ± 0.01 | 81.35 ± 1.06 | 63.1 ± 1.16 |
| $\Delta\epsilon$ | 7.747 ± 0.07 | 8.41 ± 0.05 | 20.2 ± 0.43 | 18.51 ± 1.05 |

TABLE 5-continued

Electro-optic data of pure 8CB and 8CB doped with 5 wt-% Au1

| Sample | pure 8CB (Iso 43.0 N 32 SmA) | | 8CB-5 wt-% Au1 (Iso 36.7 N 28 SmA) | |
|---|---|---|---|---|
| $K_{11}$ | 1.13E−11 ± 1.18E−13 | 1.61E−11 ± 3.01E−13 | 1.31E−11 ± 2.98E−13 | 8.94E−12 ± 1.67E−13 |
| $K_{22}$ | 6.78E−12 ± 7.06E−14 | 9.63E−12 ± 1.81E−13 | 7.86E−12 ± 1.79E−13 | 5.63E−12 ± 1.01E−13 |
| $K_{33}$ | 1.39E−11 ± 6.99E−13 | 5.23E−11 ± 4.81E−12 | 1.88E−11 ± 2.7E−12 | 6.13E−11 ± 4.85E−11 |
| $R/\Omega \cdot cm$ | 1.51E+09 ± 1.03E+07 | 1.85E+09 ± 2.32E+07 | 2.68E+10 ± 6.86E+09 | 1.01E+11 ± 7.83E+10 |

In Table 4, samples labelled with "A" represent a conventional setup for N-LC with $\Delta\in>0$ in planar cell, whereas samples labelled with "B" represent a setup including an N-LC with $\Delta\in<0$ in homeotropic cell.

In Table 5, there are only two data points due to narrow N-phase range of 8CB. Note the lower threshold voltage $V_{th}$ and higher dielectric constants $\in_\parallel/\in_0$ and $\in_\perp/\in_0$ of the nanocluster filled cell. The elastic constants $K_{11}$, $K_{22}$, and $K_{33}$ here remain largely unchanged.

Figure 8:
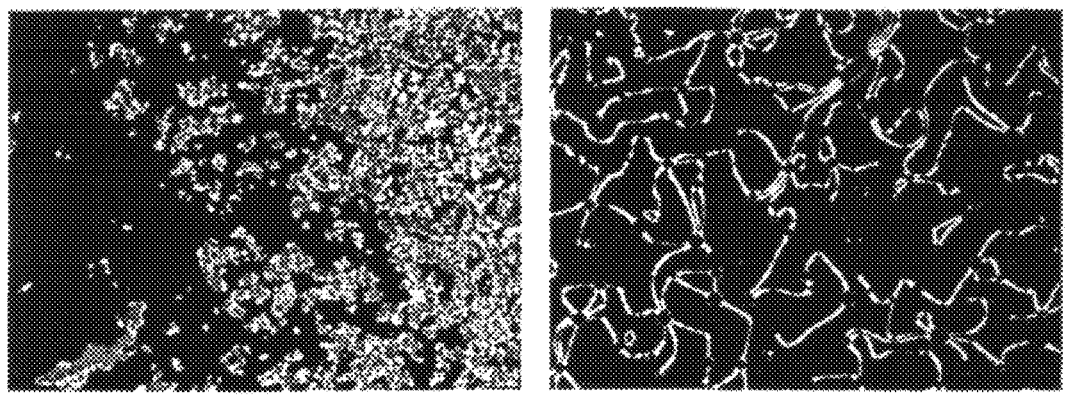
FIG. 8 shows polarised optical photomicrographs of 8CB doped with 5 wt-% Au1 (partial homeotropic alignment) on the left and of 5CB doped with 10 wt-% Au1 (homeotropic alignment with linear particle aggregates (birefringent stripes)) on the right—both obtained by slow cooling from the isotropic liquid phase at field-OFF.

Referring to FIG. 8, the polarised optical photomicrograph on the left depicts 8CB doped with 5 wt-% Au1 (partial homeotropic alignment). In FIG. 8, the polarised optical photomicrograph on the right depicts 5CB doped with 10 wt-% Au1 (homeotropic alignment with linear particle aggregates (birefringent stripes)). Both of these samples were obtained by slow cooling from the isotropic liquid phase at field-OFF.

For all cells of Felix-2900-03 containing either 5 or 10 wt-% Au1 or Au2 the threshold voltage ($V_{th}$), the dielectric constants $\in_\parallel$ and $\in_\perp$, the dielectric anisotropy ($\Delta\in=\in_\parallel-\in_\perp$), the elastic constants $K_{11}$, $K_{22}$, and $K_{33}$ (splay, twist, bend), as well as the specific resistivity R were measured before and after treating the cell with the field-ON cooling approach (initially homeotropic vs. parallel alignment) using the "single cell" method described by Wu et al. (Wu et al., "Physical-properties of chlorinated liquid-crystals," *Liq. Cryst.*, 10, 635-646 (1991)) built into the software of the automated LC test-bed used. All measurements were performed depending on temperature by slow cooling from the isotropic liquid phase (at 1° C. min$^{-1}$) and start at $T_{Iso}$-T=7° C. taking into consideration the broadened phase transition due to the presence of the nanoclusters. For a comparison between the 5 wt-% and the 10 wt-% runs it is important to note that the phase transition temperatures (low-temperature onset of the phase transition in the DSC traces) are only affected by approximately 1-2° C. by doubling the nanocluster concentration from 5 to 10 wt-%. Plots of the threshold voltage $V_{th}$ vs. $T_{Iso}$-T for all measured cells are summarized in FIGS. 9a-9d.

Figure 3:
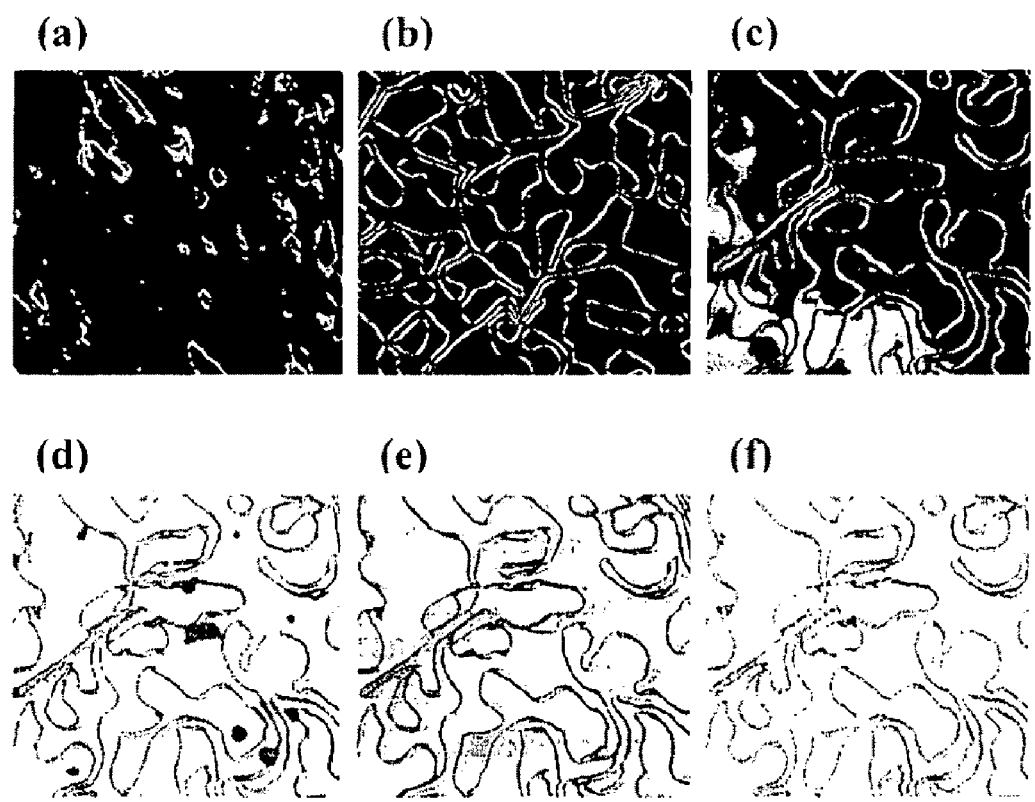
FIGS. 3a-3f are polarized optical photomicrographs of N-LC mixtures containing gold nanoclusters at various applied electric fields as further described herein.
Figures 9A, 9B:
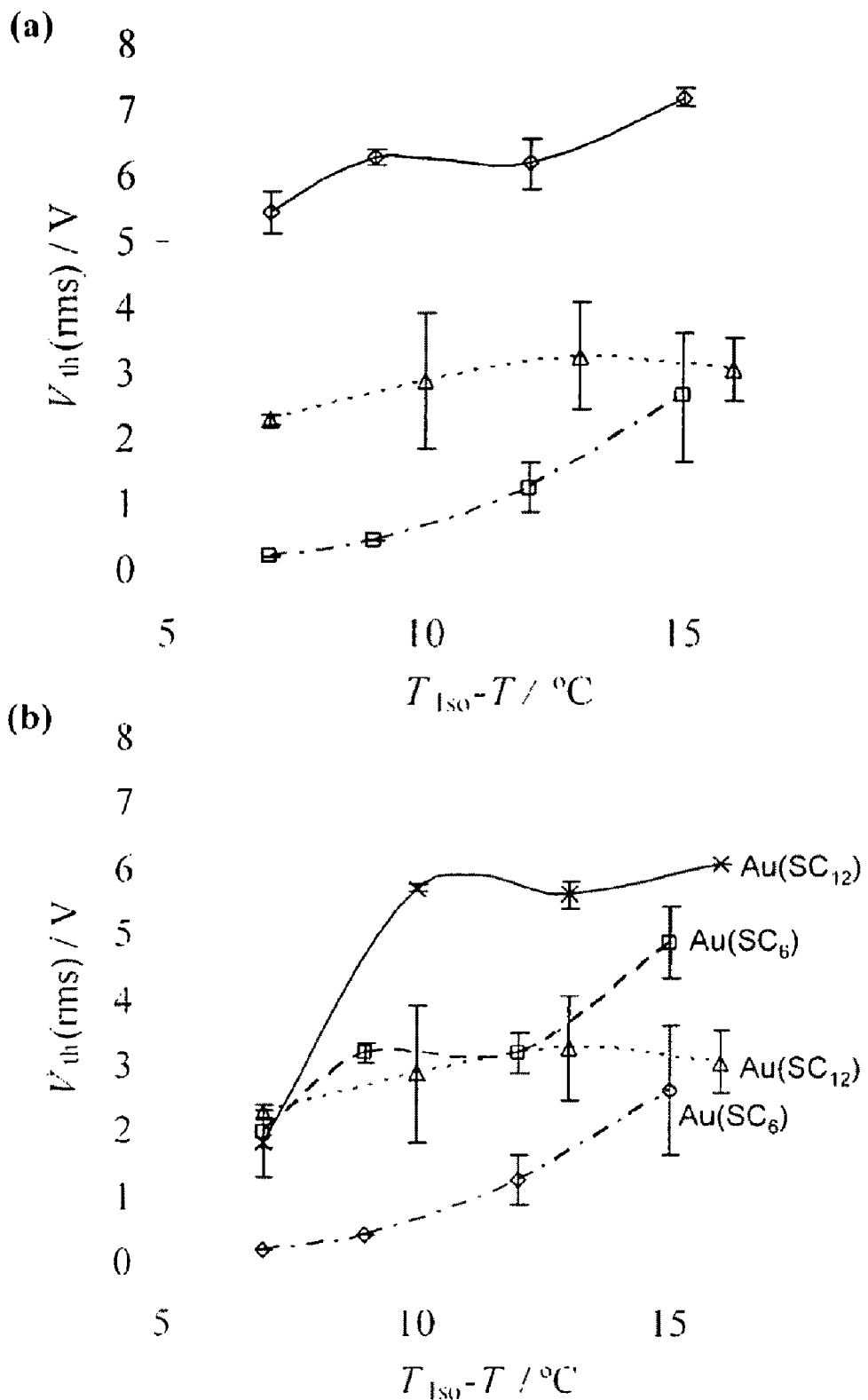
FIG. 9 shows plots of threshold voltage $V_{th}$(rms) vs. $T_{Iso}$-T of Felix-2900-03: (a) ◇ pure Felix-2900-03, Δ doped with 5 wt-% Au1, □ doped with 5 wt-% Au2 starting with homeotropic alignment (see EXAMPLE 1A); (b) Δ, ◇ before (see EXAMPLE 1B) and □, x after cooling at field-ON (see EXAMPLE 1B). (c) Δ doped with 5 wt-% Au2, x doped with 10 wt-% Au2; (d) ◇ doped with 5 wt-% Au1, □ doped with 10 wt-% Au1 starting with homeotropic alignment.
Figure 13:
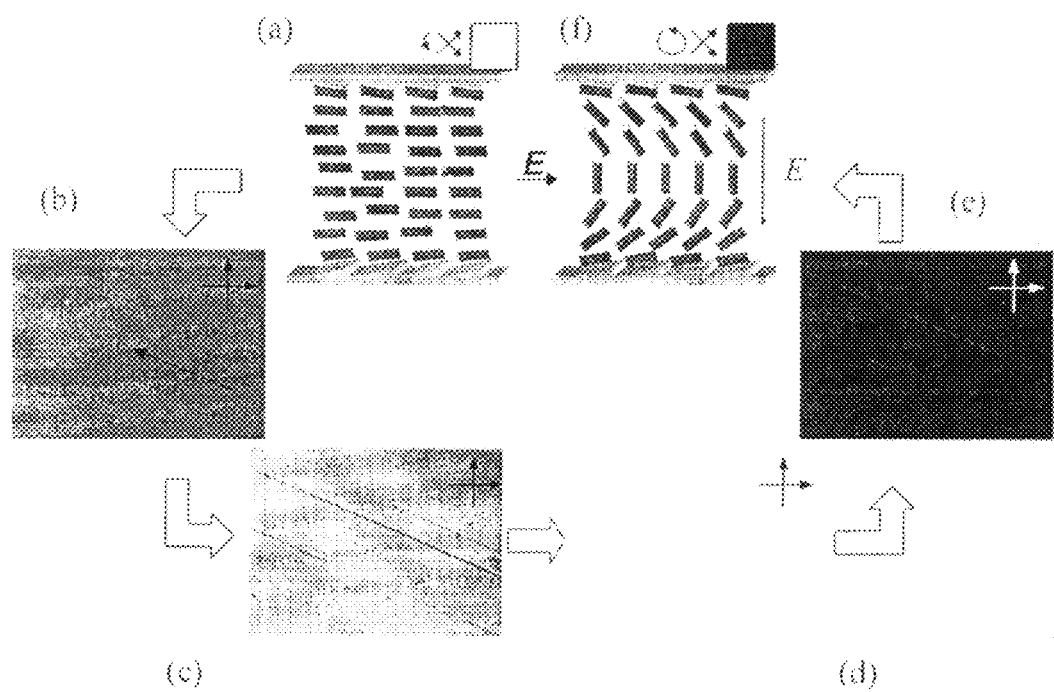
FIG. 13a illustrates a schematic of nematic liquid crystal molecules in a planar cell with no applied electrical field as further described herein.
FIGS. 13b-13e are polarized optical photomicrographs of a planar nematic liquid crystal cell with various applied electrical fields as further described herein.
FIG. 13f illustrates a schematic of reoriented nematic liquid crystal molecules in a planar cell with an electric field greater than the threshold field applied across the cell as further described herein.

$V_{th}$ increased with decreasing temperature for pure Felix-2900-03 and for Felix-2900-03 doped with 5 wt-% Au1 or Au2, but more significantly, $V_{th}$ was much lower over the entire temperature range for both mixtures containing the nanoclusters, with Au1 in Felix-2900-03 showing the lowest values for $V_{th}$ (FIG. 9a). These data were consistent with the lower applied field necessary to obtain reorientation of the nematic director from a homeotropic to a planar alignment qualitatively observed before (FIG. 3 vs. FIG. 13). A comparison of the $V_{th}$ vs. $T_{Iso}$-T before and after treating the cell with the field-ON approach (FIG. 9b) indicated that the cells with the original homeotropic alignment showed lower values of $V_{th}$ than the cells cooled with field-ON showing planar alignment. In fact, Felix-2900-03 doped with 5 wt-% Au2 and pure Felix-2900-03 showed almost identical values of $V_{th}$ at lower temperatures which demonstrated that cells treated with the field-ON cooling regime had an electro-optic response similar to the pure N-LC host.

Figures 9C, 9D:
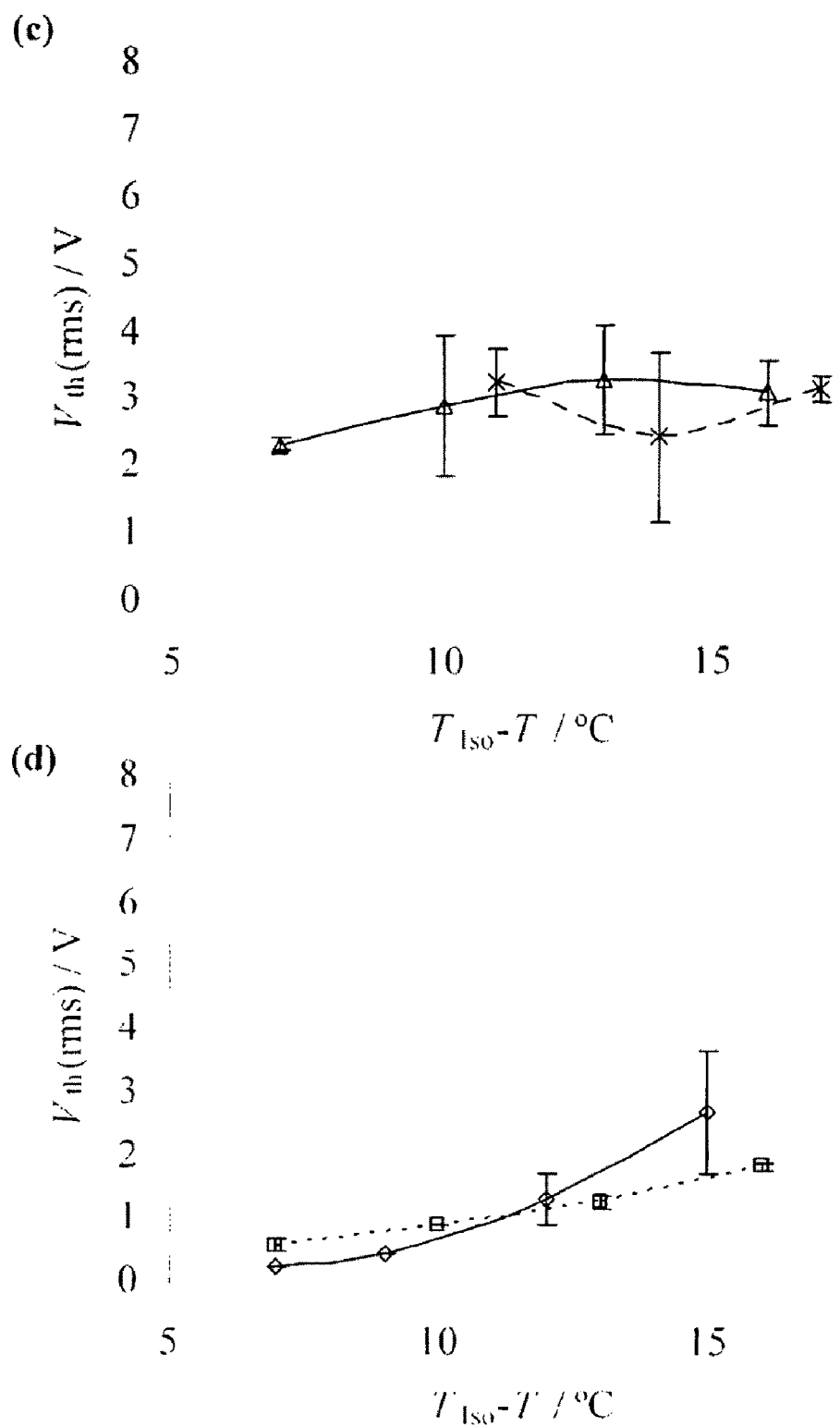

The plots in FIGS. 9c-9d then showed the concentration-dependence of $V_{th}$ for both nanoclusters suspended in Felix-2900-03 with the initial homeotropic alignment. Taking the standard deviations of each data set into account, it is believed that doubling the nanocluster concentration had no significant impact on $V_{th}$ for Au2, but led to a minor decrease of $V_{th}$ for Au1.

Figures 10A, 10B:
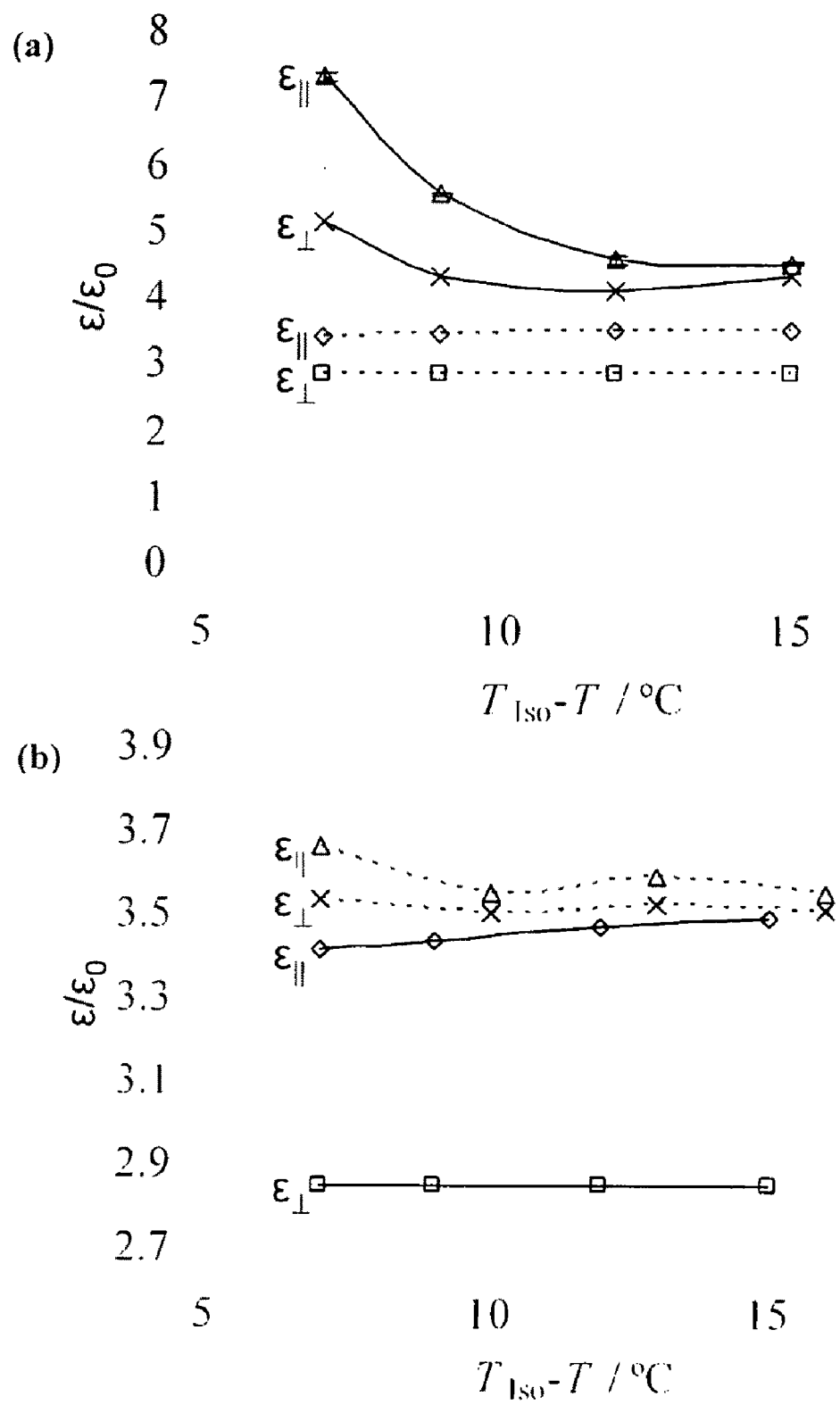
FIG. 10 shows plots of the dielectric constants ($\epsilon/\epsilon_0$) both along ($\epsilon_{\parallel}$) and across ($\epsilon_{\perp}$) the long molecular axis vs. $T_{Iso}$-T of Felix-2900-03: (a) ◇ and □ pure Felix-2900-03; Δ and x doped with 5 wt-% Au1 starting with homeotropic alignment (see EXAMPLE 1A); (b) ◇ and □ pure Felix-2900-03; Δ and x doped with 5 wt-% Au2 starting with homeotropic alignment (see EXAMPLE 1A); (c) Felix-2900-03 doped with 5 wt-% Au1: ◇ and □ before (see EXAMPLE 1A) and Δ and x after cooling at field-ON (see EXAMPLE 1B). (d) Felix-2900-03 doped with 5 wt-% Au2: ◇ and □ before (EXAMPLE 1A) and Δ and x after cooling at field-ON (EXAMPLE 1B). The rather small standard deviations are only shown for one data set representative for all measured dielectric constants in (a), and were omitted for clarity in all other plots.
Figures 10C, 10D:
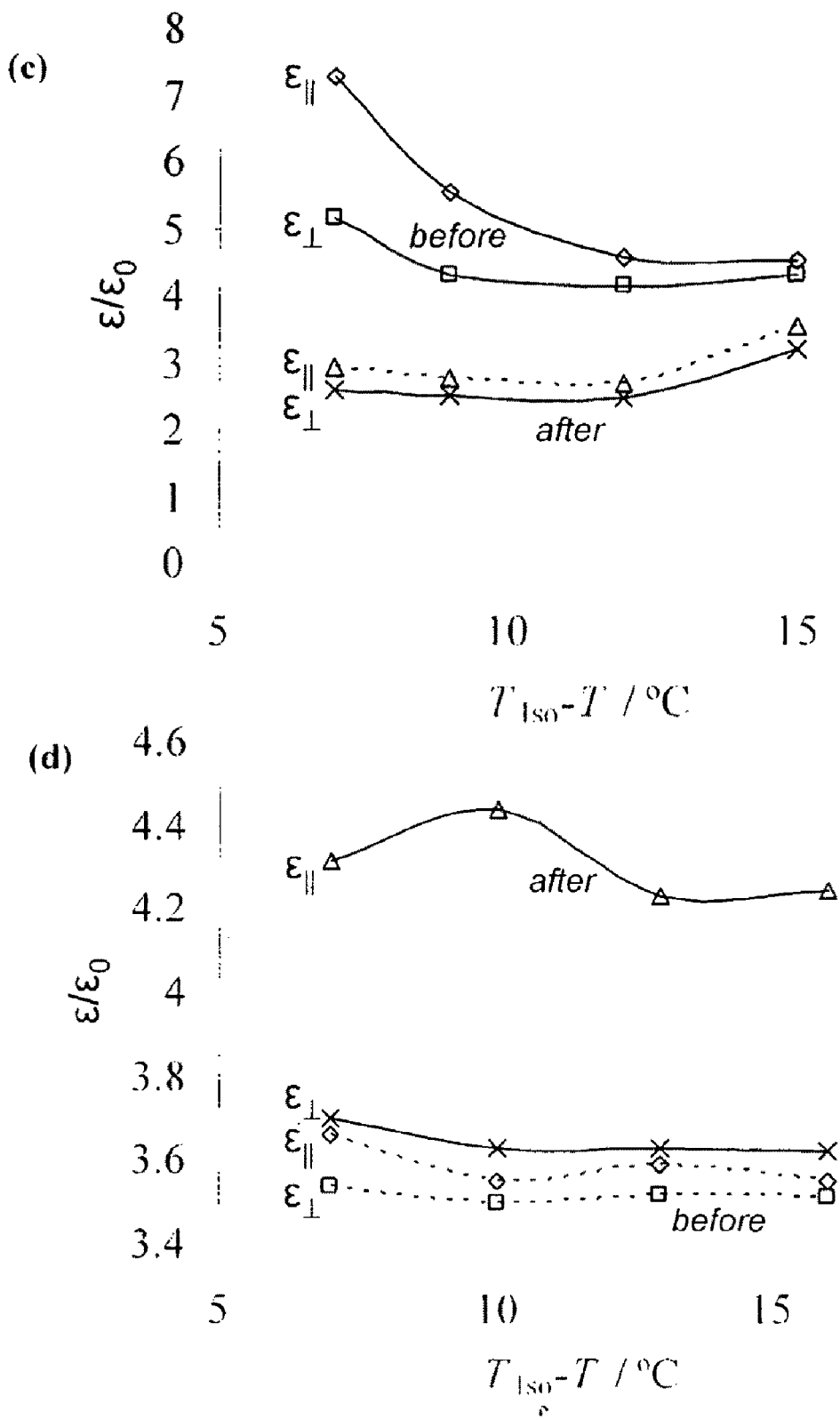
Figure 11:
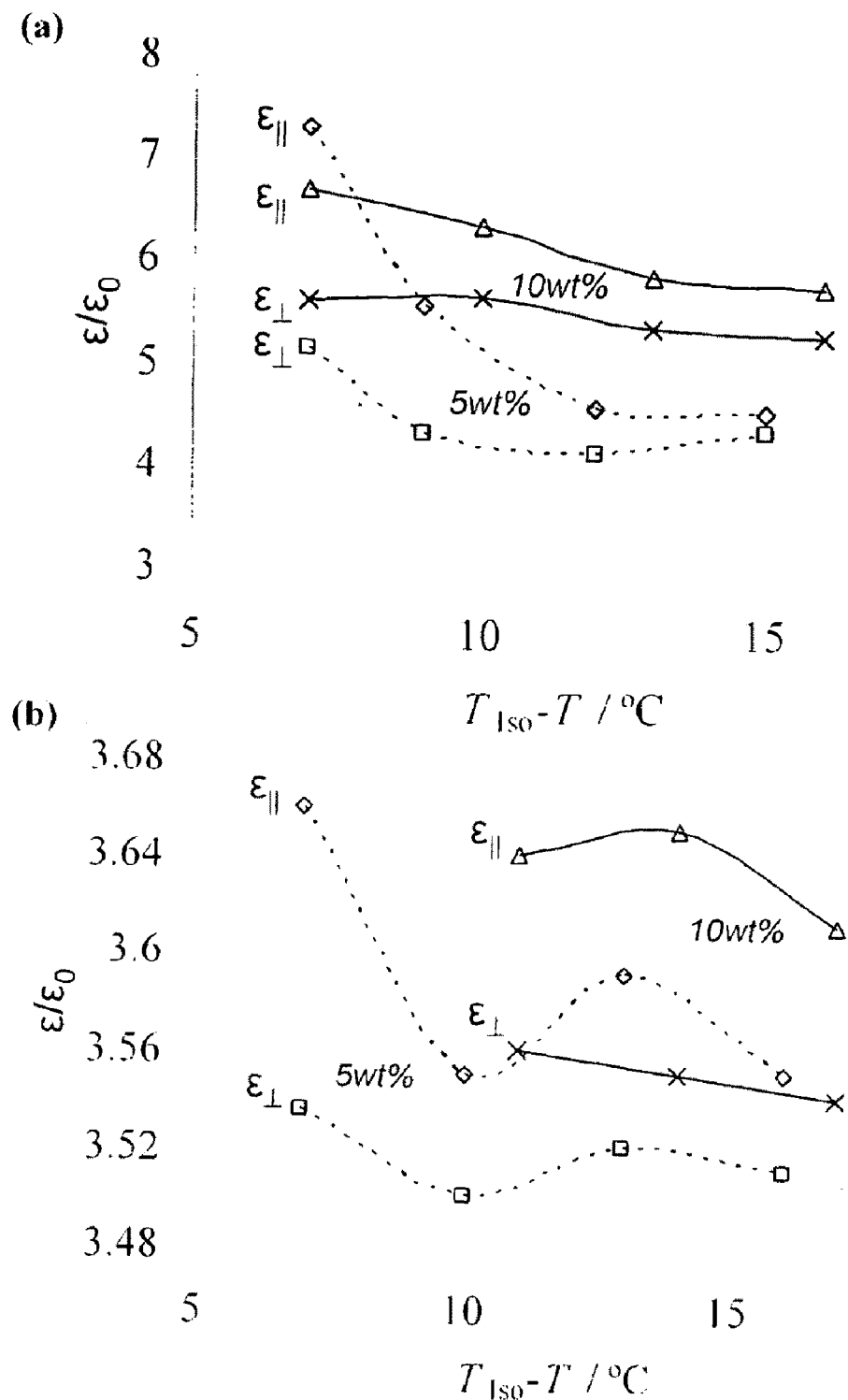
FIG. 11 shows plots of the dielectric constants ($\epsilon/\epsilon_0$) both along ($\epsilon_{\parallel}$) and across ($\epsilon_{\perp}$) the long molecular axis vs. $T_{Iso}$-T of Felix-2900-03 doped with either 5 or 10 wt-% of Au1 or Au2 using cells treated with the cooling at field-OFF regime (homeotropic alignment): (a) Au1; (b) Au2.

The trends of the dielectric constants along ($\in_\parallel$) and across the long molecular axis ($\in_\perp$) depending on temperature for all mixtures with 5 wt-% of either nanocluster were collected and are shown in FIG. 10 (plots of the dielectric anisotropies $\Delta\in$ are given in FIG. 6). The dielectric constants for pure Felix-2900-03 followed a trend common to most rod-like N-LCs and give an increasing $\Delta\in$ with decreasing temperatures [FIGS. 10a-10b]. The samples for Felix-2900-03 doped with 5 wt-% Au1 (FIG. 10a) or Au2 (FIG. 10b), however, showed the exact opposite trend. Both dielectric constants $\in_\parallel$ and $\in_\perp$ were larger than for pure Felix-2900-03 and $\Delta\in$ decreased with decreasing temperature (significantly for Au1 and slightly for Au2). A comparison of the dielectric constants before and after treatment of the cell with the cooling at field-ON regime again shows that all cells with the planar alignment induced by slow cooling at field-ON behaved similar to the cells filled with pure Felix-2900-03 ($\Delta\in$ approximately +0.6). It is noted that the $\Delta\in$ of Felix-2900-03 doped with 5 wt-% Au2 was significantly smaller at the cooling at field-OFF regime (as opposed to the larger $\Delta\in$ values for Au1 at higher temperatures in the same regime). Increasing the concentration of both Au nanoclusters in the N-LC host, as for $V_{th}$, did not result in major changes to both the dielectric constants as well as $\Delta\in$ (FIG. 11).

The calculated, estimated, and derived elastic constants $K_{11}$, $K_{22}$, and $K_{33}$ as well as the measured values for the specific resistivity (R/$\Omega$·cm) of all cells at both cooling regimes are collected in Tables 2 and 3 and follow by principle the same trends discussed for $V_{th}$ and $\Delta\in$ (Wu et al., "Physical-properties of chlorinated liquid-crystals," *Liq. Cryst.*, 10, 635-646 (1991)) with the values for the cells treated with the cooling at field-ON regime showing values closer to pure Felix-2900-03 and the cells treated with the cooling at field-OFF approach having lower values for all three elastic constants and for the resistivity. The same set of measurements were performed for cells treated with the cooling at field-OFF regime with a changed setup assuming an N-LC with $\Delta\in<0$ ($\in_\parallel<\in_\perp$) in a homeotropic cell was measured (see Table 4). The values for $V_{th}$, $\Delta\in$, $K_{11}$, $K_{22}$, and $K_{33}$ obtained from these measurements are in general identical to the values obtained from the initial set of data, and are only differing in the instrumentally reversed sign for $\Delta\in$ ($\Delta\in<0$ as per setup).

Finally, measurements were also performed using cells filled with 8CB doped with the Au nanoclusters and show, as Felix-2900-03 did, reduced threshold voltages $V_{th}$ and higher dielectric constants (see Table 5).

In EXAMPLES 1A and 1B, the electronically charged gold nanocluster cores residing at the alignment layer/N-LC interface acting as local capacitor and conducting gold nanoclusters (Shipway et al., "Nanoparticle arrays on surfaces for electronic, optical, and sensor applications," *ChemPhysChem* 1, 18-52 (2000)) and dipole (Peceros et al., "Dipole-dipole plasmon interactions in gold-on-polystyrene composites," *J. Phys. Chem. B*, 109, 21516-21520 (2005)) not only enhanced the overall conductivity of the mixture, as discussed by other groups for similar systems (Prasad et al., "Electric conductivity and dielectric constant measurements of liquid crystal—gold nanoparticle composites," *Liq. Cryst.* 33, 1121-1125 (2006)), but as an assembly at the interface with the hydrocarbon chains on the cluster surface acting similar to a self-assembled monolayer on Au (Alkylthiols used in self-assembled monolayers (SAMs) are known to promote homeotropic anchoring of N-LCs: Drawhorn et al., "Anchoring of nematic liquid-crystals on self-assembled monolayers formed from alkanethiols on semitransparent films of gold," *J. Phys. Chem.*, 99, 16511-16515 (1995)), they were also responsible for the induced homeotropic alignment of the N-LC molecules. Sample preparation, filling the cells with the N-LC mixture in the isotropic liquid phase, and slow cooling into the N-phase were performed before the discussed homeotropic alignment in EXAMPLES 1A and 1B was observed. Another approach showing similar success in obtaining homeotropic alignment made use of a very rapid cooling regime (filling the cell above $T_{Iso}$ and removing it rapidly from the heating stage). This regime produced planar alignment initially, which rather rapidly turned into the described homeotropic alignment for all used N-LCs. It is believed that this indicated that the Au clusters, initially well-dispersed in the isotropic liquid phase, migrated to the interface being excluded from the N-LC bulk.

Figure 12:
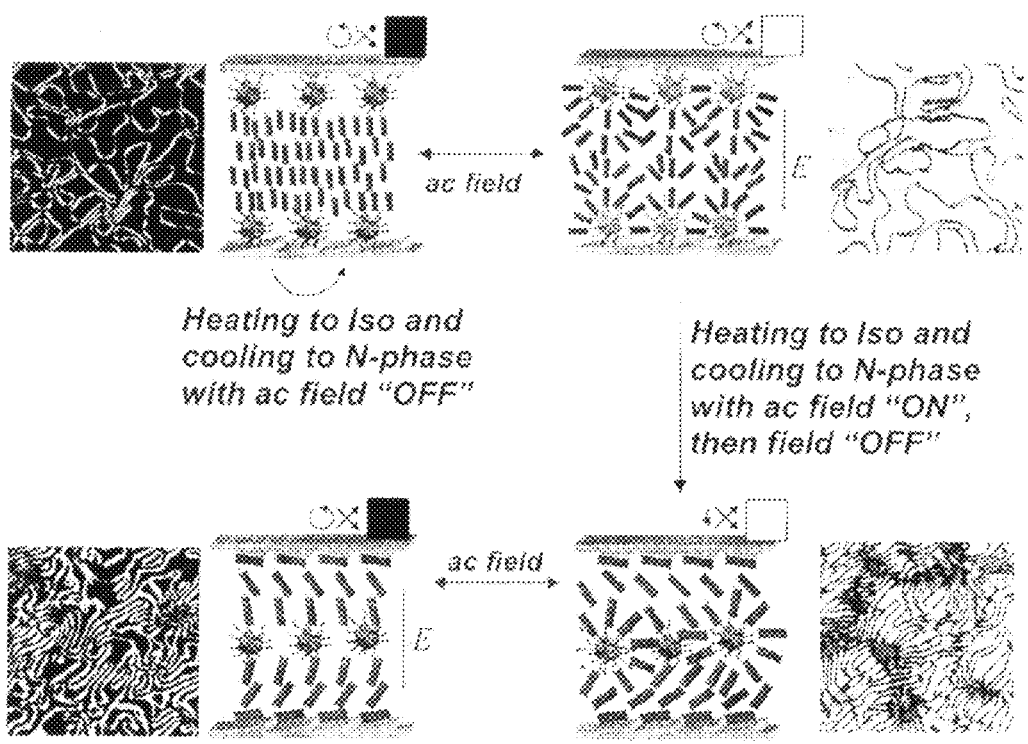
FIG. 12 illustrates a schematic representation (and accompanying polarized optical photomicrographs) of initial orientation and electric field-driven reorientation of exemplary N-LC molecules as further described herein.

FIG. 12 illustrates such a proposed model, both in terms of polarized optical photomicrographs of thin-film textures (as observed between crossed polarisers) and corresponding schematic drawings. FIG. 12 demonstrates the initial orientation and electric field-driven reorientation of the N-LC molecules under the cell preparation conditions described in EXAMPLE 1A, i.e., filling and cooling the cell at field-OFF (upper section), and after heating above the clearing point and subsequent cooling to the N-phase at field-ON state (lower section).

In EXAMPLES 1A and 1B, the electronically charged gold nanocluster cores (Shipway et al., "Nanoparticle arrays on surfaces for electronic, optical, and sensor applications," *ChemPhysChem*, 1, 18-52 (2000)) residing at the alignment layer/N-LC interface acting as an ionic 'impurity' (Prasad et al., "Electric conductivity and dielectric constant measurements of liquid crystal—gold nanoparticle composites," *Liq. Cryst.*, 33, 1121-1125 (2006)) and enhancing the overall conductivity of the mixture, as well as additional permanent magnetic properties reported for thiol-capped gold nanoclusters (Yamamoto et al., "Direct observation of the ferromagnetic spin polarization in gold nanoparticles: A review," *Rev. Adv. Mater. Sci.*, 12, 23-32 (2006); and de la Venta et al., "Magnetism in polymers with embedded gold nanoparticles," *Adv. Mater.*, 19, 875-877 (2007)) resulted in a reorientation of the nematic director in the previously homeotropic domains normal to the nanocluster surface upon applying an electric field. It is believed that this reorientation was then responsible for the birefringent domains in the field-ON state that could not be brought into an extinction position by rotating the sample between crossed polarisers. Consequently, the expected Freedericksz type response of an N-LC with $\Delta\epsilon>0$ observed on cooling the cell at field-ON from the isotropic to the nematic phase may have had a different origin. Apart from the few molecules in near surface regions (alignment layers), at $E>E_{th}$ the N-phase may form with the bulk of the molecules oriented with the director parallel to the applied field (perpendicular to the surface). It is believed that as a consequence of the interactions with alignment layers and the applied field, and considering the observed reversed switching behaviour, the gold nanoclusters were likely pushed away from the cell's surfaces into the bulk of the sandwiched nematic film, which was presumably related to the levitation of nanowires in a twisted nematic cell mentioned earlier (Lapointe et al., "Elastic torque and the levitation of metal wires by a nematic liquid crystal," *Science*, 303, 652-655 (2004)). Removing the electric field then resulted in a planar alignment in all domains surrounding the birefringent stripes. These domains then responded to the applied electric field with a Freedericksz transition of an N-LC with $\Delta\epsilon>0$. The likelihood of this scenario is additionally underpinned by all data obtained from the electro-optic measurements. All cells treated with the cooling at field-ON approach showed values for $V_{th}$, $\Delta\epsilon$, $K_{11}$, $K_{22}$, $K_{33}$, and R that are closer to the values measured (calculated) for the pure N-LC. The presence of the gold nanoclusters, randomly dispersed in the N-LC bulk, still reduced the threshold voltage and the specific resistivity, which would make these cells (mixtures) useful for electro-optic applications requiring less power, but was much less pronounced than for the cells with induced homeotropic alignment with the Au clusters residing as an assembly at the interface.

From the disappearance of birefringent stripes above a certain threshold of the applied electric field in EXAMPLES 1A and 1B, it was believed that the conductivity of thiolate-capped gold nanoclusters and electronic charging of the cluster core may play an important role. In this case, it is believed that the elastic forces generated by the formation of topological dipoles and hyperbolic hedgehogs leading to the formation of chain-like particle aggregates were overridden by the forces exerted on the charged nanocluster by the applied electric field, and simultaneously a reduction of energetically costly defects in the N-LC film (i.e., formation of energetically less costly defects at the interface).

In one or more embodiments of the present invention, a dual alignment/switching mechanism in planar LC cells using N-LC molecules with $\Delta\epsilon>0$ containing small amounts of alkyl thiolate-capped gold nanoclusters may be demonstrated. In both thermal/field-history-dependent modes, the threshold voltages were lower and the dielectric constants higher in comparison to the values obtained for the pure N-LCs. The results of EXAMPLES 1A and 1B, paired with the reported increase of the anisotropy in conductivity for such systems (Prasad et al., "Electric conductivity and dielectric constant measurements of liquid crystal—gold nanoparticle composites," *Liq. Cryst.*, 33, 1121-1125 (2006)), demonstrated the usefulness and potential of, for example, functionalized gold nanoclusters for the development of for example, new or improved LC display technologies.

The qualitatively observed electro-optic effects clearly differentiate this system from common filled nematic LC cells that can be electrically driven from a highly scattering to a transparent state (Diorio Jr. et al., "The electro-optic properties of colloidal silica filled nematics," *Liq. Cryst.*, 29, 589-596 (2002)). The minute amount of gold nanoclusters suspended in the N-LC may effectively produce two different alignment modes independent of the cell's planar alignment layers. This system could also be employed for, for example, electric far-field spectral tuning of plasmonic resonances (Kossyrev et al., "Electric field tuning of plasmonic response of nanodot array in liquid crystal matrix," *Nano Lett.*, 5, 1978-1981 (2005)) while eliminating the tedious fabrication of gold nanodot arrays on glass surfaces using nanoporous aluminium membranes as a stencil in e-beam evaporation.

Example 2

Gold nanoparticles were synthesized following the two-phase Brust-Schiffrin method (which would mean, free thiol and TOAB, which was rather difficult to remove from the Au clusters, were likely present in the nematic solvent), but also filled the test cells with the mixture containing the nanoclusters in the nematic phase, which resulted in local concentration differences and aggregation of nanoparticles. The procedure used to make the test cells was the same as disclosed by Prasad et al. (Prasad et al., "Electric conductivity and dielectric constant measurements of liquid crystal—gold nanoparticle composites," *Liq. Cryst.* 33, 1121-1125 (2006)), except that the cells used were commercially available (Linkam and Instec) (i.e., not self made) and the cells were filled when the liquid crystal was in the nematic phase (i.e., hot isotropic phase). The cells were filled when the liquid crystal was about 5 Kelvin below the clearing point (i.e., about 5 K below the isotropic-nematic phase transition temperature). Following the two-phase Brust-Shiffrin method, the cells showed planar alignment as is commonly observed for pure N-LCs in planar cells. This showed that the properties of dispersion of nanoclusters in N-LCs strongly depended on the mixtures as well as on the cell preparation. That is, filling the cells with mixtures containing the nanoclusters in the nematic phase did not result in stable, homogeneous mixtures with concentration differences arising only from interactions of the N-LC molecules with the surface of the gold nanoclusters (such as linear particle aggregates). Filling the cell gap with the mixture in the isotropic liquid phase, as in EXAMPLE 1A, provided stable, homogeneous mixtures with concentration differences arising only from interactions of the N-LC molecules with the surface of the gold nanoclusters (such as linear particle aggregates).

Example 3

A mixture of 5 wt-% hexane thiolate-capped gold nanoclusters in 5-CB was prepared by combining solutions of both components in a common, pure, and dry solvent (chloroform). The resulting solution was stirred (agitated) for at least 10 minutes, and the solvent was evaporated by a steady stream of dry $N_2$ over the open glass vial. Thereafter, the mixture was dried in vacuum for 24 hours. Prior to tilling the LC test cell by capillary forces with the LC in the isotropic liquid phase, the mixture was heated just below the isotropic-nematic phase transition temperature ($T_{Iso}$) and continuously mixed again.

All planar cells were prepared by filling the cell with the N-LC/nanocluster mixtures in the isotropic liquid state at a temperature about 5 Kelvin above the clearing point (i.e., about 5 K above the isotropic-nematic phase transition temperature). The cells were filled via capillary forces, followed by slow cooling to the N-phase (at 1° C. min$^{-1}$) with no electric field applied (i.e., at Field-OFF).

Effect of Alignment Layers: While not all tested cells showed uniform homeotropic alignment in the domains surrounding the birefringent stripes at 5 wt-% Au nanoclusters in the N-LC in EXAMPLE 1A (other suppliers, larger cell gaps above 5 microns), in most cases uniform homeotropic alignment in these domains was obtained by increasing the nanocluster concentration above 5 wt-% (commonly 10 wt-%). This finding may be interpreted as an effect resulting from a slightly different quality of the polyimide alignment layers. Although there is no direct measure of this influence, custom-made cells using ITO-coated glass slides (supplier: Delta Technologies; polished float glass, $SiO_2$ passivated/ITO coated one surface–$R_S$=4-8Ω) without alignment layers (cell gap<3 micron) did show identical effects following the procedure described in both EXAMPLES 1A and 1B, however, with a larger number of birefringent stripe domains (linear particle aggregates).

Example 4

LC cells were prepared in the same manner as in EXAMPLE 1A, except that the gold nanoparticles were not included. An ITO test cell was prepared with polyimide alignment layers favouring planar alignment. Polarized optical photomicrographs were taken at various applied electric fields. The electric-field response (Freedericksz transition) of the N-LC used [Felix-2900-03 (Hoechst); Cr 52 (SmA 45) N 70 Iso] with positive dielectric anisotropy [$\Delta\varepsilon$=+0.62] without addition of the gold nanoclusters in a ITO-test cell with polyimide alignment layers favouring planar alignment is shown in FIG. 13.

FIGS. 13*a*-13l illustrate the response of a nematic liquid crystal (Felix-2900-3) in a planar liquid crystal cell that does not include gold nanoclusters. FIG. 13*a* is a schematic representation of the liquid crystal cell with no applied electric field (i.e., E=0 V/micron). FIG. 13*b* is a polarised optical photomicrograph representing this initial state. Upon application of an electric field greater than the threshold field (i.e., $E>E_{th}$) across the cell, a director re-orientation was observed as can be seen in FIGS. 13*c* (E=1.6 V/micron) and 13*d* (E=3.0 V/micron). Applying an electric field across the cell at ($E>E_{th}$) a director re-orientation was observed (1.6-3.0 V/micron).

A significant increase of the applied electric field over the threshold field (i.e., $E>>E_{th}$) resulted in an alignment of the bulk of the N-LC molecules along the direction of the applied electric field, which produced homeotropic alignment. FIGS. 13*e* and 13*f* illustrate a polarised optical photomicrograph and schematic representation of the liquid crystal cell at E=8.0 V/micron.

In FIGS. 13*b*-13*e*, the black and white arrows (perpendicular in all photomicrographs) indicate polarizer/analyzer position. The dashed arrow in FIG. 13*b* indicates the rubbing direction of the polyimide alignment layers.

Example 5

The N-LCs used were commercially available pure LCs [Felix-2900-3 (Hoechst) and 8CB (Merck KGaA)].

The following table, Table 6, indicates the nanoparticle labels, core material, functionality added to the core, and the size of the nanoparticle in nanometers. A schematic of the synthesized nanoparticle is shown in FIG. 1.

TABLE 6

| Nanoparticle | Core Material | Functionality (S—R) | Size (nm) |
|---|---|---|---|
| Au1 | Au | S—$C_6H_{13}$ | 1.9 ± 0.5 |
| Au2 | Au | S—$C_{12}H_{25}$ | 2.1 ± 0.7 |
| Au3 | Au | S—$C_{12}H_{25}$ | 5.4 ± 0.5 |
| Ag1 | Ag | S—$C_6H_{13}$ | 4.2 ± 0.7 |

TABLE 6-continued

| Nanoparticle | Core Material | Functionality (S—R) | Size (nm) |
|---|---|---|---|
| QD1 | CdTe | S—$C_6H_{12}$* | 3.5 ± 0.8 |
| QD2 | CdTe | S—$C_{12}H_{25}$* | 4.1 ± 0.6 |

*The phase transfer of initially thioglycolic acid capped CdTe quantum dots using hexane- or dodecane-thiol in acetone produced mixed monolayer capped CdTe quantum dots, in which not all thioglycolic acid ligands are replaced by hexane- or dodecane-thiolate ligands.

All particles used were stored as dry solids under a protective atmosphere of dry nitrogen in the dark. It can be noted that all particles can repeatedly be dispersed in and isolated from common organic solvents without change in size (no aggregation or ripening). All glass vials and TEFLON-coated spatulas were rinsed with aqua regia prior to all mixture preparations. Mixtures were then prepared by combining solutions of both components (i.e., N-LC and nanoparticles) in a common, pure, and dry solvent (e.g., ethyl acetate). The resulting solutions were stirred (agitated) for at least 10 minutes, and the solvent was evaporated by a steady stream of dry $N_2$ over open glass vials. Thereafter, all mixtures were dried in vacuum for 24 hours.

Prior to filling the LC test cells by capillary forces with the LC in the isotropic liquid phase, all mixtures were heated just below the isotropic-nematic phase transition temperature and continuously mixed again.

All planar cells were prepared by filling the cell with the N-LC/nanocluster mixtures in the isotropic liquid state at a temperature about 5 Kelvin above the clearing point (i.e., about 5 K above the isotropic-nematic phase transition temperature). The cells were filled via capillary forces, followed by slow cooling to the N-phase (at 1° C. $min^{-1}$) with no electric field applied (i.e., at Field-OFF).

It has been further shown that N-LCs upon doping with alkyl thiolate coated gold nanoparticles produced thin film textures characterized by birefringent stripe domains separated by areas showing homeotropic alignment of the N-LC molecules. (Qi et al., "Formation of periodic stripe patterns in nematic liquid crystals doped with functionalized gold nanoparticles," *J. Mater. Chem.*, 16, 4197-4205 (2006).) Considering the strong homeotropic anchoring of the N-LC molecules to the nanocluster surface via dispersion and van der Waals interactions, it is believed that the observation of the birefringent stripes was explained by the formation of linear particle aggregates. It is believed that these linear aggregates resulted from the formation of topological defects (dipoles and hyperbolic hedgehogs) as discussed for many quasi-spherical particles in N-LCs. ((a) Stark, "Physics of colloidal dispersions in nematic liquid crystals," *Phys. Rep.*, 351, 387-474 (2001); (b) Stark, "Geometric view on colloidal interactions above the nematic-isotropic phase transition," *Phys. Rev. E*, 66, 041705 (2002); (c) Poulin et al., "Direct measurement of colloidal forces in an anisotropic solvent," *Phys. Rev. Lett.*, 79, 4862-4865 (1997); (d) Gu, et al., "Observation of saturn-ring defects around solid microspheres in nematic liquid crystals," *Phys. Rev. Lett.*, 85, 4719-4722 (2000); (e) Loudet et al., "Line defect dynamics around a colloidal particle," *Eur. Phys. J. E*, 7, 205-208 (2002); (f) Poulin et al., "Suspension of spherical particles in nematic solutions of disks and rods," *Phys. Rev. E*, 59, 4384-4387 (1999); (g) Kossyrev et al., "Branching of colloidal chains in capillary-confined nematics," *Phys. Rev. Lett.*, 96, 048301 (2006).) Then, given the experimentally observed planar alignment of the pure N-LC on untreated glass slides, the gold nanoparticles residing at the glass/N-LC interfaces drive the homeotropic alignment in the domains separating the birefringent stripes.

Figure 14:
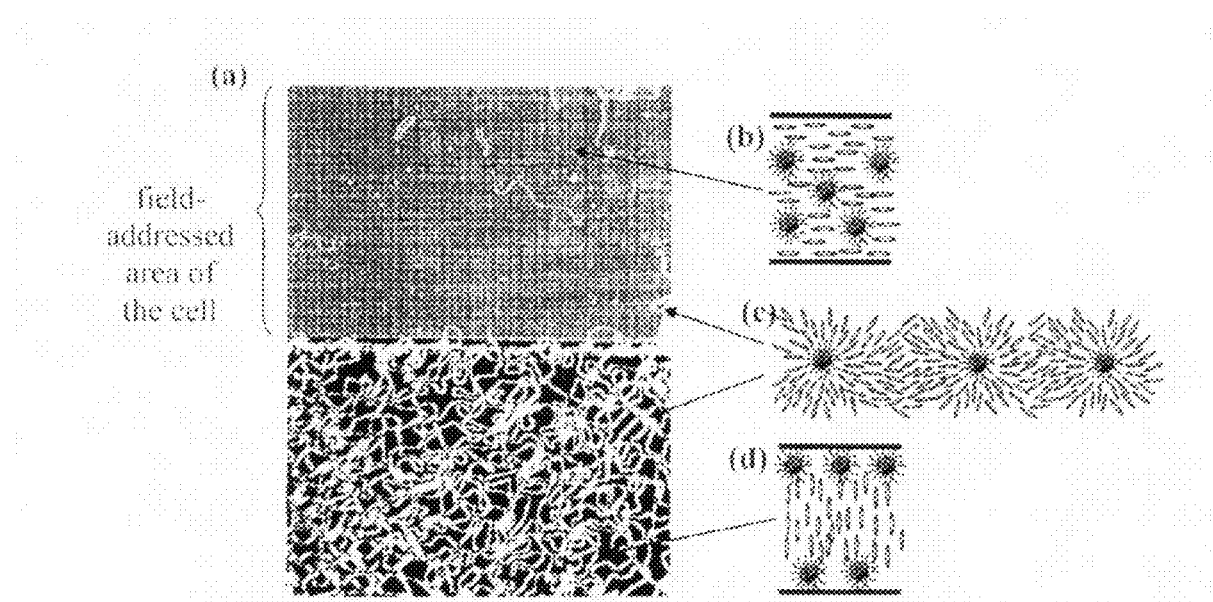
FIG. 14 (a) Polarized optical photomicrograph of the LC (Felix-2900-03) in the N-phase doped with 5 wt-% dodecane thiolate capped gold nanoparticles at 55° C. in a planar ITO-test cell on cooling from the isotropic liquid phase at field-ON—both the field addressed and non-field addressed area is shown to demonstrate the impact of the electric-field/thermal history (rubbed polyimide alignment layers, low pre-tilt, cell gap: 5 micron, source: Displaytech Inc.) showing the coexistence of birefringent stripes (linear particle aggregates) and homeotropic domains in the non-field-addressed area and a few stripe domains in an otherwise planar aligned field-addressed area, (b) origin of the planar alignment after cooling the cell at field-ON, (c) origin of the birefringent stripes (formation linear particle aggregates), and (d) origin of homeotropic alignment due to particles at the N-LC/alignment layer interface (no field or cooling at field-OFF).

These mixtures also produced identical thin films textures in ITO-coated LC test cells with rubbed polyimide alignment layers (FIG. 14) that should have produced planar alignment of the used N-LC featuring a positive dielectric anisotropy ($\Delta\in>0$) as observed for the pure LC in the same cells.

In EXAMPLE 1A, the homeotropic domains in doped N-LC cells can be electrically reoriented and aligned either like N-LCs with a positive dielectric anisotropy in a planar cell or alternatively as N-LCs with a negative dielectric anisotropy in a homeotropic cell, and that both alignment modes reorient at lower Freedericksz transition threshold voltages ($V_{th}$) in comparison to the pure N-LC. This was achieved by changing the thermal as well as applied electric field history of the nanoparticle doped N-LC cells. Cells cooled from the isotropic liquid phase to the N-phase at field-OFF displayed homeotropic alignment (depending on the nanoparticle concentration with or without stripe defects), which could be electrically reoriented to a planar (or strongly tilted) orientation upon applying an electric field with threshold voltages approximately 4-times lower than the pure N-LC at the same reduced temperature ($T_{Iso}-T$). The same cell cooled to the N-phase at field-ON showed homeotropic alignment in the field-ON state and bright, birefringent domains (planar or strongly tilted orientation) in the field-OFF state with threshold voltage just slightly lower than for the pure N-LC (EXAMPLE 1B). This unprecedented dual alignment mode and the lower $V_{th}$ values were observed for hexane thiolate (Au1; size: 1.9±0.5 nm) and dodecane thiolate capped gold nanoclusters (Au2; size: 2.1±0.7 nm) with the lowest $V_{th}$ values in both alignment modes for the hexane thiolate capped Au1 nanoparticles. As is described hereinabove, although not wishing to be bound by theory, to explain the two switching modes, it is believed that the electronically charged gold nanoparticles, initially residing at the alignment layer/N-LC interface (cooling at field-OFF), acted as local capacitors (Albrecht et al., "Intrinsic multistate switching of gold clusters through electrochemical gating," *J. Am. Chem. Soc.*, 129, 9162-9167 (2007); Assemblies of Au nanoparticles display solid state conductivities of approximately $10^{-4}$-$10^{-5}$ S·cm$^{-1}$: Boettcher et al., "Tunable electronic interfaces between bulk semiconductors and ligand-stabilized nanoparticle assemblies," *Nat. Mater.*, 6, 592-596 (2007); Wuelfing et al., "Electronic conductivity of solid-state, mixed-valent, monolayer-protected Au clusters," *J. Am. Chem. Soc.*, 122, 11465-11472 (2000); Pietron et al., "Using electrons stored on quantized capacitors in electron transfer reactions," *J. Am. Chem. Soc.*, 121, 5565-5570 (1999); and Terrill et al., "Monolayers in three dimensions: NMR, SAXS, thermal, and electron hopping studies of alkanethiol stabilized gold clusters," *J. Am. Chem. Soc.*, 117, 12537-12548 (1995); Shipway et al., "Nanoparticle arrays on surfaces for electronic, optical, and sensor applications," *ChemPhysChem*, 1, 18-52 (2000)) and dipoles (Peceros et al., "Dipole-dipole plasmon interactions in gold-on-polystyrene composites," *J. Phys. Chem. B*, 109, 21516-21520 (2005)) not only enhancing the overall conductivity, but as an assembly at the interface inducing homeotropic alignment similar to a mixed thiol self-assembled monolayer (SAM) on a flat Au surface. Alkylthiols used in self-assembled monolayers (SAMs) are known to promote homeotropic anchoring of N-LCs. (Drawhorn et al., "Anchoring of nematic liquid-crystals on self-assembled monolayers formed from alkanethiols on semitransparent films of gold," *J. Phys. Chem.*, 99, 16511-16515 (1995).) It is believed that the relative similarity of the electro-optic response ($V_{th}$, $\Delta\in$, $K_{11}$, $K_{22}$, $K_{33}$, and R) after cooling the cell to the N-phase at field-ON suggested that this alignment mode is more similar to the pure N-LC in a planar cell, in which the gold nanoparticles are now dispersed in the bulk of the cell, away from the alignment layer interfaces, since the field-OFF state does not give rise to any homeotropic domains in the ITO-covered (field-addressed) area of the cell.

In the present EXAMPLE, a homeotropic alignment mode (via cooling at field-OFF) was obtained using hexane thiolate capped silver nanoparticles as well as CdTe quantum dots (predominantly capped with alkyl thiolates), which excluded room temperature magnetism of the gold nanoparticles (de la Venta et al., "Magnetism in polymers with embedded gold nanoparticles," Adv. Mater., 19, 875-877 (2007)) as a cause for the homeotropic alignment. Results of detailed electro-optic measurements are presented for larger dodecane thiolate capped gold nanoparticles (Au3; size: 5.4±0.9 nm), hexane thiolate capped silver nanoparticles (Ag1; size: 4±0.7 nm), and hexane thiolate capped CdTe quantum dots (QD1, size: 3.5±0.8 nm) as well as dodecane thiolate capped CdTe quantum dots (QD2, size: 4.1±0.6 nm) in two N-LCs, Felix-2900-03 and 8CB, to allow for a step-by-step comparison (including Au1 and Au2) of the effects of size, nanoparticle core material, and capping agent (length of the alkyl chain) on the electro-optic characteristics and alignment modes of the nanoparticle doped N-LC cells.

Figure 15:
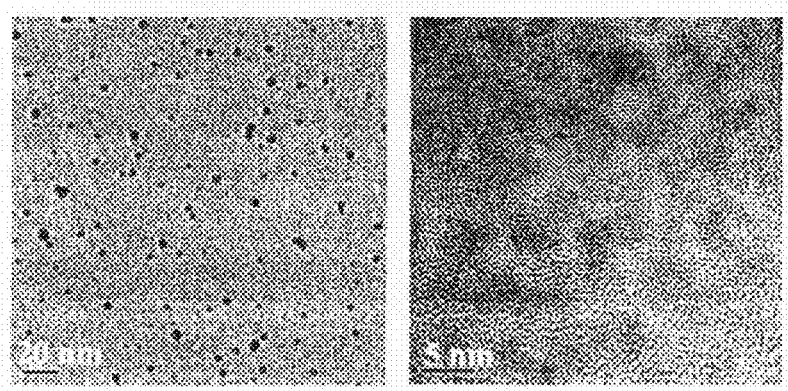
FIG. 15 shows high-resolution transmission electron microscope (HR-TEM) TEM/HR-TEM images and size distribution of hexane thiolate-capped silver nanoclusters (Ag1) and hexane thiolate capped CdTe nanoclusters (QD1), wherein an HR-TEM image of hexane thiolate-capped Ag clusters (4.2±0.7 nm) is on the left and an HR-TEM image of hexane thiolate-capped CdTe quantum dots (3.9±0.3 nm) is on the right.
Figure 16:
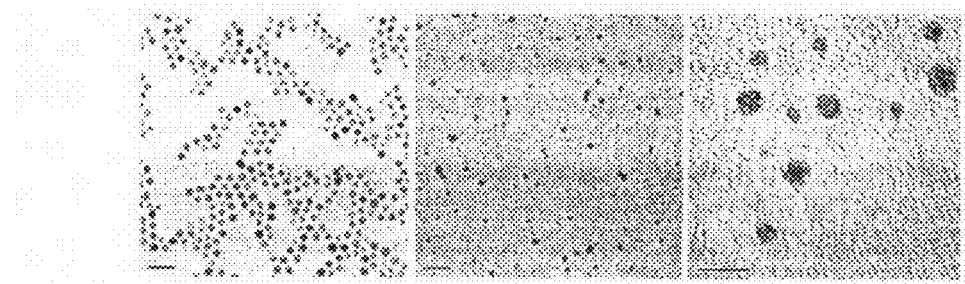
FIG. 16 shows HR-TEM images of: (a) larger dodecane thiolate capped gold nanoclusters (Au3), (b) Ag1, and (c) dodecane thiolate capped CdTe nanoclusters (QD2) wherein the scale bars in (a) and (b)=20 nm and in (c)=5 nm].

Representative TEM/HR-TEM images of hexane thiolate-capped Ag and CdTe nanoclusters are shown in FIGS. 15 and 16.

Additional permanent magnetic properties reported for thiol-capped gold nanoclusters (Yamamoto et al., "Direct observation of the ferromagnetic spin polarization in gold nanoparticles: A review," Rev. Adv. Mater. Sci., 12, 23-32 (2006); de la Venta, "Magnetism in polymers with embedded gold nanoparticles," Adv. Mater., 19, 875-877 (2007)) could, in principle, also facilitate the observed homeotropic alignment, because N-LCs with $\Delta\epsilon > 0$ would reorient with the director normal to the nanocluster surface (Dunmur et al., "Elastic Properties, In Handbook of Liquid Crystals," Demus et al. (Eds.), Wiley-VCH (Weinheim), 1998, Vol. 1, pp. 253-280). However, results using hexane thiolate-capped Ag as well as CdTe nanoclusters (in the same size-regime) showed that replacing the potentially magnetic Au core with Ag or CdTe cores still produces the identical homeotropic alignment of the N-LCs used (FIG. 17). It is believed that this highlighted the role of the alkyl thiols coating the nanocluster surface in promoting homeotropic alignment at the LC/alignment layer interface.

It is believed that the reorientation (switching) observed after applying an electric field in EXAMPLES 1A and 1B, in which the birefringent domains could not be brought into an extinction position by rotating the sample between crossed polarisers, was caused by the capacitive-charged, conducting Au nanoclusters. The lower threshold voltage and the lower specific resistivity were caused by the Au nanoclusters, and both effects were more pronounced for the Au1 clusters with shorter hydrocarbon chains, which was consistent with the more pronounced semiconducting nature of the hexane thiolate-capped gold clusters in comparison to the dodecane thiolate-capped Au2 (Templeton et al., "Monolayer-protected cluster molecules," Acc. Chem. Res., 33, 27-36 (2000)).

For all cells of Felix-2900-3 containing 5 wt-% or 10 wt-% Au3, Ag1, QD1, and QD2, the threshold voltage ($V_{th}$), the dielectric permittivity along ($\epsilon_\parallel$) and across the long molecular axis ($\epsilon_\perp$), the dielectric anisotropy ($\Delta\epsilon = \epsilon_\parallel - \epsilon_\perp$), the elastic constants K11, K22, and K33 (splay, twist, and bend), as well as the specific resistivity R were measured (calculated/estimated) before and after treating the cell with the field-ON cooling approach (initially homeotropic versus parallel alignment, if obtainable) using the "single cell" method described by Wu et al. (Wu et al., "Physical-properties of chlorinated liquid-crystals," Liq. Cryst., 10, 635-646 (1991)) built into the software of the automated LC test bed. All measurements were performed depending on temperature by slow cooling from the isotropic liquid phase (at 1° C. min$^{-1}$) and start at $T_{Iso}-T=7°$ C. (for Felix-2900-3) and at $T_{Iso}-T=3°$ C. (for 8CB) taking into consideration the broadened phase transition due to the presence of the nanoparticles.

To compare mixtures of the same N-LC with 5 wt-% and 10 wt-% nanoparticles, it is important to note that the phase transition temperatures (low-temperature onset of the phase transition in the DSC traces) were only affected by approximately 1-2° C. by doubling the nanoparticle concentration from 5 to 10 wt-%. Therefore, the reduced temperature scales were kept identical. However, for mixtures showing broader phase transitions, electro-optic data were collected starting at lower temperatures (ensuring the entire field-addressed area of the cell was in the N-phase).

The elastic constants were calculated or estimated as follows. $K_{11} = (V_{th}/\pi)^2 (\Delta\epsilon)(\epsilon_0)$; $K_{22}$ is estimated as $0.6 \times K_{11}$; and $K_{33}$ is obtained from a curve fitting algorithm of the C-V curve.

Felix-2900-03 Doped with Au3

Plots of $V_{th}$ vs. $T_{Iso}-T$ and $\epsilon_\parallel$ ($\epsilon_\perp$) vs. $T_{Iso}-T$ of cells treated with cooling at field-OFF for pure Felix-2900-03 and Felix-2900-03 doped with Au2 (5 wt-% and 10 wt-%) (EXAMPLE 1) or with Au3 (5 wt-%) are shown in FIGS. 18 and 19.

A comparison of $V_{th}$ vs. $T_{iso}-T$ of the mixtures doped with the two gold nanoparticles Au2 and Au3 (both capped with dodecane thiolate) with the pure N-LC reveals that the nanoparticle doped mixtures showed reduced threshold voltages, with the larger Au3 nanoparticles having shown the lowest value for $V_{th}$ in this series despite an overall lower total number of particles present in the mixtures (number of nanoparticles present: 10 wt-% Au2/10 wt-% Au3≈15/1).

A trend can be seen in FIG. 19. An increase in the gold nanoparticle size resulted in an increase of the dielectric anisotropy ($\Delta\epsilon = \epsilon_\parallel - \epsilon_\perp$) in mixtures with Felix-2900-03, or more precisely, the relative dielectric permittivity perpendicular to the long molecular axis ($\epsilon_\perp$) decreased.

Felix-2900-03 Doped with Ag1

Figure 20:
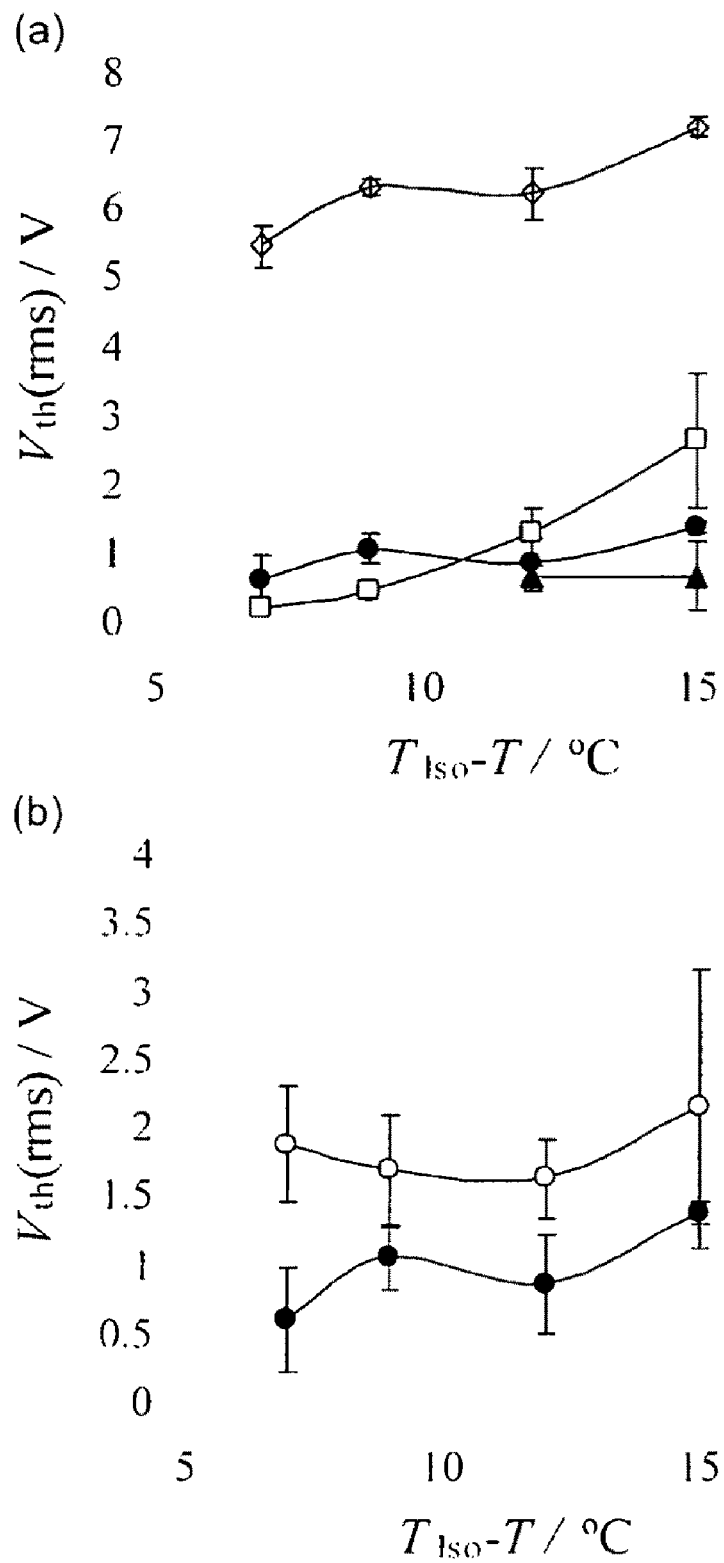

Plots of $V_{th}$ vs. $T_{Iso}-T$ and $\epsilon_\parallel$ ($\epsilon_\perp$) vs. $T_{Iso}-T$ of cells treated with cooling at field-OFF for pure Felix-2900-03, Felix-2900-03 doped with Au1 or doped with 5 wt-% or 10 wt-% Ag1 are shown in FIGS. 20*a* and 21*a*, and a comparison of Felix-2900-03 doped with 5 wt-% Ag1 treated with both regimes (cooling at field-OFF or cooling at field-ON) are collected in FIGS. 20*b* and 21*b*.

Similarly sized hexane thiolate capped silver nanoparticles reduced $V_{th}$ in a similar way as gold nanoparticles monolayer-protected with the same thiolate (FIG. 20*a*). Increasing the concentration of Ag1 in Felix-2900-03 from 5 wt-% to 10 wt-% resulted in only a minor change of $V_{th}$ and cooling the same cell at field-ON produced an electro-optic response closer to the pure N-LC, although the mixtures of Felix-2900-03 with the larger Ag1 (in comparison to Au1), showing planar alignment in this cooling regime, still exhibited $V_{th}$ values that were at least 50% lower than those measured for the pure N-LC. It is believed that this would suggest that the capacitive charging effects known for metal nanoparticles such as silver and gold (Albrecht et al., "Intrinsic multistate switching of gold clusters through electrochemical gating," J. Am. Chem. Soc., 129, 9162-9167 (2007); Assemblies of Au nanoparticles display solid state conductivities of approximately $10^{-4}$-$10^{-5}$ S·cm$^{-1}$: Boettcher et al., "Tunable electronic interfaces between bulk semiconductors and ligand-stabilized nanoparticle assemblies", *Nat. Mater.*, 6, 592-596 (2007); Wuelfing et al., "Electronic conductivity of solid-state, mixed-valent, monolayer-protected Au clusters," *J. Am. Chem. Soc.*, 122, 11465-11472 (2000); Pietron et al., "Using electrons stored on quantized capacitors in electron transfer reactions," *J. Am. Chem. Soc.*, 121, 5565-5570 (1999); Terrill et al., "Monolayers in three dimensions: NMR, SAXS, thermal, and electron hopping studies of alkanethiol stabilized gold clusters," *J. Am. Chem. Soc.*, 117, 12537-12548 (1995); Shipway et al., "Nanoparticle arrays on surfaces for electronic, optical, and sensor applications," *ChemPhysChem*, 1, 18-52 (2000)) played an important role in the reduction of the threshold voltage in these mixtures, and explained why this charging effect was most dominating when the metal nanoparticles assembled at the alignment layer/N-LC interface acting as an array.

The relative dielectric permittivity data (i.e., $\Delta\in$) of these mixtures obtained from cells treated with cooling at field-OFF (vertical alignment) confirmed some of the already observed trends. The larger Ag1 nanoparticles, as Au3, produced mixtures with an increasing $\Delta\in$ (reduced $\in_\perp$) both at 5 wt-% and 10 wt-%, and the values obtained after cooling the cell at field-ON (planar alignment) were almost identical to the values obtained for the pure N-LC (FIG. 21b).

Felix-2900-03 Doped with QD2

Figure 22:
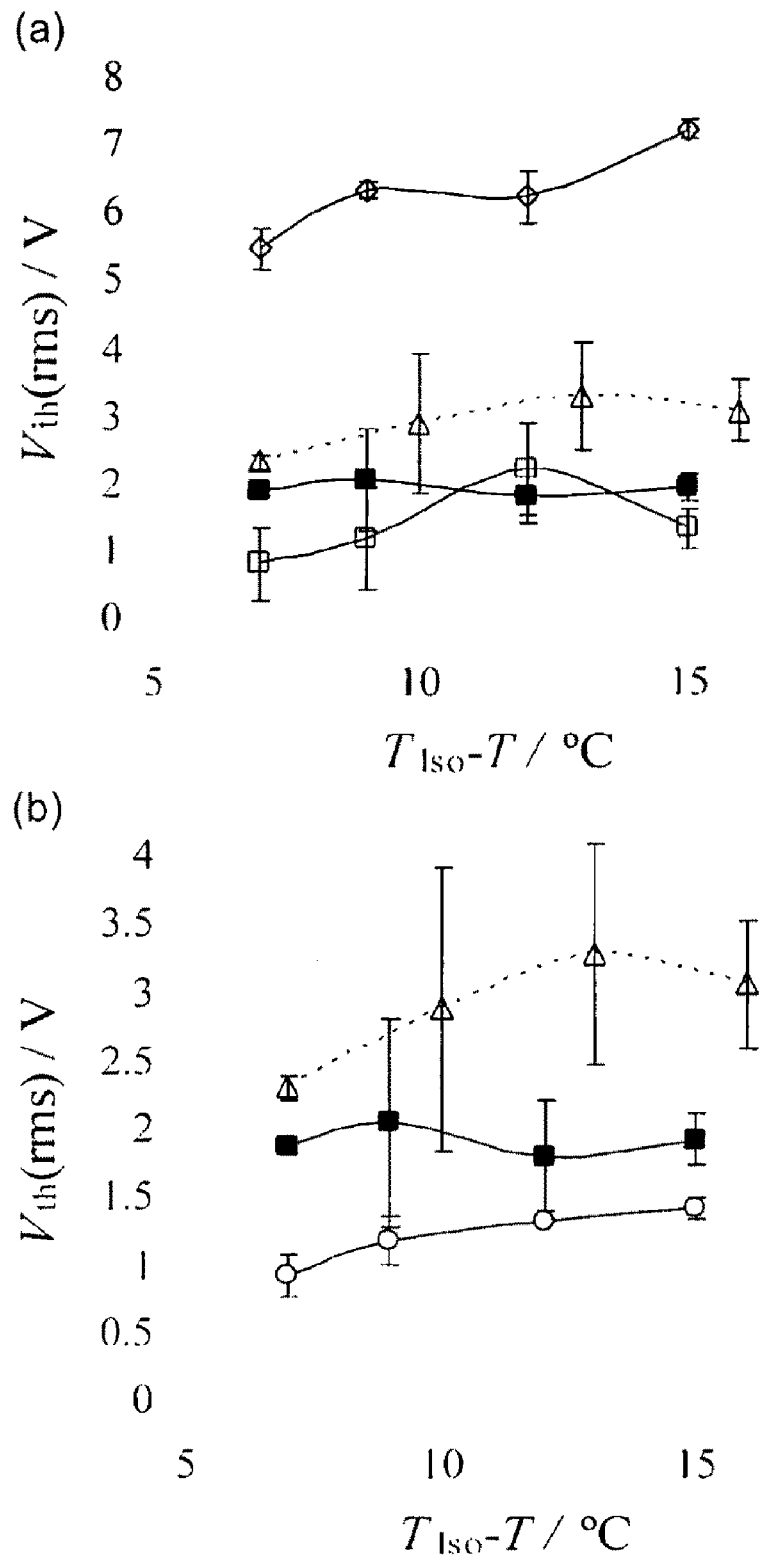
FIG. 22 shows plots of $V_{th}$(rms) vs. $T_{Iso}$-T of cells treated with cooling at field-OFF: (a) ◇ pure Felix-2900-03, ∆ Felix-2900-03 doped with 5 wt-% Au2, ■ Felix-2900-03 doped with 5 wt-% QD2, and □ Felix-2900-03 doped with 10 wt-% QD2, (b) ∆ Felix-2900-03 doped with 5 wt-% Au2, ■ Felix-2900-03 doped with 5 wt-% QD2, and ○ doped with 5 wt-% Au3.
Figure 23:
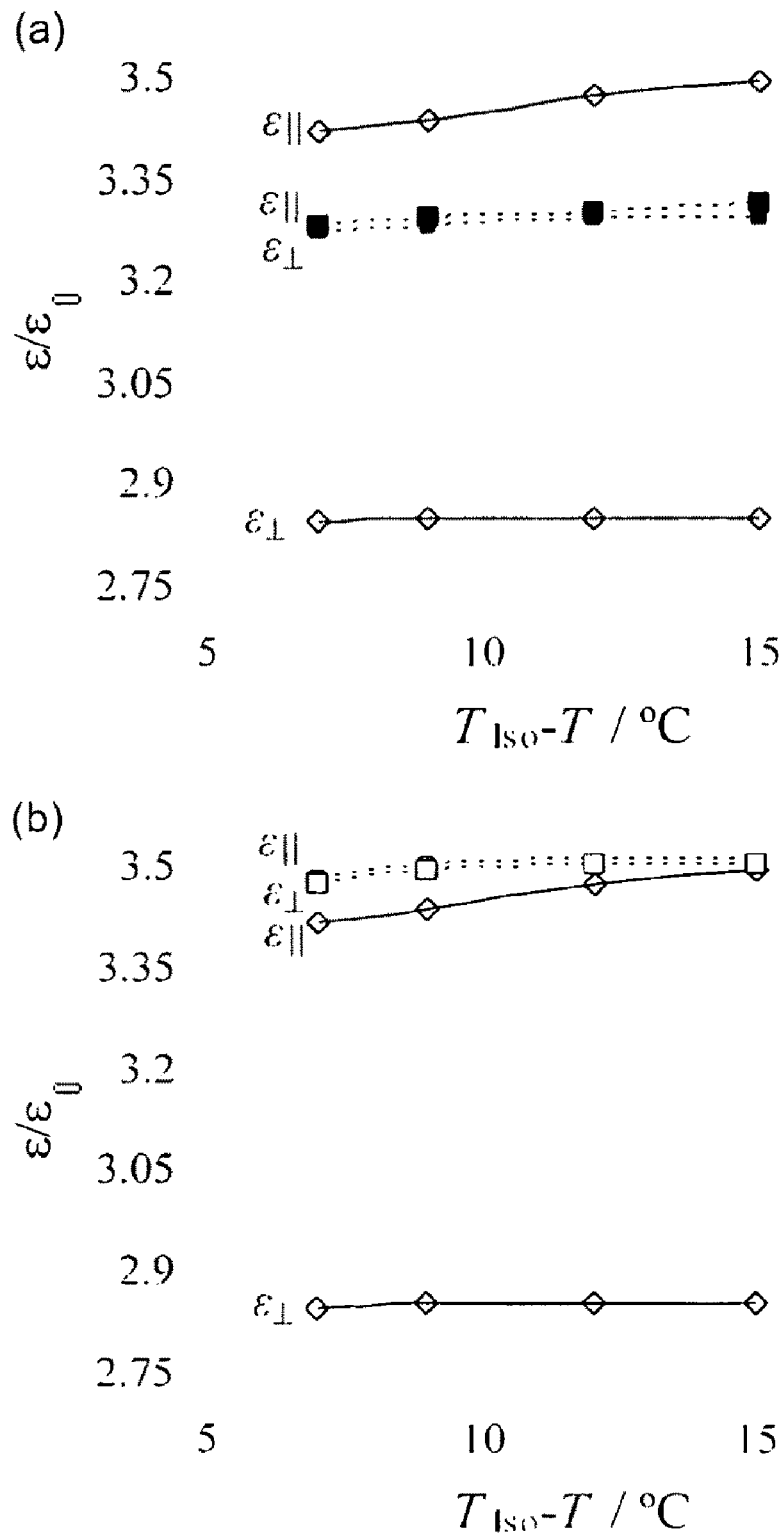
FIG. 23 shows plots of the dielectric constants ($\in/\in_0$) both along ($\in_\parallel$) and across ($\in_\perp$) the long molecular axis vs. $T_{Iso}$-T: (a) ◇ pure Felix-2900-03, ■ Felix-2900-03 doped with 5 wt-% QD2, (b) ◇ pure Felix-2900-03, □ Felix-2900-03 doped with 10 wt-% QD2.

Plots of $V_{th}$ vs. $T_{Iso}-T$ and $\in_\parallel$ ($\in_\perp$) vs. $T_{Iso}-T$ of cells treated with cooling at field-OFF for pure Felix-2900-03, Felix-2900-03 doped with 5 wt-% or 10 wt-% QD2 in comparison to Felix-2900-03 doped with Au2 or Au3 (all dodecane thiolate capped) are shown in FIGS. 22 and 23.

The slightly larger dodecane thiolate capped CdTe quantum dots QD2 outperformed the smaller dodecane thiolate capped gold nanoparticles Au2 by showing lower values for $V_{th}$ over the entire temperature range at both 5 wt-% and 10 wt-% in Felix-2900-03 (FIG. 22a). However, at the same N-LC/nanoparticle ratio (5 wt-%) in the series Au2, Au3 and QD2 (all identically capped with dodecane thiolate—The phase transfer of initially thioglycolic acid capped CdTe quantum dots using hexane- or dodecane-thiol in acetone produces mixed monolayer capped CdTe quantum dots, in which not all thioglycolic acid ligands are replaced by hexane- or dodecane-thiolate ligands.) dispersed in Felix-2900-03, the larger gold nanoparticles Au3 gave the lowest threshold voltages (FIG. 22b). It is believed that this is due to the dominating capacitive charging effects described earlier.

As for the relative dielectric permittivity $\in_\parallel$ and $\in_\perp$, and the dielectric anisotropy $\Delta\Delta\in$ QD2 seemed to have the same effect on Felix-2900-03 as the smaller gold nanoclusters, i.e., the values of $\in_\parallel$ were in the range of pure Felix-2900-03 and $\in_\perp$ increased resulting in overall lower $\Delta\in$ values (FIG. 23).

Figure 24:
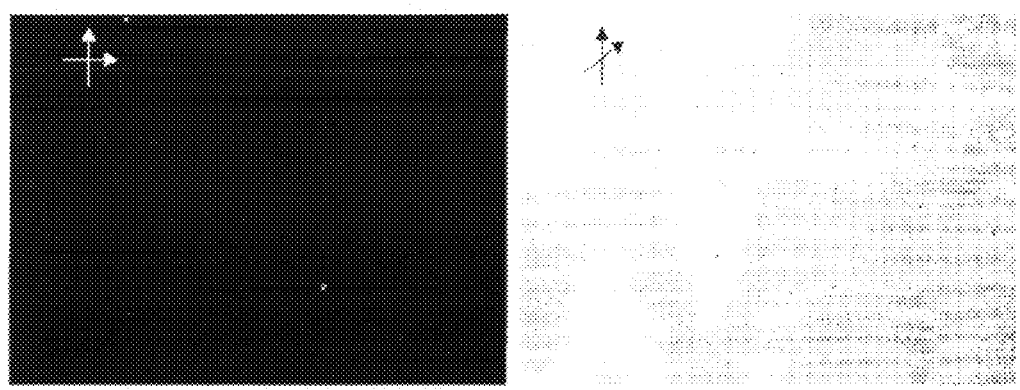
FIG. 24 shows polarized optical photomicrographs of Felix-2900-03 doped with 10 wt-% QD2 (arrows indicate polarizer/analyzer orientation) in cells with planar polyimide alignment layers (source: Displaytech Inc.; cell gap: 5 micron) treated with cooling to the N-phase at field-OFF at 67° C.
Figure 25:
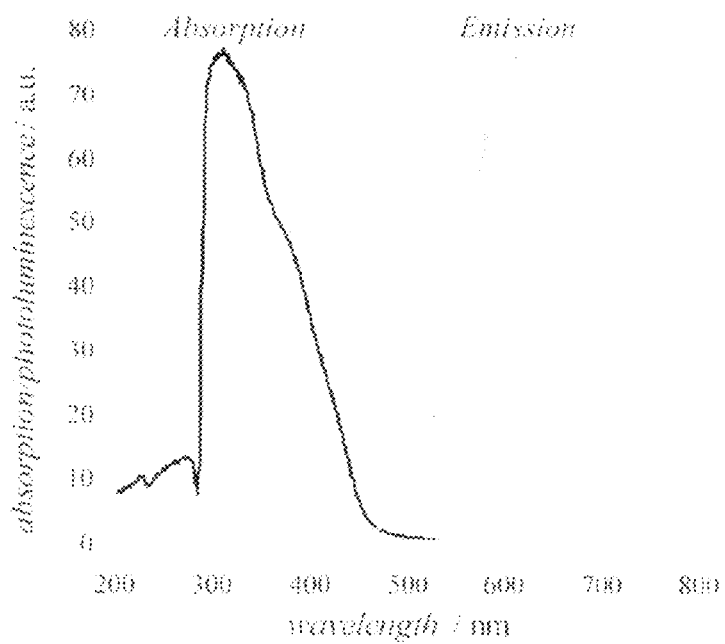
FIG. 25 is the absorption and emission spectrum ($\lambda_{exc.}$=375 nm) of dodecane thiolate capped quantum dots QD2 in toluene.

While the electro-optic performance of the QD2 doped Felix-2900-03 mixtures matched those observed for the gold and silver nanoparticle doped mixtures, the mixed monolayer nature of the dodecane thiolate and thioglycolic acid capped quantum dots (prepared by the phase transfer process) does not allow for the dual alignment mode as described for Au1-Au3 as well as Ag1 (all homogeneously capped with alkyl thiolates), which is believed to be related to the overall lower solubility (inferior compatibility) of the mixed monolayer QD2 in Felix-2900-03 in addition to possible interactions between the polar thioglycolic acid —COON groups (HSCH$_2$COOH; particularly if 'phase-separated' on the quantum dot surface) and the polyimide alignment layers. In fact, textures featuring only homeotropic (vertical) alignment with very few (to none at 10 wt-%, see FIG. 24) birefringent stripes were observed, independent of the thermal and electric-field history of the cell (cooling at field-ON or field-OFF). FIG. 24 shows that an increase of the nanoparticle concentration resulted in the disappearance of the birefringent stripe defects producing virtually homogeneous vertical (homeotropic) alignment of Felix-2900-03 in planar cells However, the alkyl thiolate capped CdTe quantum dots possessed a quality not shared by the gold and silver nanoparticles; they were characterized by a size-dependent photoluminescence in solution as well as in the solid state. FIG. 25 shows the absorption and photoluminescence spectrum of the QD2 quantum dots in toluene (note that the synthesis of these CdTe quantum dots allows for isolation and phase transfer of somewhat discrete sizes that differ in emission wavelength and intensity (Gaponik et al., "Efficient phase transfer of luminescent thiol-capped nanocrystals: From water to non-polar organic solvents", *Nano Lett.*, 2, 803-806 (2002)).

8CB Doped with QD1 and QD2

To further show detailed structure-property relationships, electro-optic response of two CdTe quantum dots differing in size and in surface functionality (hexane thiolate capped QD1 and dodecane thiolate capped QD2) were measured in the structurally different, polar N-LC 8CB. As for the gold nanoclusters Au1 in EXAMPLE 1A, doping 8CB with the two quantum dots QD1 or QD2 did not result in a significant change (slight decrease) of the threshold voltage despite an increase of $\Delta\in$ for Au1 as well as QD2 (see Table 7). As with 5CB and other cyanobiphenyl based N-LCs tested, the incompatibility of the polar N-LCs with the hydrocarbon-capped nanoparticles (inferior compatibility in comparison to Felix-2900-03 flanked by two hydrocarbon chains) complicated a discussion of the electro-optic data obtained from these mixtures. In addition, a reproduction of the dual alignment mode with the quantum dots proved as difficult as with the gold nanoparticles in EXAMPLE 1A, with most cells showing no homogeneous homeotropic alignment (if at all) with cooling at field-OFF.

TABLE 7

Electro-optic data of 8CB and 8CB doped with Au1, QD1, and QD2 at $T_{Iso} - T = 6°$ C.

| | $V_{th}$(rms)/V | $\Delta\epsilon$ |
|---|---|---|
| Pure 8CB | 1.46 | 8.4 |
| 8CB doped with 5 wt-% Au1 | 0.73 | 18.5 |
| 8CB doped with 5 wt-% QD1 | 1.07 | 6.12 |
| 8CB doped with 5 wt-% QD2 | 1.19 | 18.0 |

A viable approach has been demonstrated to alter the alignment of N-LCs with $\Delta\in>0$ in planar cells coated with polyimide alignment layers and improve their electro-optic characteristics, i.e., reduced threshold voltages, by doping nematic LCs with metal (gold, silver) nanoparticles as well as with semiconductor quantum dots (CdTe). By changing nanoparticle parameters such as size, core material, and surface functionality, vertically (homeotropically) aligned cells that can be electrically reoriented at much lower threshold voltages in comparison to the pure N-LC were produced. Size and core material of the nanoparticle impacted the threshold voltage, with the smaller Au1 and Ag1 as well as the largest Au3 having shown the lowest values of $V_{th}$ over the entire nematic phase range. The more semiconducting nature of metal nanoparticles with shorter hydrocarbon chain thiolates and capacitive charging effects of the metal nanocluster cores played an important role in the reduction of the threshold voltage considering the induced vertical alignment with the nanoparticles residing at the interfaces. The values obtained for the semiconductor quantum dots doped mixtures fit well into this model, since the quantum dot protected by a thiolate of equal alkyl chain length showed lower $V_{th}$ values in comparison to the gold nanoparticle (QD2 vs. Au2), and the quantum dot with shorter alkyl chain length showing lower $V_{th}$ values in comparison to the quantum dot with longer chains in the same N-LC (QD1 vs. QD2, see Table 7).

Finally, the nature of the nanoparticle monolayer protection, i.e., one-component vs. two-component (mixed monolayer), influenced the ability to produce cells of an N-LC with $\Delta \in > 0$ featuring the thermal and electric field history-dependent dual alignment mode. In particular the mixed monolayer protected CdTe quantum dots exclusively produced vertical alignment in planar cells in both regimes, cooling at field-OFF and cooling at field-ON, but had the added bonus of size-tunable photoluminescence for the use in self-illuminating LC displays.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

The invention claimed is:

1. A planar nematic liquid crystal cell comprising:
    a colloidal suspension comprising:
        a nematic liquid crystal with positive dielectric anisotropy; and
        nanoclusters comprising non-chiral alkylthiol ligands; and
    one or more optional alignment layers; wherein the nanoclusters comprise silver nanoclusters or cadmium telluride quantum dots.

2. The planar nematic liquid crystal cell of claim 1 wherein the nematic liquid crystal is uniaxial, biaxial, or discotic.

3. The planar nematic liquid crystal cell of claim 1 wherein the cadmium telluride quantum dots further comprise polar ligands.

4. The planar nematic liquid crystal cell of claim 1 wherein the cadmium telluride quantum dots comprise a mixed monolayer comprising the non-chiral alkylthiol ligands and thioglycolic acid ligands.

5. A method of inducing a Freedericksz transition, the method comprising:
    providing a planar nematic liquid crystal cell comprising:
        a colloidal suspension comprising:
            a nematic liquid crystal with positive dielectric anisotropy; and
            nanoclusters comprising non-chiral alkylthiol ligands, wherein the
        nanoclusters comprise silver nanoclusters or cadmium telluride quantum dots; and
        one or more optional alignment layers; and
    applying an electric field across the cell to reorient the liquid crystal molecules, wherein the electric field is above the threshold field.

6. The method of claim 5, wherein the nematic liquid crystal is a non-chiral nematic liquid crystal.

7. The method of claim 5, wherein the colloidal suspension comprises no greater than 10 wt-% of nanoclusters, based on the total weight of the liquid crystal and nanoclusters and wherein the nanoclusters have an average size of no greater than 10 nm.

8. The method of claim 5, wherein the planar nematic liquid crystal cell has a cell gap of less than 7.0 microns.

9. The method of claim 5 wherein the nematic liquid crystal is uniaxial, biaxial, or discotic.

10. The method of claim 5 wherein the nanoclusters are present in the suspension in an amount of at least 0.1 wt-%, based on the total weight of the liquid crystal and nanoclusters.

11. The method of claim 5 wherein the electric field is of varying frequency or varying wave form.

12. The method of claim 5 wherein the cadmium telluride quantum dots comprise a mixed monolayer comprising the non-chiral alkylthiol ligands and thioglycolic acid ligands.

13. A method of controlling the alignment of a liquid crystal, the method comprising:
    filling a liquid crystal cell comprising one or more optional alignment layers with a mixture that comprises an isotropic liquid crystal and nanoclusters, wherein the nanoclusters comprise silver nanoclusters or cadmium telluride quantum dots, and wherein the nanoclusters comprise non-chiral allcylthiol ligands; and
    cooling the mixture below the liquid crystal isotropic-nematic phase transition temperature.

14. The method of claim 5 wherein the cadmium telluride quantum dots comprise a mixed monolayer comprising the non-chiral alkylthiol ligands and thioglycolic acid ligands.

* * * * *